(12) United States Patent
Dudhat

(10) Patent No.: US 12,535,775 B2
(45) Date of Patent: Jan. 27, 2026

(54) APPARATUS WITH API FOR USE IN INDICATING TIME INTERVAL DURATIONS OF PARTICULAR EVENTS

(71) Applicant: Samrat Solutions, Inc., Arlington, VA (US)

(72) Inventor: Samrat Dudhat, Arlington, VA (US)

(73) Assignee: Samrat Solutions, Inc., Arlington, VA (US)

( * ) Notice: Subject to any disclaimer, the term of this patent is extended or adjusted under 35 U.S.C. 154(b) by 344 days.

(21) Appl. No.: 18/455,541

(22) Filed: Aug. 24, 2023

(65) Prior Publication Data

US 2023/0400819 A1   Dec. 14, 2023

Related U.S. Application Data

(63) Continuation of application No. 18/104,367, filed on Feb. 1, 2023, now Pat. No. 11,774,917, which is a continuation of application No. 17/187,836, filed on Feb. 28, 2021, now Pat. No. 11,586,157, which is a continuation of application No. 15/836,148, filed on Dec. 8, 2017, now Pat. No. 10,969,747.

(51) Int. Cl.
| | |
|---|---|
| *G04G 99/00* | (2010.01) |
| *G04G 9/00* | (2006.01) |
| *G04G 9/02* | (2006.01) |
| *G06F 16/20* | (2019.01) |
| *H04W 4/02* | (2018.01) |

(52) U.S. Cl.
CPC ......... *G04G 99/006* (2013.01); *G04G 9/0064* (2013.01); *G04G 9/02* (2013.01); *G06F 16/20* (2019.01); *H04W 4/025* (2013.01)

(58) Field of Classification Search
None
See application file for complete search history.

(56) References Cited

U.S. PATENT DOCUMENTS

| | | |
|---|---|---|
| 5,353,264 A | 10/1994 | Corbin, III |
| 5,696,740 A | 12/1997 | Inabinet |
| 5,751,663 A | 5/1998 | Johnson |

(Continued)

FOREIGN PATENT DOCUMENTS

WO   WO-2012003844 A1 *  1/2012   ............. G06V 40/16

OTHER PUBLICATIONS

U.S. Appl. No. 15/836,148, filed Dec. 8, 2017.
U.S. Appl. No. 17/187,836, filed Feb. 28, 2021.
U.S. Appl. No. 18/104,367, filed Feb. 1, 2023.

*Primary Examiner* — Regis J Betsch
*Assistant Examiner* — Michael James Walker
(74) *Attorney, Agent, or Firm* — ASLAN LAW, P.C.

(57) ABSTRACT

An apparatus, intended for use in indicating time interval durations of particular events in an augmented reality display, includes a computer system with a processing system having a hardware processor and a memory accessible to the processing system, a user interface controller under control of the processing system, a display controllable by the user interface controller to show a user interface, and logic, under control of the processing system. The logic has modules that control the user interface controller to cause the display to show a first clockface that indicates a time interval duration for at least a first event and an augmented reality background appearing behind the first clockface.

20 Claims, 36 Drawing Sheets

(56) References Cited

U.S. PATENT DOCUMENTS

| | | |
|---|---|---|
| 5,943,300 A | 8/1999 | Johnson |
| 7,924,657 B2 | 4/2011 | Liebowitz |
| 8,264,910 B2 | 9/2012 | Fuisz et al. |
| 9,201,402 B2 | 12/2015 | Greubel et al. |
| 9,274,505 B2 | 3/2016 | Johns |
| 10,042,527 B2 | 8/2018 | Seuthe |
| 2005/0105397 A1 | 5/2005 | Tuason |
| 2010/0162170 A1 | 6/2010 | Johns |
| 2015/0378320 A1 | 12/2015 | Knight et al. |
| 2019/0265648 A1 | 8/2019 | Kemp |

* cited by examiner

FIG. 35

APPARATUS WITH API FOR USE IN INDICATING TIME INTERVAL DURATIONS OF PARTICULAR EVENTS

CROSS-REFERENCE TO RELATED APPLICATIONS

This application is a continuation of U.S. patent application Ser. No. 18/104,367 filed Feb. 1, 2023, entitled "Apparatus with API for use in Indicating Time Interval Durations of Particular Events," which is a continuation of U.S. patent application Ser. No. 17/187,836 filed Feb. 28, 2021, and issued as U.S. Pat. No. 11,586,157 on Feb. 21, 2023, entitled "Time Measuring Device Indicating Time Interval Durations of Particular Events," which is a continuation of U.S. patent application Ser. No. 15/836,148 filed Dec. 8, 2017, and issued as U.S. Pat. No. 10,969,747 on Apr. 6, 2021, entitled "Electrical Time Measuring System or Device Indicating Time Intervals by Regioned Concentric Arciforms that Indicate the Time of Duration of Particular Events," the entire disclosures of all of which are incorporated herein by this reference.

BACKGROUND

Field

This paper discloses a novel electrically powered system or device for measuring time, namely, a system or device that serves as a timepiece or a time measurement apparatus. The system or device uses regioned concentric arciforms to indicate the time of duration of an event.

Background and Related Art

Electrically powered/electronic devices for measuring time include computer-based wearables such as wristwatches and computer glasses, virtual reality headsets, mobile devices such as cell phones and media players, tablets, laptop computers, desktop computers, and any computing device regardless of form factor. These modern devices are clock driven and have the capability to indicate the time of duration of events such as appointments, vacations, schedules.

For simplicity, the foregoing devices are referred to in a general sense as electrically powered time measuring devices (ETMDs). ETMDs typically have a calendar program that measures time and, as various events draw nearer in time, provides a visible, audible, or physical indication, i.e., an alarm, to convey the proximity of the events.

Technical Problems

The graphical representation of such events, however, whether relating to an alarm or relating to creating, modifying, updating, or deleting an event, often lacks an indicator of the time of duration of the event. When such representations are provided, ETMDs typically include alphanumeric information. Such ETMDs have some means for indicating the time of duration of an event, but the heavy reliance on alphanumeric information decreases the clarity of such indicia and makes more confusing the display of such indicia when the time of duration of more than one particular event is depicted.

The related art approach in FIG. 35 uses text to indicate event start times but does not display event end times. Adding event end times would clutter the display and result in confusion instead of clarity.

An iOS application related to this field is CIRCLETIME (see http://www.newroundcalendar.com/circletime.html). An example is shown in FIG. 36. FIG. 36 shows the use of arcs to indicate the time of duration of events. In FIG. 36 a related art clockface 50 shows all twenty-four hours of a day. Most clockfaces show only twelve hours at a time in a well-known manner. To put it another way, most clockfaces represent no more than twelve hours in a rotation (some show fewer hours, such as the hours of 3, 6, 9, and 12, but they still represent all twelve hours). In the related art clockface 50, the position at the bottom of the dial represents noon. Most people associate the top of the clockface with noon or midnight since most clockfaces are twelve-hour clockfaces. FIG. 36 shows a related art first arc 56, a related art second arc 57, and a related art third arc 58. These arcs correspond to previously scheduled or previously timed events. In FIG. 36, related art sunset-sunrise arc 52 is a calculated display element that shows sunset on the day at close to 9:00 p.m. and sunrise at just before 6:00 a.m. The technical problem with displays such as that shown in FIG. 36 is that they are not only confusing (owing to using a twenty-four-hour clockface) but also cannot display all of an event that continues into the following day (i.e., an event that begins at 11:00 p.m. and ends at 3:00 a.m. cannot be displayed, in its entirety, on related art clockface 50).

Besides having the foregoing technical problems, the related art approaches in FIG. 35 and FIG. 36 require substantial expenditures in processor cycles and memory, especially graphic memory, to convey the information to the user.

In the related art of FIG. 35, the consumption of processor cycles and memory is increased due to the generation of so many display elements. A more efficient and streamlined way to convey the information would require fewer processor cycles and less memory.

In the related art of FIG. 36, the consumption of processor cycles and memory is increased in the case of events that span across to the following day. For example, assume an event has a start time of 11:00 p.m. and an end time of 3:00 a.m. on the following day. To view the entirety of the event, the user must first view the 11:00 p.m. to 12:00 am piece of an arc, and then manually advance the date to the following day to view the 12:00 am to 3:00 a.m. piece of the arc. Two calendar dates must be displayed. Since there is a need to switch displays in the related art of FIG. 36, two displays must be computed and shown, and therefore the consumption of processor cycles and memory is doubled. A way to convey the information for events that span to the following day would avoid this doubling of resources expended.

Processor cycles and memory availability are quantities limited in any processing system. It is therefore desirable to reduce the number of processor cycles and to reduce the amount of memory required in ETMDs when indicating the time of duration of particular events.

SUMMARY

This Summary introduces a selection of high-level concepts, in simplified form, which are further described below in the Detailed Description. This Summary is not intended to identify any essential features of the claimed subject matter, nor is it intended to articulate or be used as an abstract idea that affects the scope of the claimed subject matter.

It is an object of the inventive concept to provide an ETMD that uses regioned concentric arciforms as a means for indicating the time of duration of events.

The inventive concept is realized in an ETMD apparatus, but also in a method for indicating the time of duration of events with regioned concentric arciforms, and a computer-readable medium adapted to enable a computer system to indicate the time of duration of a particular event using regioned concentric arciforms.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one embodiment a time measuring device includes: a computer system with a processing system having a hardware processor configured to perform a predefined set of basic operations in response to receiving a corresponding basic instruction selected from a predefined native instruction set of codes, and with a memory accessible to the processing system; a user interface controller under control of the processing system; and logic, including a set of machine codes stored in the memory and selected from the predefined native instruction set of codes of the hardware processor, adapted to operate with the user interface controller to implement a user interface having a first clockface display including: regions that share a common center, including an ante meridiem events region and a post meridiem events region; one or more arciforms that indicate a time duration of events, each including points equidistant from the common center; a first arciform, of the one or more arciforms, including: in one of the regions, a first start point connected to an initial arc of points that are equidistant from the common center; in a different one of the regions, a final arc of points that are equidistant from the common center connected to a first end point; and a transition indicator linking the initial arc with the final arc. Another embodiment related to this includes a corresponding method. Yet another embodiment related to this includes an article of manufacture that has a non-transitory computer-readable medium bearing instructions adapted to enable a hardware processor of a processing system to perform operations to indicate time intervals by arciforms that indicate a time of duration of events, the operations including: displaying a first clockface having regions that share a common center, including an ante meridiem events region and a post meridiem events region; displaying arciforms that indicate a time duration of events, each including points equidistant from the common center; and displaying one of the arciforms as a first arciform having: in one of the regions, a first start point connected to an initial arc of points that are equidistant from the common center, the first start point identifying a start time of a first time interval; in a different one of the regions, a final arc of points that are equidistant from the common center connected to a first end point, the first end point identifying an end time of the first time interval; and a transition indicator linking the initial arc with the final arc.

In another embodiment, a time measuring device includes: a computer system with a processing system having a hardware processor configured to perform a predefined set of basic operations in response to receiving a corresponding basic instruction selected from a predefined native instruction set of codes, and with a memory accessible to the processing system; a user interface controller under control of the processing system; and logic, including a set of machine codes stored in the memory and selected from the predefined native instruction set of codes of the hardware processor, adapted to operate with the user interface controller to implement a user interface having a first clockface display including: regions that share a common center, including an ante meridiem events region, and a post meridiem events region; one or more arciforms that indicate a time duration of events, each including points equidistant from the common center; a first arciform, of the one or more arciforms, and a second arciform, of the one or more arciforms, contained within an identical one of the regions; the first arciform subtending a first angle from the common center of the clockface; the second arciform subtending a second angle from the common center of the clockface; and the first arciform and the second arciform being stacked within the same one of the regions when the first angle and the second angle overlap at least in part.

BRIEF DESCRIPTION OF THE DRAWING FIGURES

The drawings are included to provide a further understanding of the disclosure and are incorporated in and constitute a part of this specification. The drawings illustrate example implementations of the disclosure and, with the description, explain the principles of the disclosure.

Figure 35:
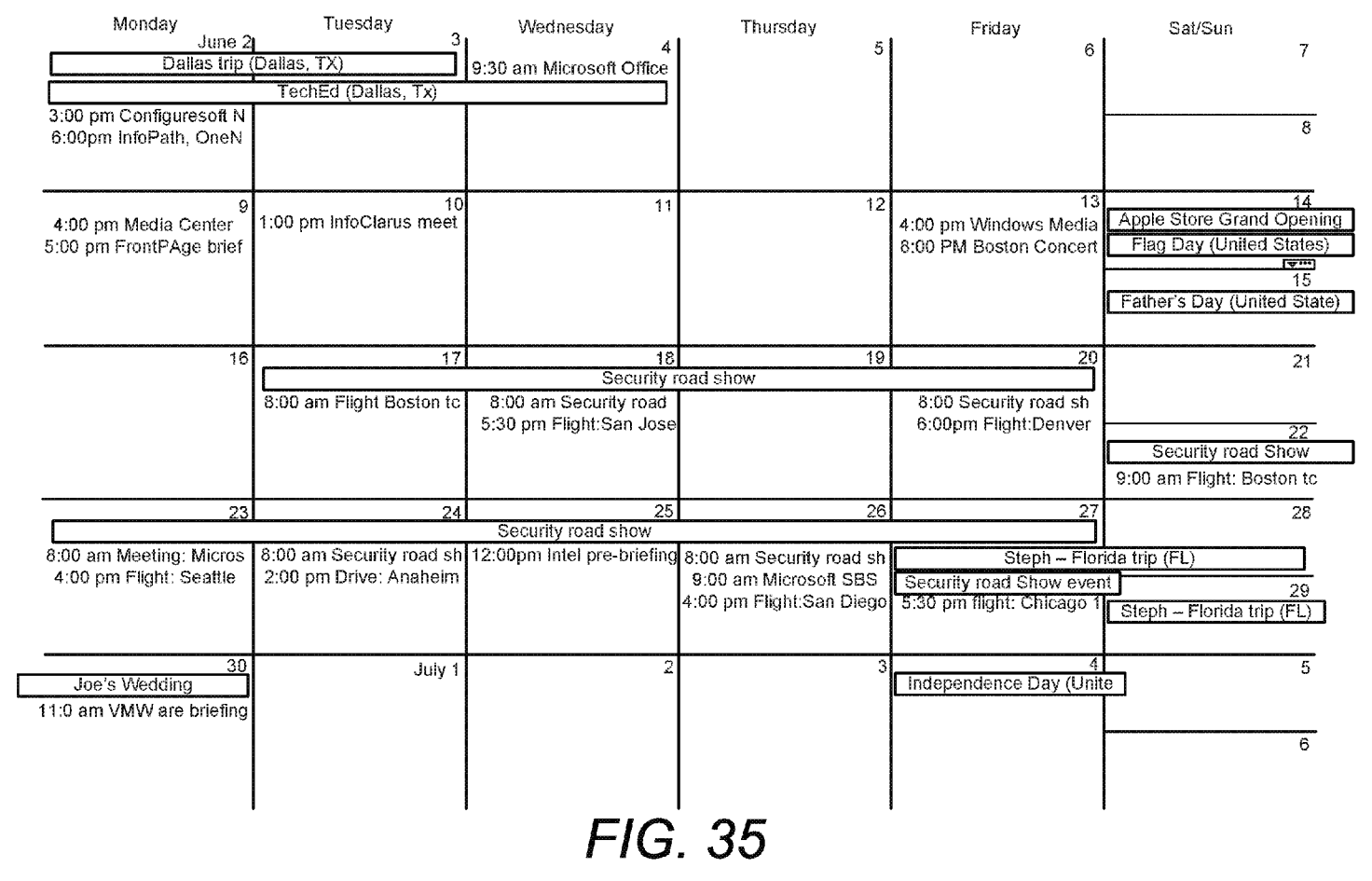

FIG. 35 depicts a known approach to indicating the time of duration of planned events without using arciforms.

DETAILED DESCRIPTION OF THE PREFERRED EMBODIMENTS

Technical Background

Computer Systems

Figure 1:
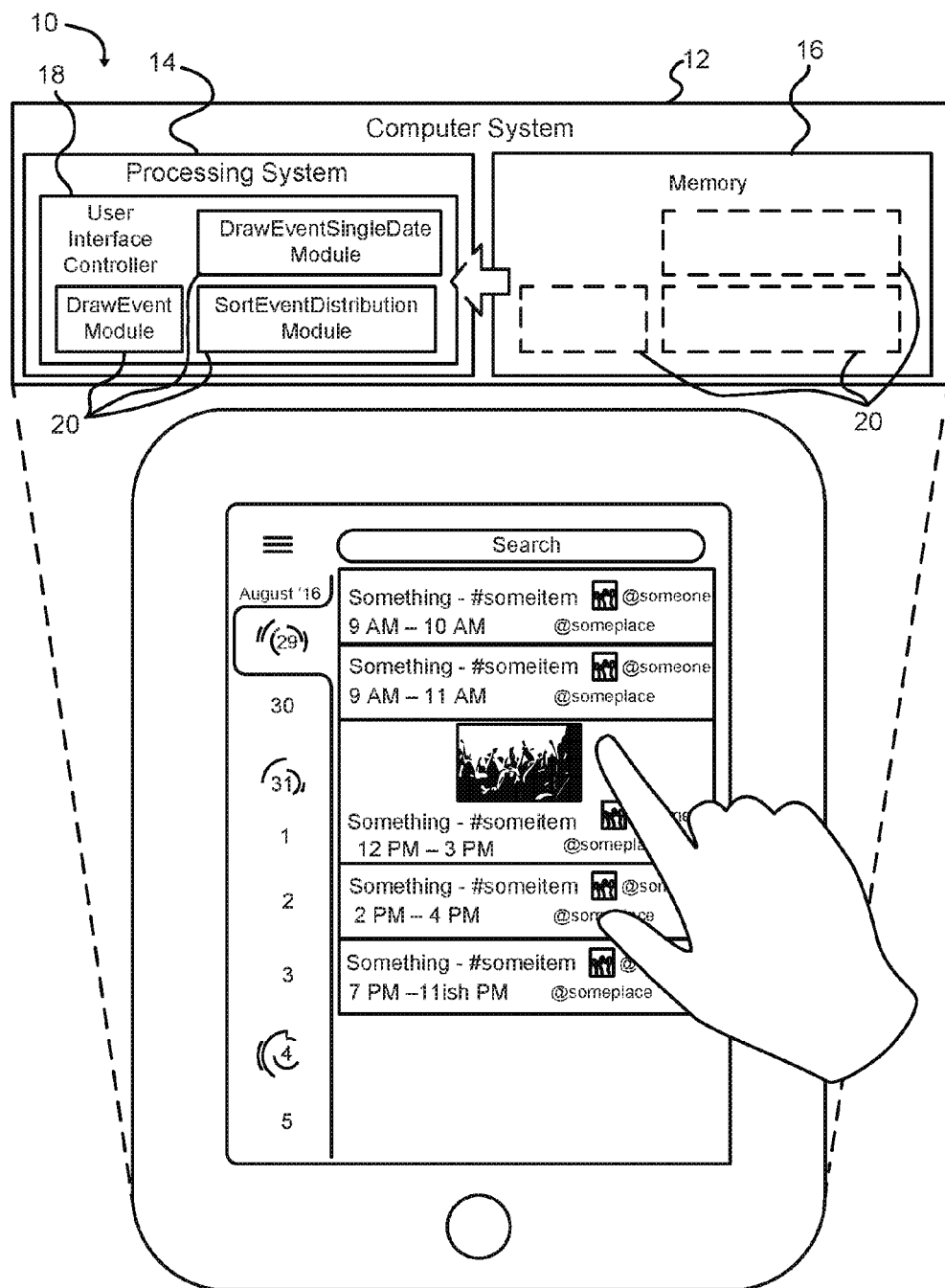
FIG. 1 illustrates an example environment that employs the concentric arciform approach to indicate the time of duration of a particular event.

One embodiment of this inventive concept resides in a computer system, also referred to herein as a computing device. Here, the term "computer system" is to be understood to include at least a memory and a processing system. In general, the memory will store, at one time or another, at least portions of an executable program code, and the processing system will execute one or more instructions included in that executable program code. It will be appreciated that the term "executable program code" and the term "software" mean substantially the same thing for this description. The processing system includes at least one hardware processor, and in other examples includes multiple processors and/or multiple processor cores. The processing system in yet another example includes processors from different devices working together.

Computer-Readable Media and Software

In one example, the inventive concept is embodied in a computer program product. A computer program product is an article of manufacture that has a computer-readable medium with software adapted to enable a processing system to perform various operations and actions.

On a practical level the software, that enables the computer system to perform the operations described herein, is supplied in many forms. The actual implementation of the approach and operations of the inventive concept are at one time statements written in a computer language. Such computer language statements, when made executable by a computer and then executed by the computer, cause the computer to act in accordance with the particular content of the statements. The software that enables a computer system to act in accordance with the inventive concept is provided in any number of forms including, but not limited to, original source code, assembly code, object code, machine language, compressed or encrypted versions of the foregoing, and any equivalents.

Software is stored on a computer-readable medium. Some computer-readable media are transitory, and some are non-transitory.

An example of a transitory computer-readable medium is the buffers of transmitters and receivers that briefly store only portions of software when the software is being downloaded over the internet. Another example of a transitory computer-readable medium is a carrier signal or radio frequency signal in transit that conveys portions of software over the air or through cabling when the software is being downloaded. Another example of a transitory computer-readable medium is the processor buffers and cache into which portions of software are loaded for immediate execution.

Non-transitory computer-readable media are different from transitory computer-readable media in terms of the amount of software stored and the duration of the storage. Non-transitory computer-readable media hold the software in its entirety, and for longer duration, as opposed to transitory computer-readable media that hold only a portion of the software and for a relatively short time. The term, "non-transitory computer-readable medium," specifically excludes communication signals such as radio frequency signals in transit.

Examples of non-transitory computer-readable media include portable storage such as a diskette, a tape, a compact disc, an optical disk, a USB disk, a USB stick, a flash disk, an external SSD, a compact flash card, an SD card, and the like. Other examples of non-transitory computer-readable media include secondary storage such as an internal hard drive, an internal SSD, internal flash memory, internal non-volatile memory, internal DRAM, ROM, RAM, and the like. Another example of non-transitory computer-readable media is the primary storage of a computer system when large enough to store and when used to store all of a given software. Yet other examples may be developed in the future.

Although the software is "written on" a disk, "embodied in" an integrated circuit, "carried over" a communications circuit, "stored in" a memory chip, or "loaded in" a cache memory, it will be appreciated that, for this application, the software will be referred to simply as being "in" or "on" the computer-readable medium. The terms "in" or "on" are intended to encompass the above mentioned and all equivalent and possible ways software is associated with a computer-readable medium. Likewise, a computer-readable medium is said to "hold," to "have," to "store," or to "bear" the software.

For simplicity, therefore, the term "computer program product" is used to refer to a computer-readable medium, which bears any form of software to enable a computer system to operate according to any embodiment of the inventive concept.

User Interfaces

The inventive concept is also embodied in a user interface responsive to user inputs to invoke one or more operations by an application program. A user interface is any hardware, software, or combination of hardware and software that allows a user to interact with a computer system. For this discussion, a user interface includes one or more user interface objects. User interface objects include display regions, user activatable regions, and the like.

A display region is a region of a user interface which displays information to the user. A user activatable region is a region of a user interface, such as a button or a menu, whose activation allows the user to take some action. A display region and a user activatable region are, in some examples, collocated, overlapping, or reside one within the other.

A user interface is invoked by an application program. When an application program invokes a user interface, it is typically for interacting with a user.

It is unnecessary, however, for the inventive concept, that an actual user ever interact with the user interface. It is also unnecessary, for the inventive concept, that an interaction with the user interface be performed by an actual user. In some examples, the user interface interacts with another program, such as a program to simulate the actions of a user with respect to the user interface.

Therefore, as used herein, "user" means an actual person or a program interacting with a user interface.

Interrelationship Between Executable Software and the Hardware Processor

The interrelationship between the executable software instructions and the hardware processor is structural. The instructions per se are simply a series of symbols or numeric values that do not intrinsically convey any information. It is the hardware processor, which by design was preconfigured to interpret the symbols or numeric values that imparts meaning to the instructions.

The hardware processor is configured when designed so as to perform a predefined set of basic operations in response to receiving a corresponding basic instruction selected from a predefined native instruction set of codes.

The software modules or logic must be made executable before the hardware processor can perform the operations designed into the software. The process of making the logic executable by a hardware processor, a process known to those familiar with this technical field as compilation or interpretation, is not the subject of this application and is well known in the field, and therefore will not be described in any detail here. When logic is made executable for a hardware processor, the logic is necessarily changed into machine codes that are selected from the predefined native instruction set of codes that can be carried out by the hardware processor.

The logic described below, when made executable, therefore includes a respective set of machine codes selected from the native instruction set.

Example Environment

FIG. 1 illustrates an example computing environment in which an embodiment of the invention is implemented. In FIG. 1, ETMD 10 is a handheld tablet computer equipped with, e.g., a touch-sensitive screen. FIG. 1 also includes a simplified, schematic representation of the ETMD as a computer system 12. Computer system 12 includes a processing system 14, a memory 16, and logic 20.

The processing system 14 includes, in one example implementation, a hardware processor. If the implementation is on a device such as an APPLE IPAD PRO, for example, the hardware processor is at the present time an A9X processor or similar, which itself contains multiple central processing unit (CPU) cores, and several graphics cores, and various levels of cache memory and numerous buffers. Other modern computer systems include other processing systems of other configurations. The hardware processor has a clock function that keeps time. The clock function of the hardware processor is conventional.

Logic 20 is implemented in hardware, in software, or a combination of the two. When implemented in hardware, the logic 20 is under control of the processing system 14 and communicates with the user interface controller 18. When implemented in software, modules of the logic 20 are loaded into or stored in memory 16, and then executed by processing system 14 as and when necessary; this arrangement is represented by the dashed-line boxes within memory 16, and the dotted-line arrow that bridges between memory 16 and processing system 14.

The logic 20 includes a DrawEvent Module, a DrawEventSingleDate Module, and a SortEventDistribution Module, among other logic not shown due to the lack of space. These modules of logic 20 are merely examples of an implementation and are not intended to be limitative of the invention. Likewise, the sample display shown upon the screen of ETMD 10 is not intended to be limitative of the invention. Each of these modules comprises a respective set of machine codes selected from the native instruction set of the hardware processor.

In this example environment, therefore, a tablet device houses a computer system with a processing system. The processing system has a hardware processor. The computer system has a memory accessible to the processing system. The tablet device also has a user interface controller that facilitates programmatic interaction with the screen and/or optional keyboard of the tablet device. The user interface controller is, in one example implementation, a separate hardware component or components. In another example implementation, the user interface controller is implemented in software.

An "app" or application program resides in the memory of the tablet device. The app includes various logic executable under the control of the processing system. An operating system is, in one example, interposed between the processing system and the logic of the app, although in another example the modules mentioned are part of the operating system.

The logic, under control of the processing system are configured to operate with the user interface controller to implement a user interface that provides the features described in the examples below.

Although a tablet device is used in this example environment, other example environments include smaller devices such as computer systems in watches, computer systems in mobile devices such as cellular phones, computer systems in mobile devices such as headsets and intelligent glasses, and the like. Yet other example environments include laptop computers, desktop computers, and virtual machines hosted on other computer systems.

Example Embodiment

Figure 2:
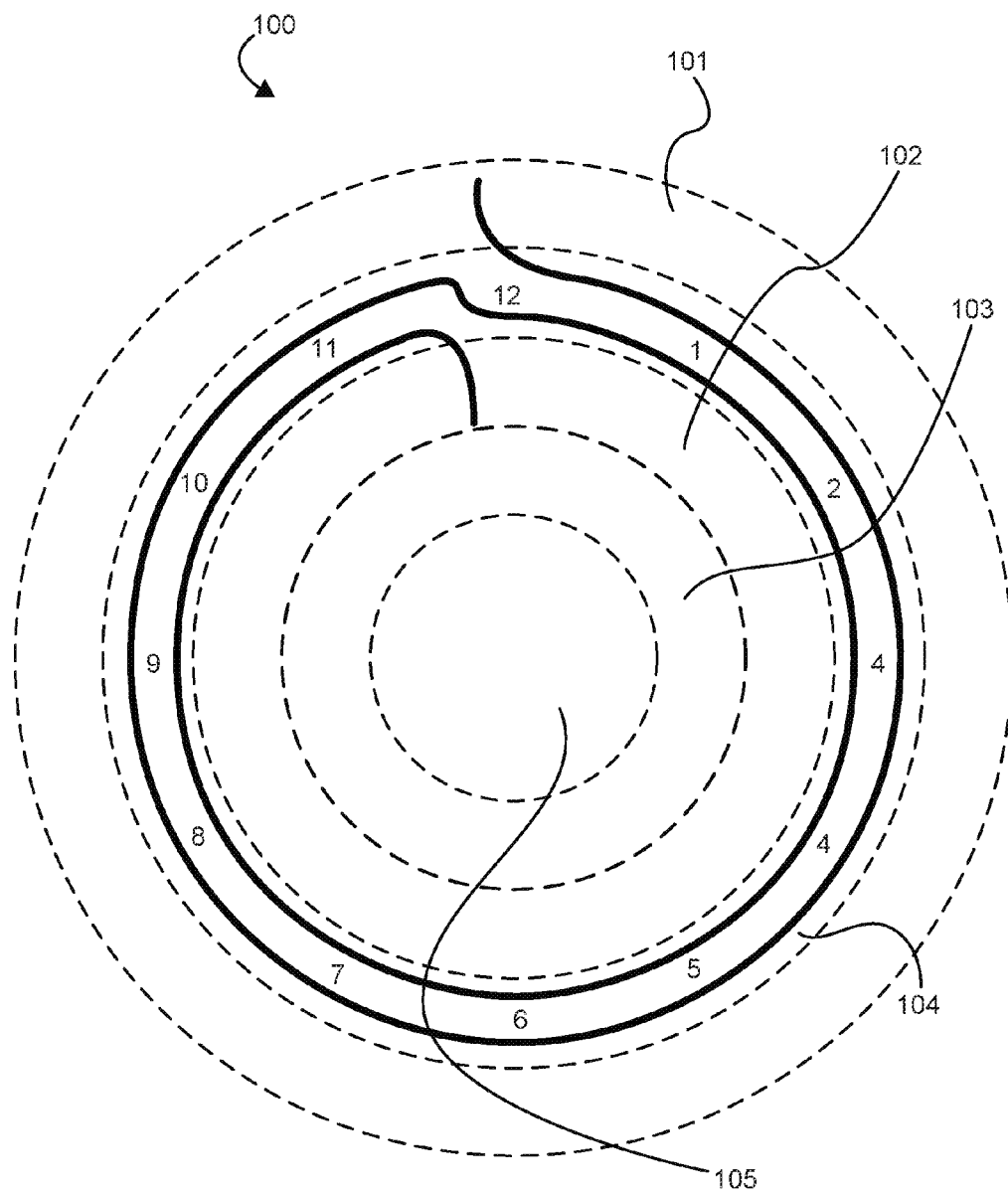
FIG. 2 is a depiction of a clockface with regions to display events.

FIG. 2 is an embodiment of a clockface 100 with a plurality of concentric regions (three in this example) to display arciforms as abstracted events in an easy-to-understand graphical display. In various embodiments, the three concentric regions are nested so that regions are either completely inside or completely outside each other. In other embodiments that are discussed further below, the concentric regions are nested in fewer than three dimensions, and do not necessarily reside completely inside or completely outside one another.

The clockface 100 is also referred to herein as a clockface display. The clockface 100 contains any number of nested concentric regions alternating between a.m. and p.m. In this example embodiment, the outermost region contains a.m. events for a particular day and is an ante meridiem events region 101 (a.m. events region). The next inner region contains p.m. events for that day and is a post meridiem events region 102 (p.m. events region). This convention is an example. In an alternative example, the innermost region is used for a.m. events and the next outer region is used for p.m. events. A.m. events region 101 and p.m. events region 102 are concentric regions. The presence of arciforms within different concentric regions is, more generally, a meridiem indication, namely, whether the event corresponding to the arciform is an a.m. event or a p.m. event. The positioning of the arciforms within concentric regions is one example of a means for meridiem indication. In other words, a clockface with a means for meridiem indication, in this example, is a clockface with different regions for a.m. and p.m. events.

In the example embodiment, where the outermost region contains a.m. events of a particular day 101, the region that is the next innermost region from p.m. events region 102, in an example, contains arciforms representing events which extend to the morning (a.m.) of the next day and is a following-day events region 103, giving the embodiment of FIG. 2 the capability to depict the duration of events (i.e., the time duration) beyond a single day. The presence of an arciform within following-day events region 103, which is concentric with a.m. events region 101 and p.m. events region 102, is more generally a following-day indication, or as a means for indicating duration into a following day.

In FIG. 2, the intermediate region between a.m. events region 101 and p.m. events region 102 is display region 104. The display region 104 in FIG. 2 appears in other positions in other examples. More than one display region is used in other examples.

In the example in FIG. 2, the dashed lines that separate the regions from each other are not intended for display. In other examples, such lines or similar lines are displayed (see, for example, outer display region 104' and inner display region 104" in FIG. 4).

Display region 104 in FIG. 2 includes display information. In this example, the display information includes hourly positions of an analog clock. Here, the user interface displays a clockface of no more than twelve hours. In other words, one revolution around the clockface corresponds to twelve hours of actual time (this is independent of whether the numerals are actually displayed as shown, or whether all of the numerals are shown, or whether any numerals at all are shown). The display of a clock in this manner is useful but not essential to the examples shown since the location of these hourly positions is well-understood by most users.

The display information in this example also includes a spiral-like line that begins in a.m. events region 101 and ends in p.m. events region 102. The spiral-like line is meant to provide the user with a visual indication of the movement of time and events, conveying that time passes from the a.m. events region 101 toward the p.m. events region 102. In other embodiments discussed further below, the spiral-like line is not included.

The center region 105 of the clockface 100 contains additional display information in some examples, such as a time, a date, a day of the week, a year, graphics, an analog clock, and/or animation. In an example, information displayed within the center region is also overlaid across the entire clockface 100 for any length of time.

The background of clockface 100 is, in various examples, transparent when the clockface 100 is displayed over additional information such as month view 301, map with point of interest or location 302, or augmented reality with street view schedule 304 (not shown in FIG. 2 but described and illustrated later).

Figure 3:
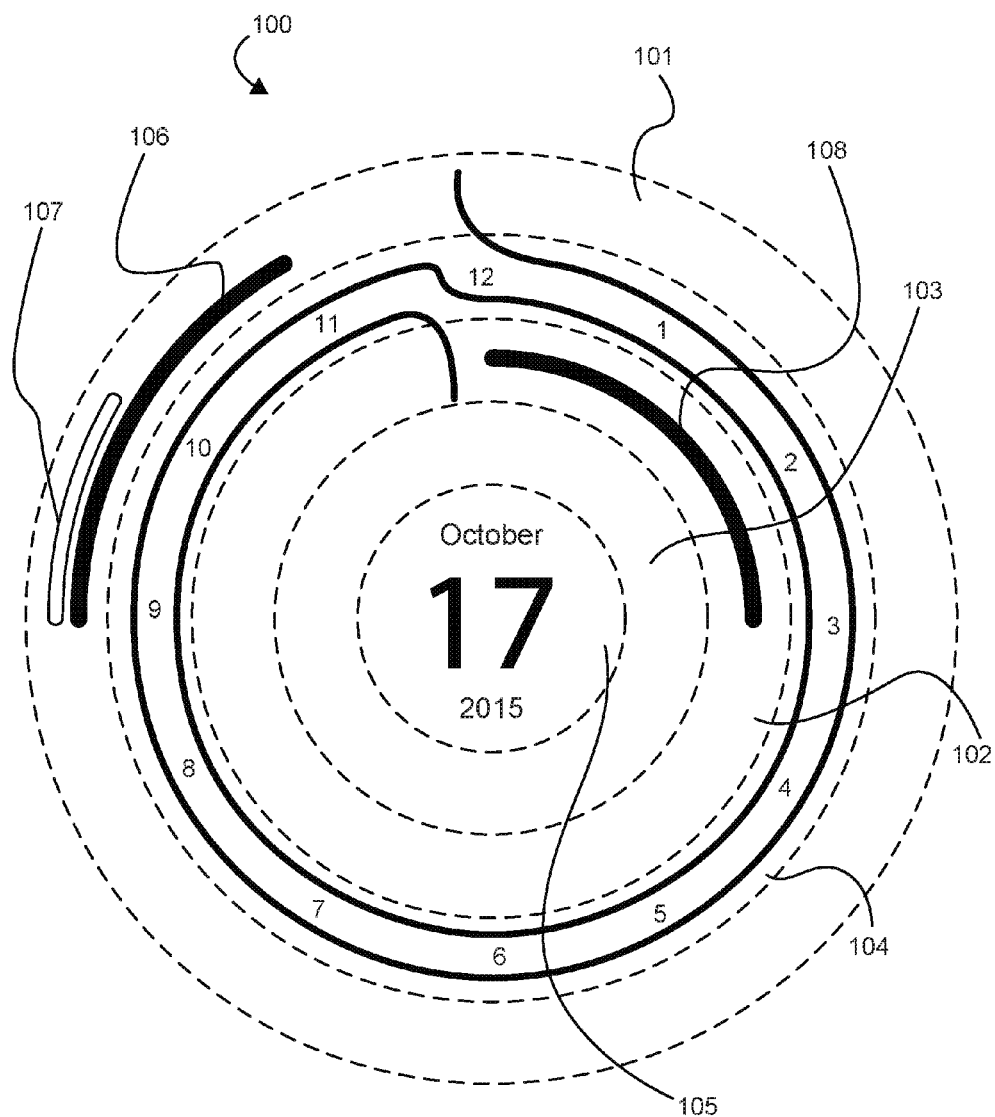
FIG. 3 is a schematic diagram showing an example of implementing FIG. 2 with accepted and tentative events scheduled at different times of the day.

FIG. 3 is a schematic diagram showing an example of how the duration of events is indicated on clockface 100.

FIG. 3 includes first arciform 106, second arciform 107, and third arciform 108. These arciforms are concentric, having a common center at the center of the clockface 100. The arciforms are regioned arciforms, meaning that the arciforms take on different meanings depending upon the region or regions in which they are displayed.

Each arciform represents the time of duration of an event. First arciform 106 represents an event with a duration of two hours, beginning at 9:00 and ending at 11:00. The first arciform 106 is displayed in a.m. events region 101 because the times (9:00 and 11:00) are in the a.m. Second arciform 107 is also regioned in the a.m. events region 101, indicating that its duration occurs in the a.m. Third arciform 108 is regioned in the p.m. events region 102 because its duration relates to the p.m.

The angle subtended by first arciform 106 from the center of the clockface 100 is proportional to the relative duration of that event. This is true of all arciforms that pertain to the duration of an event. Longer events subtend greater angles, and shorter events subtend smaller angles. Second arciform 107 subtends an angle, from the center of clockface 100, that is half of that of first arciform 106, and likewise second arciform 107 represents an event of half the duration of first arciform 106. Third arciform 108 subtends an angle three times as great as that of second arciform 107, meaning that the time of duration for this event is thrice that of second arciform 107 (namely, three hours, commencing at noon and continuing until 3:00 p.m.).

In FIG. 3, first arciform 106, second arciform 107, and third arciform 108 represent corresponding respective events (i.e., a first event, a second event, and a third event). According to an example, accepted events are displayed differently than events not accepted or only tentatively accepted. In the example in FIG. 3, the first event corresponding to first arciform 106 and the third event corresponding to third arciform 108 are accepted and shown with a darkened arciform; the second event corresponding to second arciform 107 is only tentatively accepted and so second arciform 107 therefore is displayed differently with a hollow arciform. In this example, the first event corresponding to first arciform 106 and the second event corresponding to second arciform 107 overlap in time, and so the first arciform 106 and the second arciform 107 are shown stacked within the a.m. events region 101. In another example, the arciforms overlay each other and are displayed with a level of transparency so each arciform is still observable. In yet another example, arciforms overlay each other and the overlapped duration between arciforms is highlighted by color, texture, text, or graphical callouts.

Using hollow or darkened arciforms in FIG. 3 is one example of a discriminating indicia. Other discriminating indicia are possible including, for example and not limitation, the use of different types of lines, colors, pictures, textures, patterns, and other graphic elements. Likewise, the arciforms are in other examples discriminated by different animated display techniques, such as flashing, pulsing, embedded videos or otherwise visually different arciforms. These various discriminating indicia are also a means for discriminating events.

Figure 4:
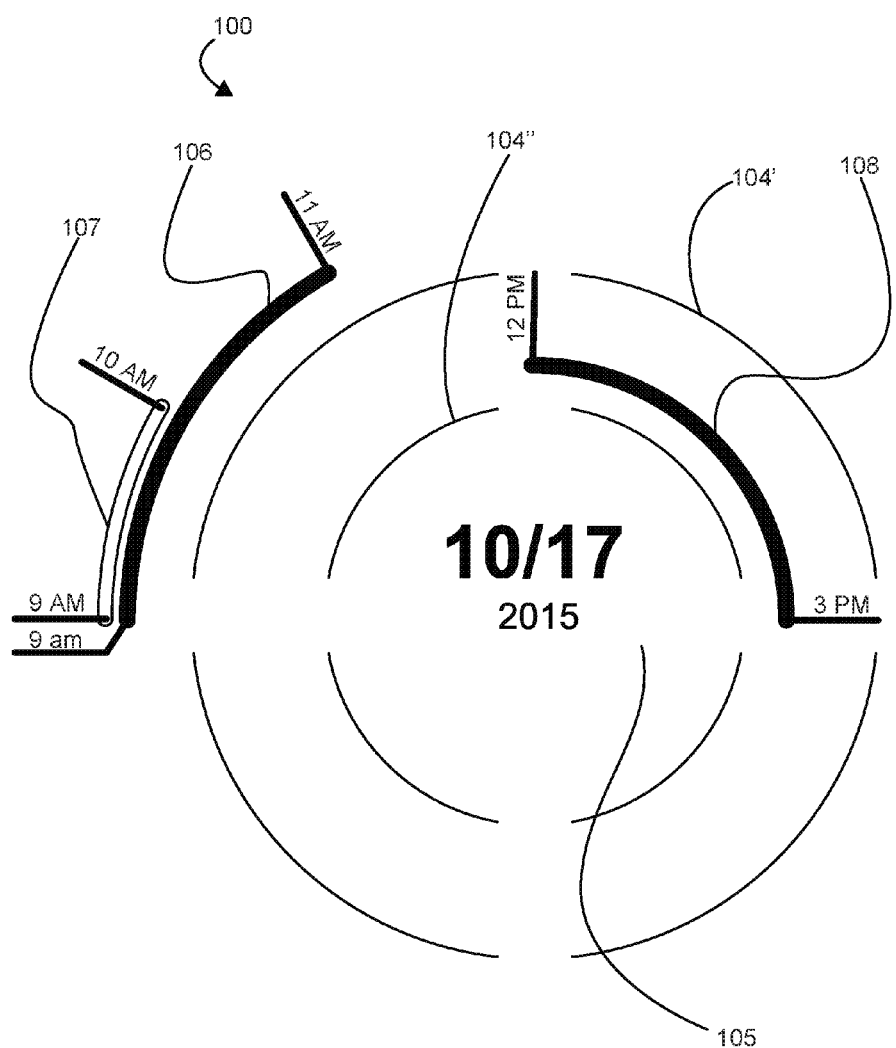
FIG. 4 is a schematic diagram showing an example of FIG. 3 with time indicators displayed at the start and end points of an event.

FIG. 4 is a schematic diagram that includes the display elements as in FIG. 3, but in an alternative manner. The example of FIG. 4 omits the twelve hourly positions of the analog clock, as in FIG. 3, but instead adds to the endpoints of each event an indicator showing the start time or the end time for the event. These endpoint indicators indicate start and end times for events according to one example. In another example, the endpoint indicators are displayed only when display space on the ETMD 10 permits the rendering of the text of the endpoint indicators in a size that meets a minimum threshold size. In yet another example, the endpoint indicators include indicia such as a user identifier (see FIG. 18, "Person A," etc.), task ID (FIG. 17, "Task A," etc.), or any other descriptor for an event. In another example, line indicators appear at any point on the line to describe the event (FIG. 19, "Task A" is an all-day task, and the indicator is arbitrarily positioned).

FIG. 4 also depicts an example in which the display information is presented in an alternative manner. In the example of FIG. 4, outer display region 104' is caused to display portions of a circle which serve as a visual separator between the a.m. events region 101 and the p.m. events region 102. Likewise, inner display region 104" serves as a visual separator between the p.m. events region 102 and following-day events region 103. Finally, it is noted that center region 105 includes display information in a format different from that shown in FIG. 3.

Figure 5:
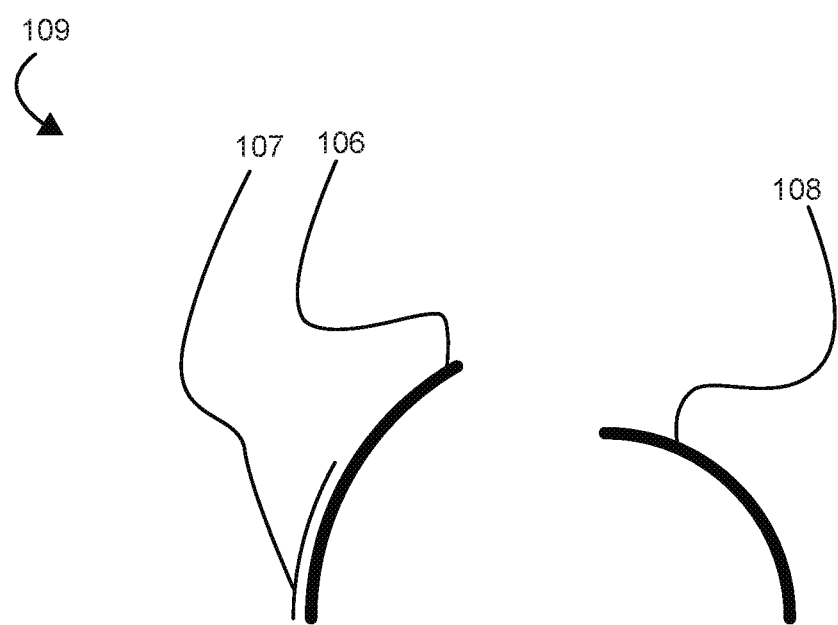
FIG. 5 is a schematic diagram showing an example of an embodiment of FIG. 2 with accepted and tentative events scheduled at different times of the day.

FIG. 5 is a schematic diagram that includes the display elements as in FIG. 3, but in an alternative, compact embodiment. The clockface, in this example, is free of any display information other than the arciforms. In other words, the example shown consists of only concentric arciforms. The relative positions of the concentric arciforms, with respect to each other, as well as their placement in regions as a means of meridiem indication, is enough to provide the acclimated user with the time of duration of each event, as well as the start and end times of each event. Note that in FIG. 5, a relative line thickness is used as the means for discriminating event acceptance, with a thin line indicating an event not accepted and thick lines indicating accepted. In another example, color, pattern, or texture are used as discriminating features of events.

Figure 6:
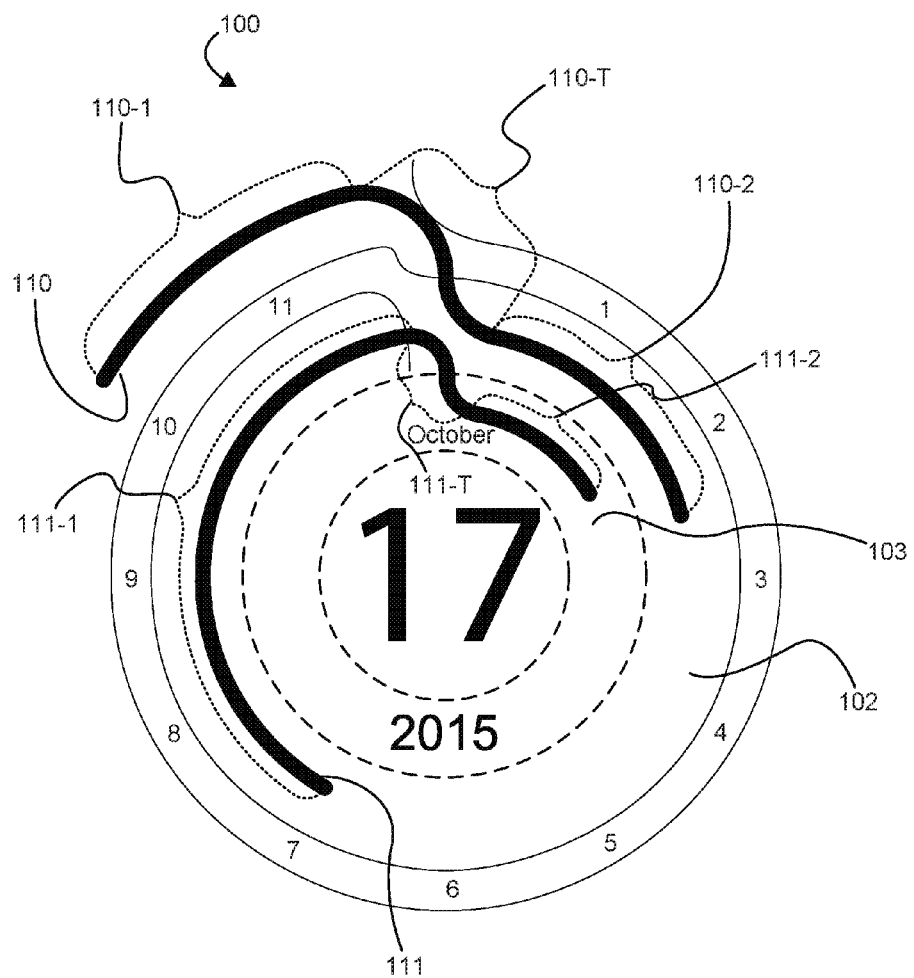
FIG. 6 is a schematic diagram displaying an example of an embodiment of FIG. 2 with transition points of events from a.m. to p.m. also including a transition of a task from p.m. to a.m. of the next day.

FIG. 6 shows two instances of region-crossing arciforms. A region-crossing arciform has a start point in one of the nested concentric regions and an end point in a different one of the nested concentric regions. A region-crossing arciform also has a respective integral boundary-crossing transition indicator at a respective radial axis, as described more below.

In FIG. 6, fourth arciform 110 represents a fourth event that begins at 10:00 a.m. and concludes at 2:30 p.m. Fourth arciform 110 begins in the a.m. events region 101 and ends in the p.m. events region 102. In like manner, fifth arciform 111 represents a fifth event that begins at 7:00 p.m. and concludes at 2:00 a.m. the following day. Fifth arciform 111 begins in the p.m. events region 102 and ends in the following-day events region 103.

Fourth arciform 110 and fifth arciform 111 are concentric with the arciforms depicted in the examples of FIGS. 3-5, notwithstanding the presence of their transition indicators. The start and end points of fourth arciform 110 and fifth arciform 111 are also appropriately regioned. In this example, however, the respective region of the start point of each arciform differs from the respective region for the end point of the arciform. To show continuity, therefore, the example in FIG. 6 provides each arciform with a transition area.

More specifically, fourth arciform 110 has a fourth arciform initial arc or initial portion 110-1 representing the portion of a fourth event from 10:00 a.m. to 12:00 p.m. (i.e., noon). Fourth arciform 110 has a fourth arciform final arc or final portion 110-2 representing the portion of the fourth event from 12:00 p.m. to 2:30 p.m. The fourth arciform 110 also has a fourth arciform transition portion 110-T linking the initial portion with the final portion by connecting the fourth arciform initial portion 110-1 and the fourth arciform final portion 110-2. In this example, the transition portion has a smooth curve at each connecting end. In the center of the fourth arciform transition portion 110-T is a transition point of the fourth arciform 110.

Similarly, the fifth arciform initial portion 111-1 of fifth arciform 111 pertains to the portion of a fifth event from 7:00 p.m. to 12:00 a.m. (i.e., midnight). The fifth arciform final portion 111-2 of fifth arciform 111 pertains to the portion of the fifth event from 12:00 a.m. to 2:00 a.m. The fifth arciform transition portion 111-T of fifth arciform 111 links the initial portion with the final portion because it connects the fifth arciform initial portion 111-1 and the fifth arciform final portion 111-2. A point at the center of the fifth arciform transition portion 111-T is a transition point of the fifth arciform 111.

The fourth arciform transition area 110-T is a meridiem-crossing indicator; the fifth arciform transition area 111-T is a date-crossing indicator. The fifth arciform final portion 111-2 has a following-day indicator because it appears in the following-day events region 103. More generally, fourth arciform 110 and fifth arciform 111 in FIG. 6 are arciforms with respective integral boundary-crossing transition indicators (namely, fourth arciform transition portion 110-T indicates a crossing of the meridiem boundary, and fifth arciform transition portion 111-T indicates a crossing of the date boundary). The integral transition indicators link the initial portions with the final portions by being connected between the two.

Figure 7:
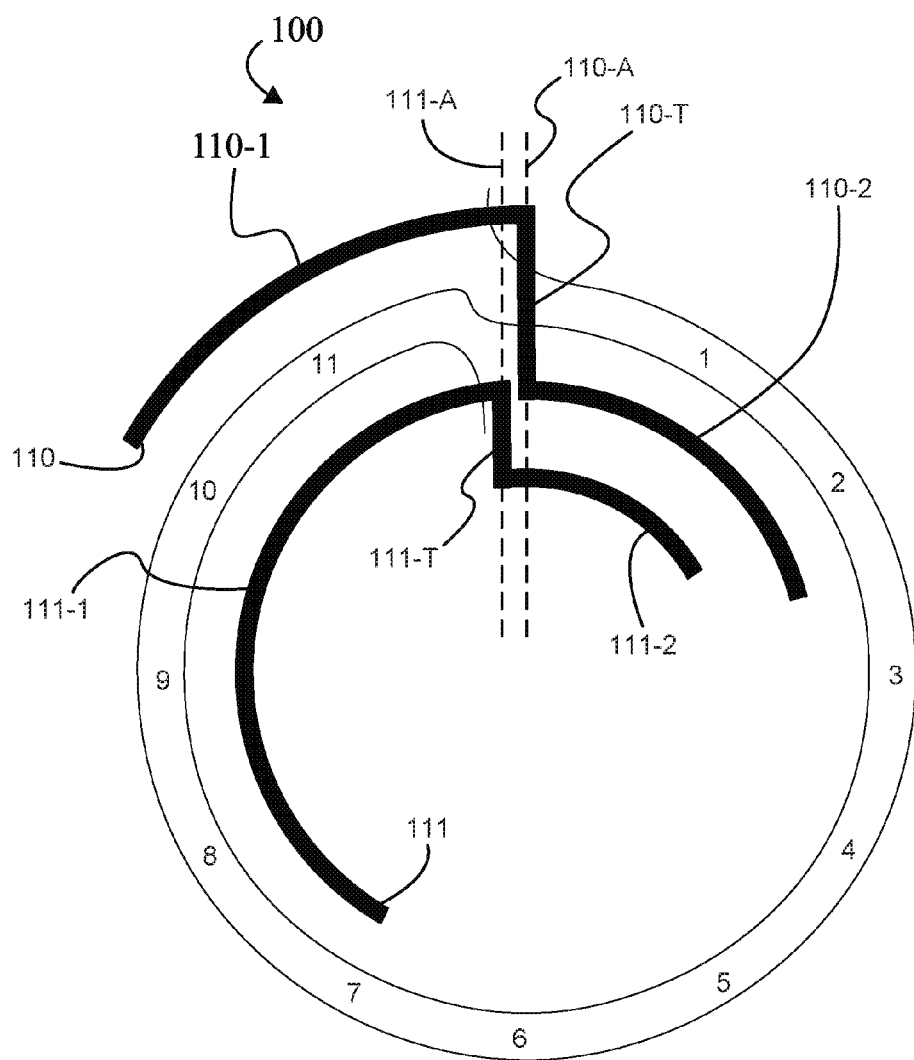
FIG. 7 is a schematic diagram displaying an alternative to the embodiment shown in FIG. 6.

FIG. 7 shows an alternative to the embodiment shown in FIG. 6. In FIG. 7, the fourth arciform transition portion 110-T and fifth arciform transition portion 111-T do not have smooth curves at each connecting end, but, rather, have sharp bends. Using a sharp bend, however, raises the possibility of an intersection of the transition portions of different arciforms, creating confusion. In the example in FIG. 7, fourth arciform 110 and fifth arciform 111 both have transition indicators. A possible intersection exists at the junction between fourth arciform transition portion 110-T and fourth arciform final portion 110-2, and the junction between fifth arciform initial portion 111-1 and fifth arciform final portion 111-T.

To avoid the possibility of an intersection, in one example, the transition portions are offset. In FIG. 7, the fourth arciform transition portion 110-T follows a fourth arciform radial axis 110-A. The fifth arciform transition portion 111-T follows a fifth arciform radial axis 111-A. Fourth arciform radial axis 110-A is offset from fifth arciform radial axis 111-A by enough to avoid an intersection between the two transition indicators, and thereby eliminating a potential ambiguity. In other words, the respective value of the fourth arciform radial axis 110-A differs from the respective value of the fifth arciform radial axis 111-A.

In other examples, the discrimination between overlapping transition indicators is accomplished by variation in the transition area depiction including, without limitation, different textures, patterns, or colors. Stacked events are also handled by adjusting for visual clarity.

Figure 8:
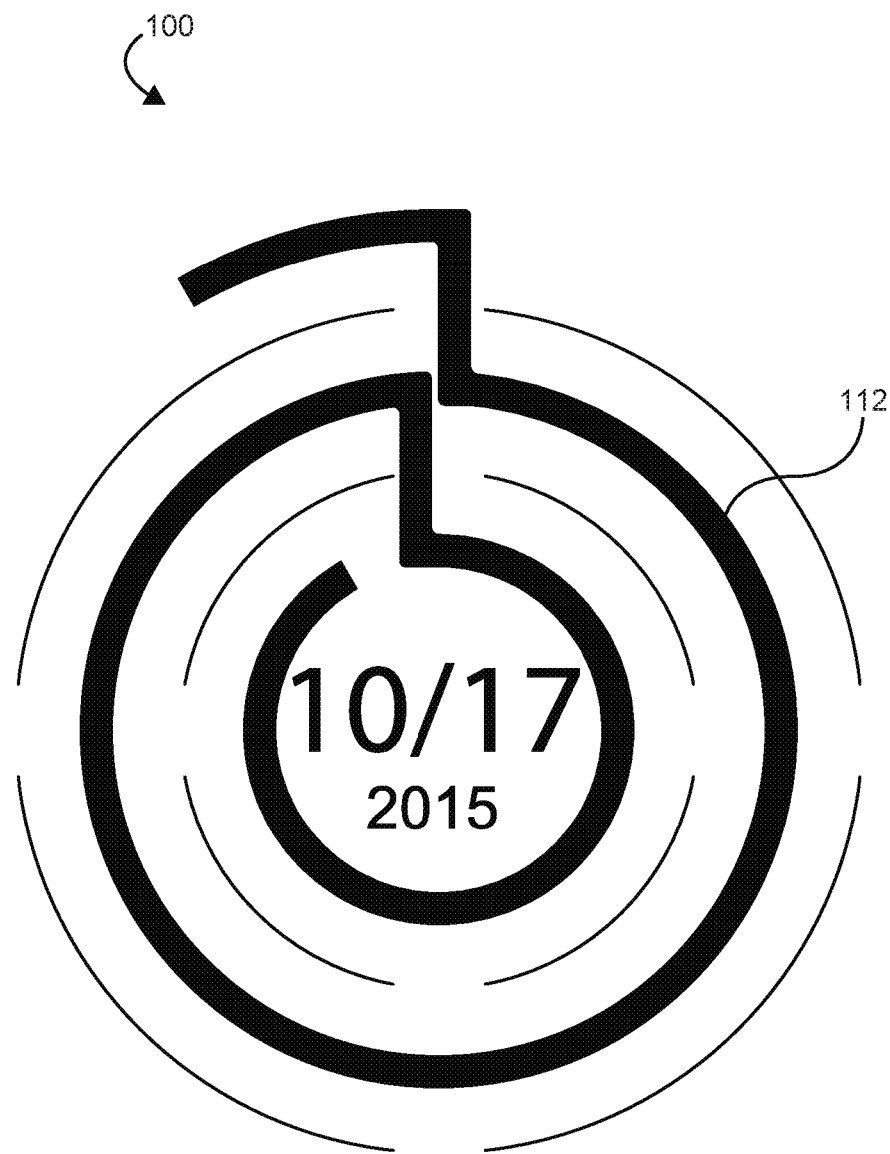
FIG. 8 shows an example of displaying an event with a duration of 24 hours.

FIG. 8 depicts a sixth arciform 112 corresponding to a sixth event. The sixth event begins at 11 a.m. on one day and ends twenty-four hours later at 11 a.m. the following day. The sixth arciform 112 has a start point in the a.m. events region 101 and an end point is in the following-day events region 103. The sixth arciform 112 has two boundary-crossing transition indicators: a first boundary-crossing transition indicator between the a.m. events region 101 and the p.m. events region 102, and a second boundary-crossing transition indicator between the p.m. events region 102 and the following-day events region 103. The sixth arciform 112 is regioned in accordance with its duration, namely, it appears in all three regions relevant to it. Except for the two boundary-crossing transition indicators, the parts of the arciform are concentric.

Figure 9:
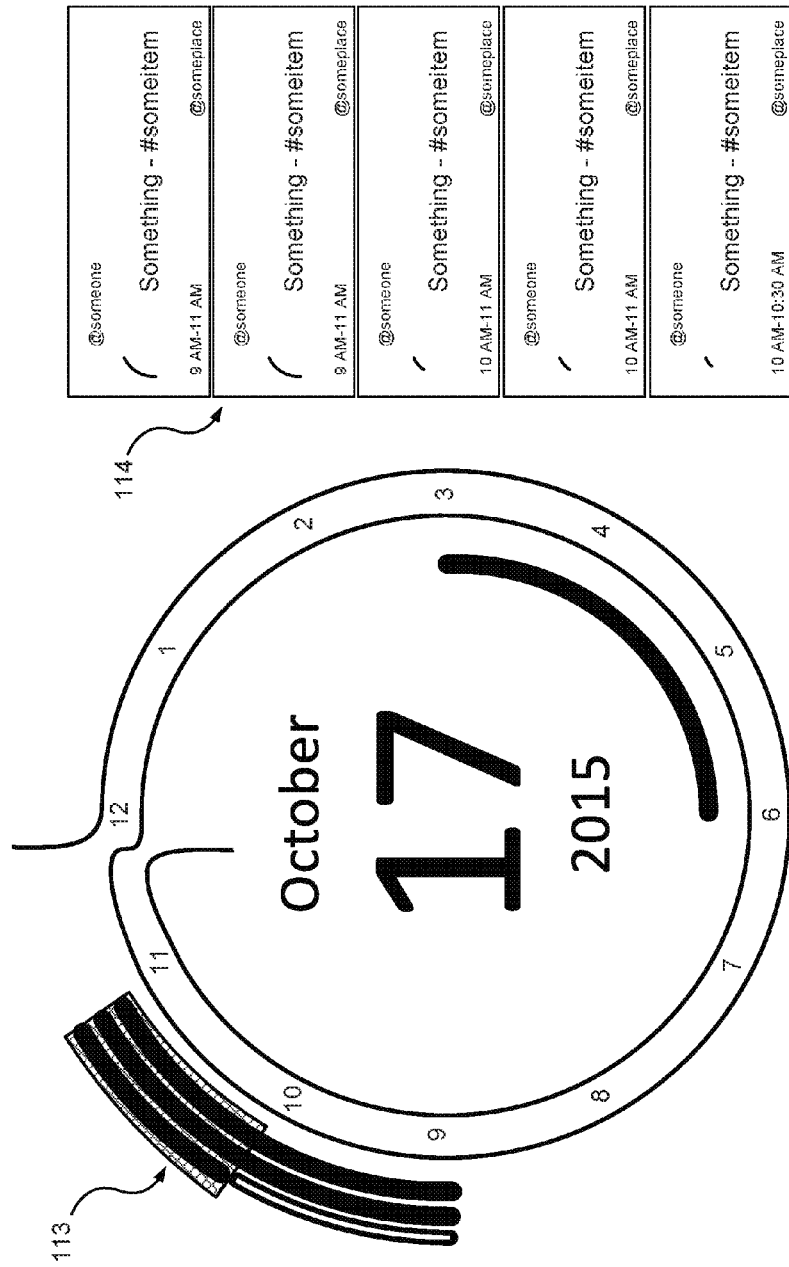
FIG. 9 is a schematic diagram displaying an example of an embodiment of FIG. 2 with a time during the day where more than three tasks are scheduled.

FIG. 9 is a schematic diagram displaying an example of an embodiment of FIG. 2 showing several events scheduled at the same time. In this instance, the arciforms representing the several events are stacked, up to a stacking threshold. In this example embodiment, the stacking threshold is a predetermined threshold of three events, meaning that displaying more than three events results in visual overcrowding of the display. In various example embodiments, the threshold is determined beforehand, is set according to user preferences, and is determined dynamically by way of taking into account arciform width and clockface size. In the FIG. 9 example, three overlapping arciforms, corresponding to events, stack up and fill the entire region (in this instance, the a.m. events region 101). Any subsequent events during that timeframe are consumed (i.e., not separately displayed) and the existence of such "overflow" events is represented by a larger object such as encompassing object 113. Encompassing object 113 in the example of FIG. 9 is a wide, hatched arciform that encompasses the overlapped span of time and indicates to the user that more events exist than can be adequately displayed. In other examples, encompassing object 113 has a different graphic form, different texture, different pattern, or different color. In an example, interacting with encompassing object 113 is responded to by computer system 12 by displaying a list of events 114. Using a stacking threshold improves performance of the electronic time measuring device by avoiding the expenditure of CPU cycles to render arciforms that would otherwise be displayed, and by not committing any further memory to maintaining the display of such overflowed arciforms.

List of events 114 is chronologically ordered, in one example, and includes additional display information such as the host/owner of the event, the start and end times, a description, and additional information such as relevant posts. In other examples, list of events 114 is displayed in response to other interactions such as selecting a specific date among other dates. Selecting a specific date among other dates is shown, in one example, in FIG. 1. List of events 114 is, in other examples, sorted in other orders including by host, by description, by suggestion of computer system 12, or by selection filtering according to user-supplied criteria.

Individual event display areas within the list of events 114 are selectable to display additional detail about the event, in an example, including host specified data, sub-events, or any related posts by invitees or other interested users to include at least comments, pictures, audio, or videos. Relevancy of posts in various examples is determined by the host, other users, or the site through analytics of time, geolocation, metadata, and/or other parameters. In another example, events are selected to modify, move, delete, share the event or any action related to interacting with the event.

Figure 10:
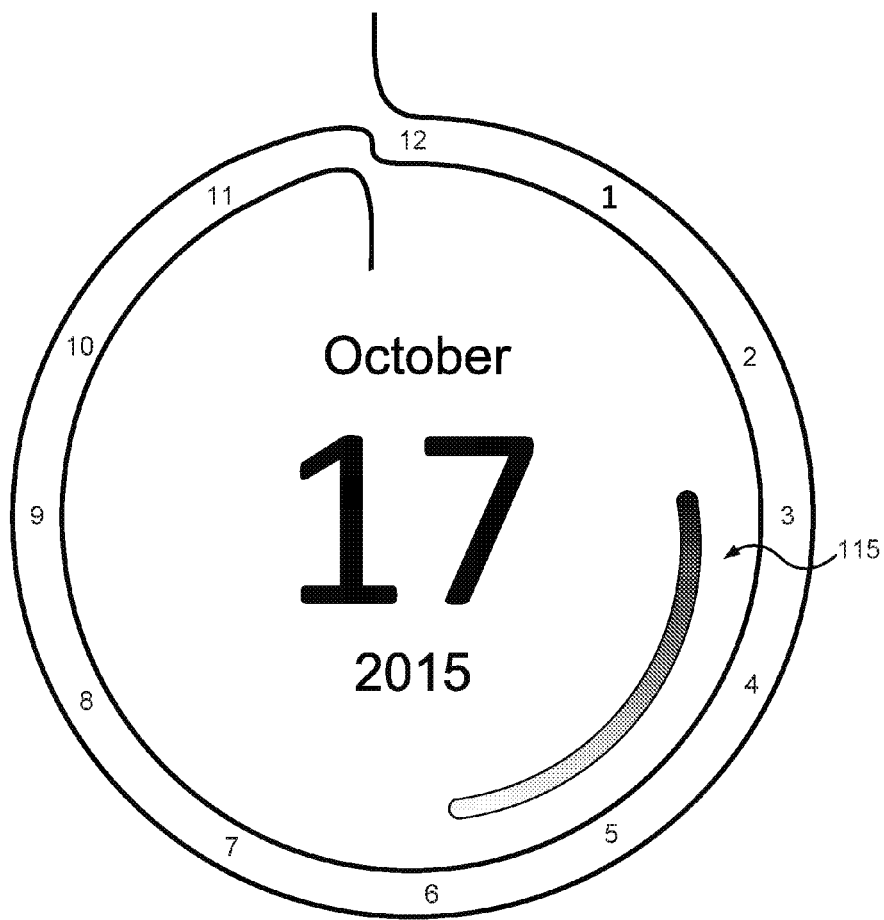
FIG. 10 is a schematic diagram showing an example of an embodiment of FIG. 2 with an event with a non-specific end time.

FIG. 10 is a schematic diagram displaying an example of an embodiment of FIG. 2 with an event with a non-specific end time. Seventh arciform 115 in FIG. 10 corresponds to a seventh event that begins at 3:00 p.m., lasts for at least an hour, but after an hour has passed has no definite end time. As an indicator that the seventh event has no set end time after the passage of an hour, the seventh arciform 115 is provided with a gradient portion that transitions to transparency. In other examples, the indication of an indefinite time value is implemented using a different graphic, symbol, pattern, or color. In one example, the indication of an indefinite time value is implemented as a broken or dashed arciform line portion. In another example, the indefinite time indicator is an arciform that diminishes progressively in width.

Figure 11:
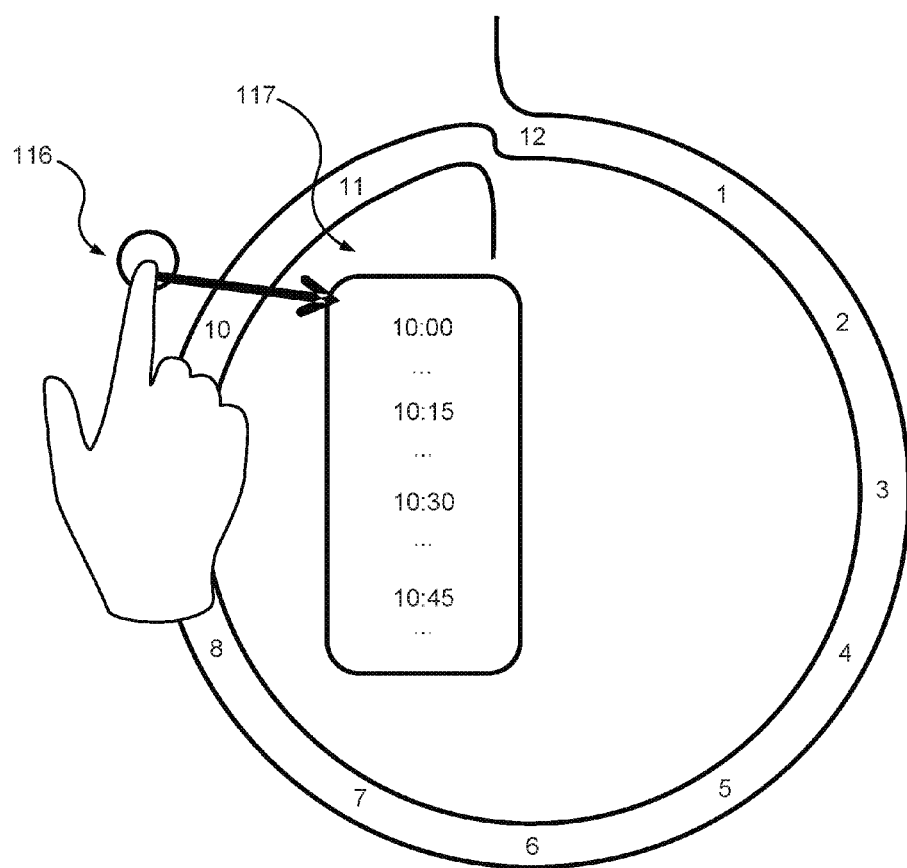
FIG. 11 is a schematic diagram showing an example of an embodiment of FIG. 2 where a user selects a portion of the clockface to input an event.

FIG. 11 is a schematic diagram displaying an example of an embodiment of FIG. 2 where a user selects an area of clockface 100 (in this example, the selection begins in the a.m. events region 101 near the 10:00 position) to begin creation of an event. The computer system 12 in this example responds to the depicted initial selection 116 by displaying a time refinement control box 117 so the start time of the new event is conveniently selectable. In another possible example, computer system 12 responds to the initial selection 116 by creating a task based on system or user defaults.

Users enter a task by an interface to include at least touch, voice, text, gesture, or sight. To allow for a more fine-tuned selection, the display of a region that is being interacted with, in one example, enlarges for a zoom effect. In another example, interaction with a region results in the display of another interactable area. Selection of a particular time, in an example implementation, creates a task with a task duration. The task duration is, in example embodiments, a predefined duration, a default duration, or a task duration with one specific time (start or end) and one ambiguous time (start or end). The times selected are subsequently modifiable by the user. In one example, upon entry of a time parameter, an interactable area is be displayed to allow for more input of details about the task being entered possibly including task/event name, type, address, geolocation, building, room, pictures, animation, audio, video, tags, and/or any metadata about the task/event. In an example, any event details are automatically populated based on location of the user, time of day, invitees, user tendencies, recommendations from other users or analytics of user data.

In one example implementation, activities are scheduled by a scheduler among one or more individuals or groups over one or more dates and one or more times. In another example, activities are scheduled on a periodic basis to include at least: daily, weekly, monthly, annually, day of the week. Activities also include schedulable of sub-activities.

In one example implementation, activities are scheduled by a quick meeting function. The function creates an immediate task with minimum input and send a notification to groups or individuals based on user preference. A tentative task is added to each group or individual's calendar.

In an example embodiment, users accept, decline, cancel, or tentatively accept any event visible to them. In another example embodiment, users recommend or invite other users or groups to events. In a further example embodiment, users search for or are recommended events from at least other communities of interest, groups, automated analysis, businesses, and/or locales. In yet another example embodiment, users highlight one or more events or dates by an indicator to show significance.

In an example implementation, calendars and tasks have privacy settings to display or hide events, certain event information or entire calendars from friends, friends of friends, site user base, and/or the public. Privacy settings entirely hide or partially display events, event details, location. Privacy settings are settable to hide users from other users. In an example embodiment, users also set who has control over modification of events, event information, and calendars.

Figure 12:
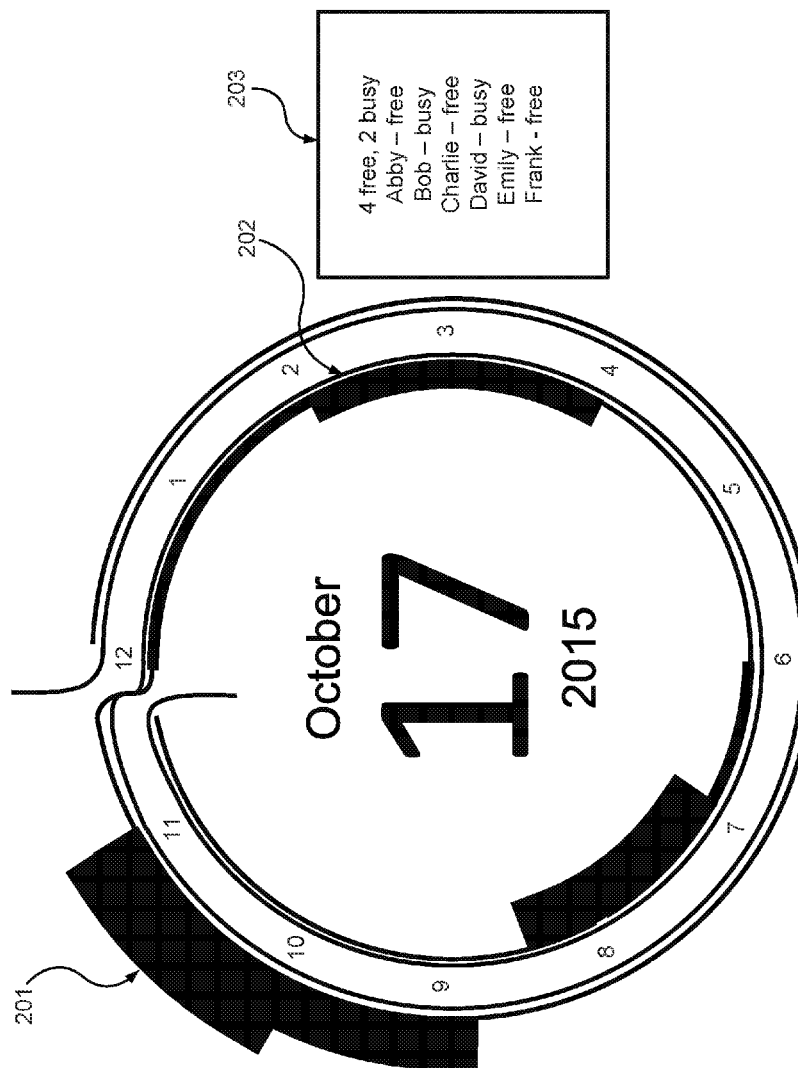
FIG. 12 is a schematic diagram displaying an example of an embodiment of FIG. 2 with an aggregation of calendars of multiple users where the bars' thickness varies based on users' availability.

FIG. 12 is a schematic diagram displaying an example of an embodiment of FIG. 2 with an aggregation of events from calendars of multiple users. In the example of FIG. 12, each arciform has a thickness proportional to the number of users with events during the time spanned by the arciform. In this example embodiment, an arciform has a portion pertaining to a given time range, and the respective portion width is proportional to some data value pertaining to the given time range.

For example, eighth arciform 201 has the greatest width because the largest number of the multiple users have events planned during 10:00 to 11:00 a.m. Ninth arciform 202 is narrower than eighth arciform 201, and this relatively narrower display of ninth arciform 202 means that fewer of the multiple users have events planned between 2:00 and 4:00 p.m. than during 10:00 to 11:00 a.m. In an example, selecting a given time range, such as by touching the ninth arciform 202 on a device such as ETMD 10, causes the computer system 12 to display a multiple user display region 203. In this example, whether users are busy or free is shown in user display region 203.

In an example implementation, when scheduling activities through an aggregated view, instead of stacked lines, the clock display shows lines having widths that vary according to the number of individuals or groups with activities scheduled during the corresponding times. Interacting with the interface results in a display that shows how many individuals or groups have activities already scheduled or are free for a particular time, or any additional information. In an example implementation, the user scheduling an event selects any number of times or dates to propose for an event. Invitees indicate which timeslots they would accept or decline, and the scheduler determines the appropriate times for the event.

In another example implementation, the line widths vary according to data specified by the user to show data over time, in cases including crowd size, resource utilization/availability, or cash flow. Depending on the amount of data available, a smooth line similar to a line graph displays data to a finer precision. Displaying information radially in this manner allows for the user to view information to make scheduling decisions, as well as scheduling activities on the same interface. Displaying information in this manner (i.e., to have a portion of an arciform pertaining to a given time range with a respective portion width proportional to a data value relating to the given time range) saves processing cycles and reduces the requirement for the use of memory by eliminating the need for two separate interfaces: a graph depicting information over time, and an interface to schedule activities.

Users, in an example implementation, create and manage multiple calendars. In example embodiments, users also administer each other's calendars based on permissions. In an example embodiment, calendars are imported from other users, external sites or databases and are exported to other users, external sites, or databases.

Users, in an example implementation, create groups of other users to enable them to at least merge calendars, invite groups easily, for metrics, or other purposes. Groups are edited by any user with sufficient permissions. In another example implementation, groups are formed of other groups. In yet another example, groups share tags, location information, and other metadata.

Users, in an example implementation, indicate interest or, in another example implementation, block other users, groups, communities of interest, businesses, or locales.

The number of permitted details of an event and the association of posts related to an event are, in an example implementation, modifiable by the host or users with sufficient privilege.

In an example implementation, users elect to be notified before any event and receive a selectable number of reminders. In another example, the timing of the reminder is user selectable. Events, in one example, are configurable to notify invitees in advance.

Figure 13:
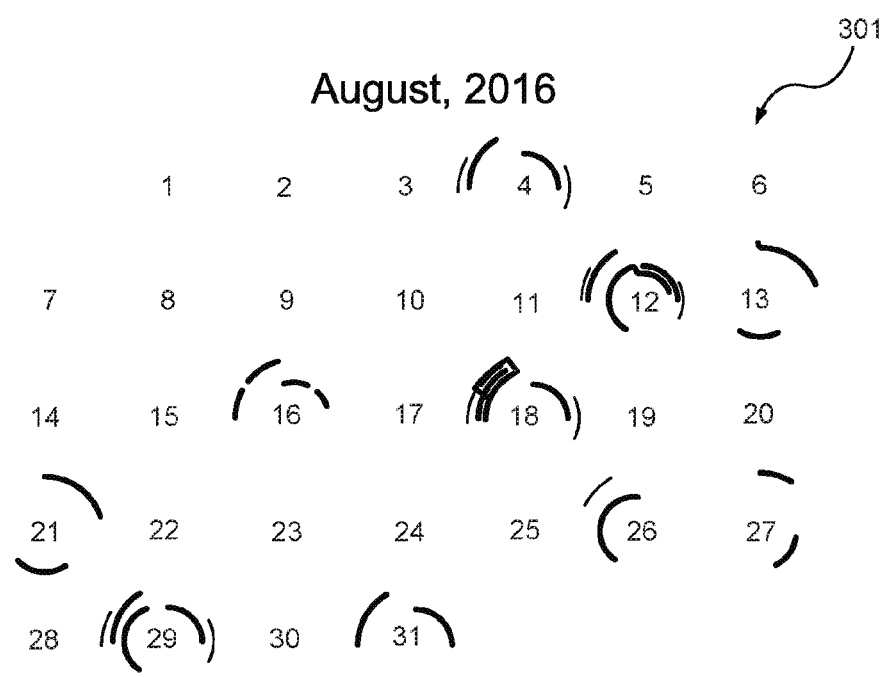
FIG. 13 is a schematic diagram of a month view displaying an example of many embodiments of FIG. 2 with schedules of every day with scheduled events.

FIG. 13 is a schematic diagram of a month view 301 displaying an example of multiple embodiments of FIG. 2 with various schedules of every calendar day with scheduled events shown over calendar dates. Here, the user interface provides for a clockface at each day where events are scheduled. In other words, the user interface has second through n-th clockface displays, each corresponding to a different calendar day of a month, superimposed over a calendar of the month, where n is the number of days for that month. In an example, each date is selectable to show additional information. In an example, selecting one of the dates results in a display as shown in FIG. 1. In other examples, different periodicities are shown, as in a week, a month, a particular day over time, etc.

Figure 14:
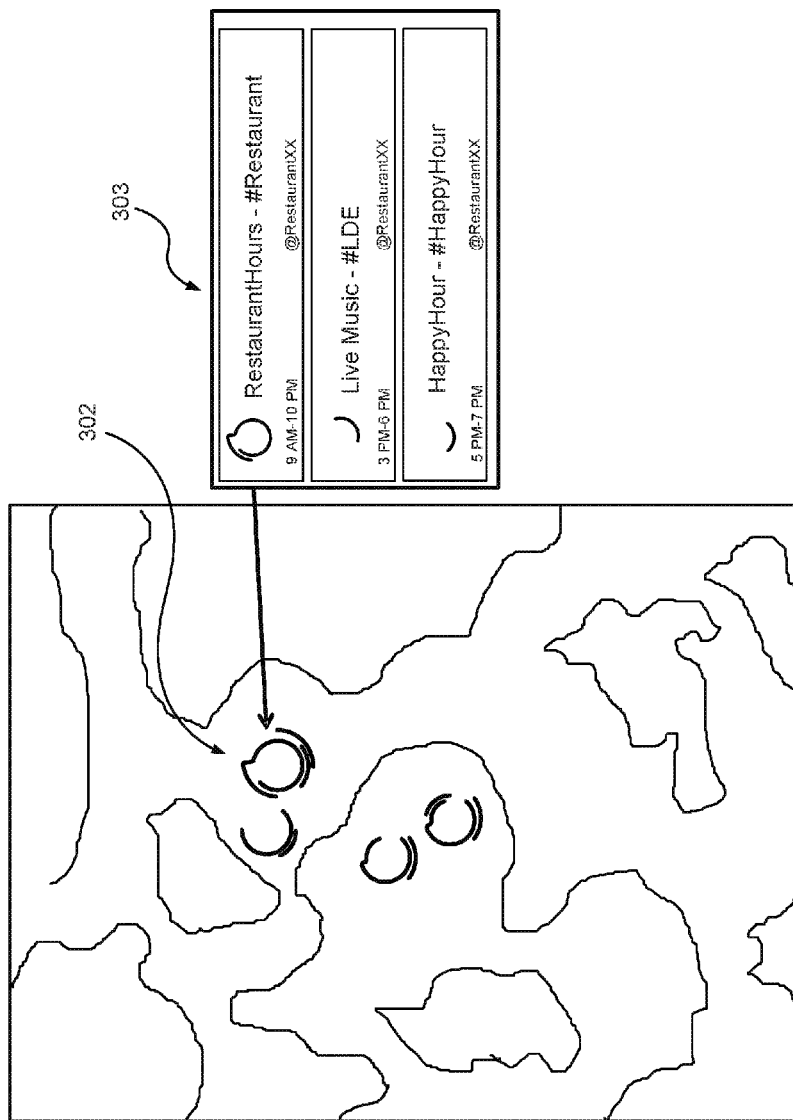
FIG. 14 is a schematic diagram of a map view displaying events.

FIG. 14 is a schematic diagram displaying an example of multiple embodiments of FIG. 2 overlaid upon or superimposed over a map, with clockfaces displayed over corresponding points of interest 302. Each of the clockface displays corresponds to a respective geographic location of the map, and each is selectable to display point of interest information 303.

In this example, a clock face displaying the day's events is displayed superimposed on a map, heads-up display, augmented reality, or virtual reality over any number of locations to display the events at those corresponding locations. In an example, a location is selected, and responsive to such a selection by displaying the events scheduled at that location. The locations displayed are, in an example, filtered or searched for through text, metadata, visual, geolocation parameters, users, and/or time parameters.

Figure 15:
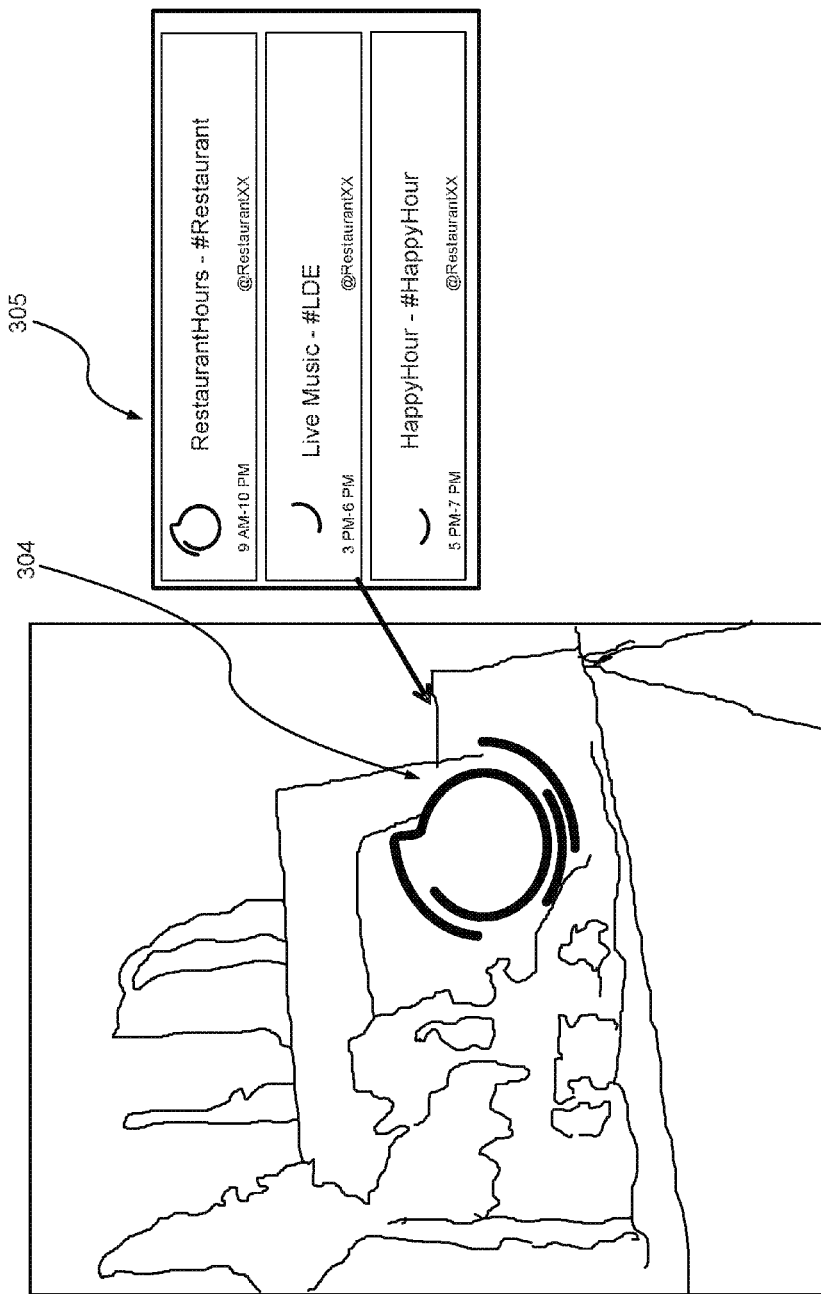
FIG. 15 shows an example of an overlay for augmented reality or street view applications.

FIG. 15 is a schematic diagram displaying an example of an embodiment of FIG. 2. In FIG. street view schedule 304 is displayed over an augmented reality background showing a location or point of interest. The street view schedule 304, in this example, is selected to display additional information 305. The locations displayed are, in this example, filtered or searched for through text, metadata, visual, geolocation parameters, users, and/or time parameters. Alternatively, FIG. 15 is a schematic diagram displaying an example in which street view schedule 304 is displayed over a virtual reality point of interest. In this instance, the background is entirely computer generated.

Figure 16:
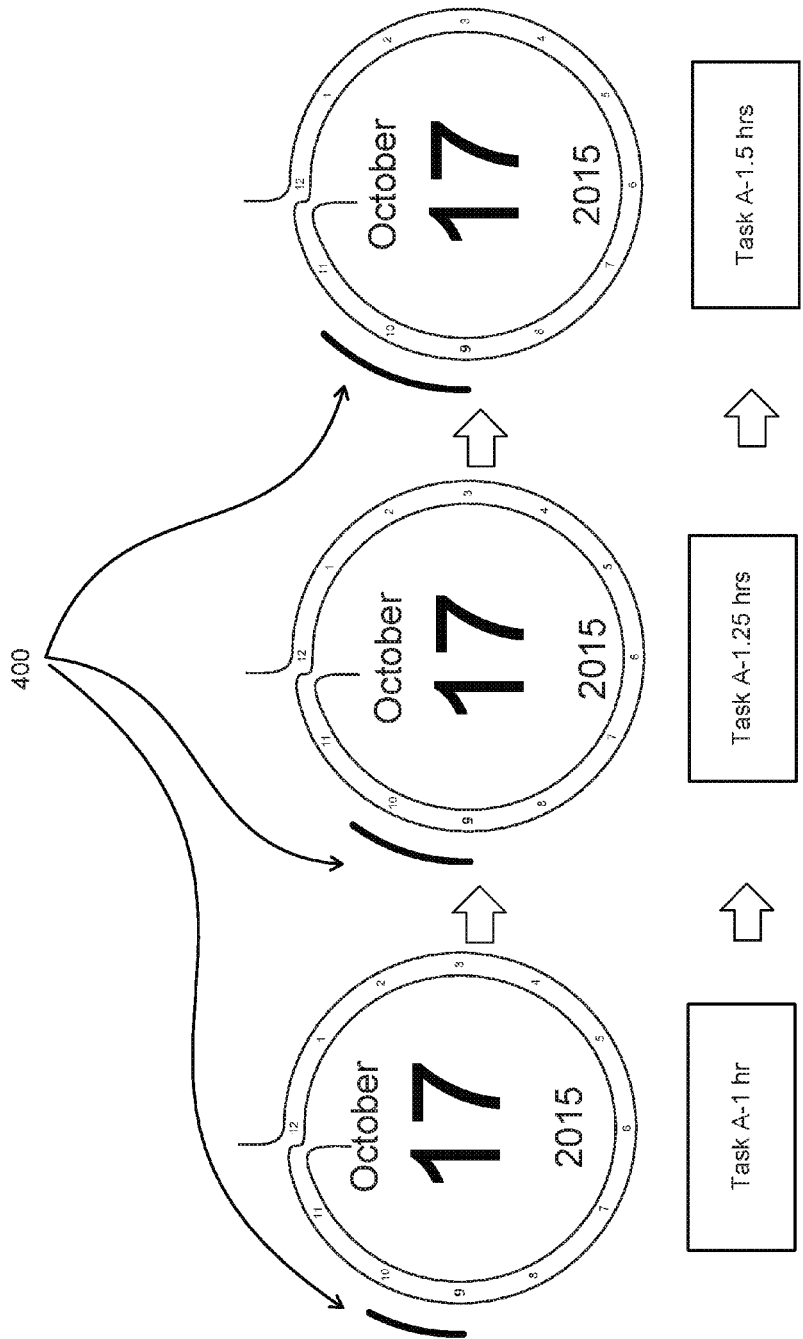
FIG. 16 shows an example of dynamic tasks which grow with time.

FIG. 16 displays an embodiment of FIG. 2 where an arciform for an event maintains the same start time and grows with the time spent on the event. In FIG. 16, tenth arciform 400 represents an event that is a user activity, or task. For example, tenth arciform 400 grows over time from 1 hour in duration to 1.5 hours in duration, with the start time at 9 a.m. and the initial end time at 10 a.m. which shifts to 10:30 a.m. as user activity or task is being completed. In another example implementation, arciforms shrink when a task is not started in time and has a strict deadline or end time. In yet another example implementation, the entire arciform shifts when the duration is a fixed time, but the start and end times vary.

Figure 17:
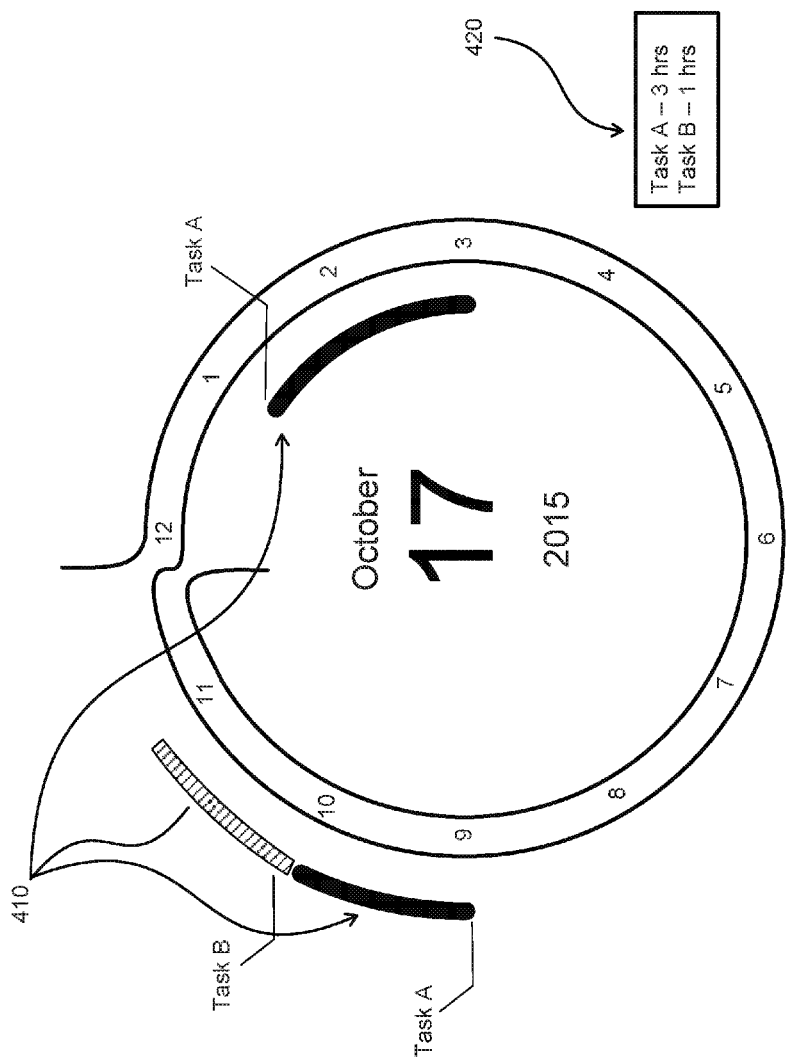
FIG. 17 shows an example of events displayed using discriminating indicia.

FIG. 17 displays an embodiment of FIG. 1 where eleventh arciforms 410 representing different tasks are differentiated in a display by various colors, textures, sizes, or patterns. The total time spent on a task, to which one of eleventh arciforms 410 corresponds, for a particular date or set of dates, is displayed in this example. For example, Task A spans the times from 9:00 a.m. to 10:00 a.m. and 1:00 p.m. to 3:00 p.m. and Task B spans 10:00 a.m. to 11:00 a.m. A task summary box 420 displays the total duration of Task A as 3 hours and Task B as 1 hour.

Figure 18:
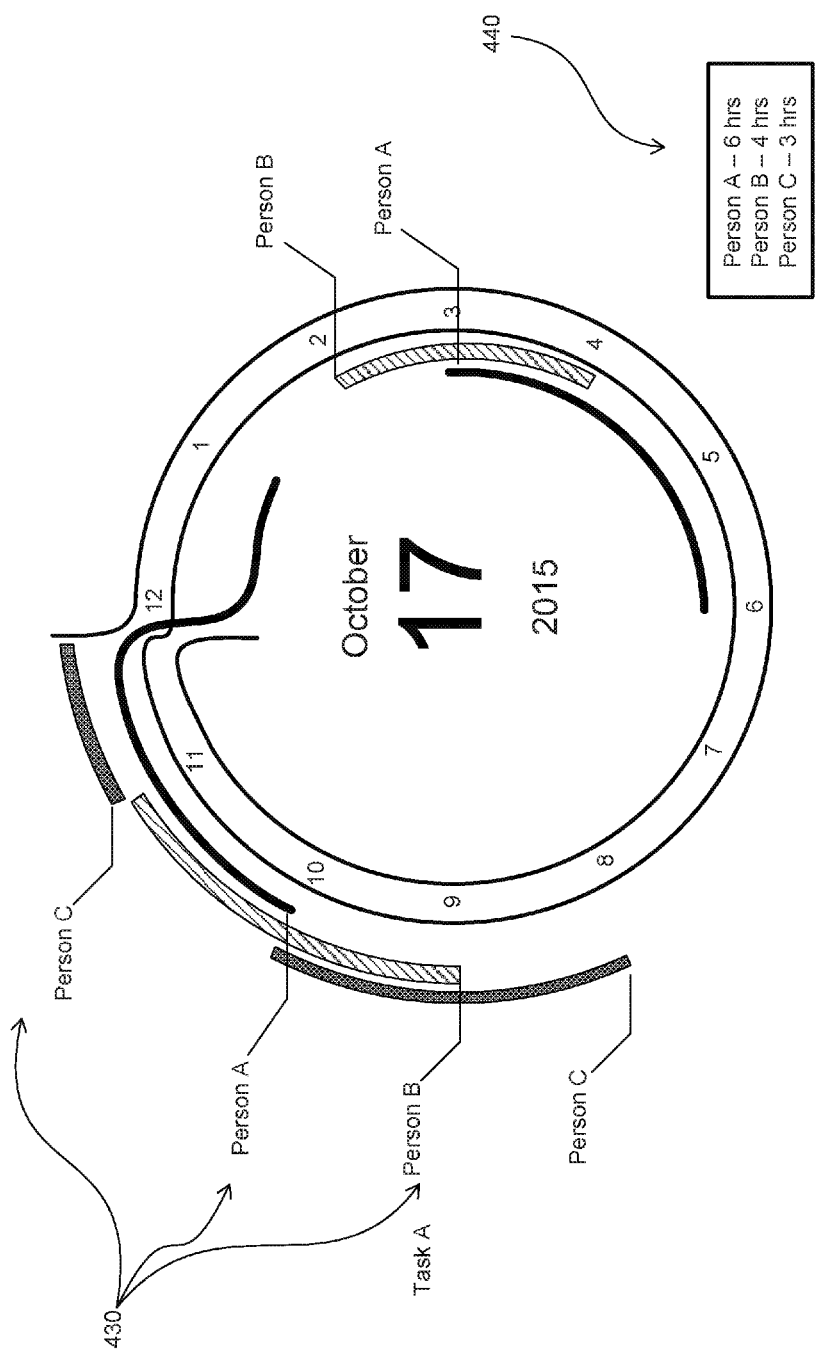
FIG. 18 shows an example of different users' tasks on one display where users' tasks are differentiated with discriminating indicia.

FIG. 18 displays an embodiment of FIG. 2 where twelfth arciforms 430 represent tasks for multiple, individual users are shown on one display. Each user's tasks are displayed differently by varying the color, texture, size, or pattern of the corresponding one of the twelfth arciforms 430. In one example, the total time spent on tasks by users is displayed in a multiple user task summary 440. The multiple user task summary 440, in one example, shows the total time broken down in various ways to include by task, by user, by user and task, or by task and user. For example, Persons A, B, and C each have a single task for the same date being completed at two non-contiguous times. The tasks for each user are summed and displayed in the multiple user task summary 440. Person A's tasks from 10:00 a.m. to 1:00 p.m. and 3:00 p.m. to 6:00 p.m. are summed to show 6 hours. Person B's tasks from 9:00 a.m. to 11:00 a.m. and 2:00 p.m. to 4:00 p.m. are summed to show 4 hours. Person C's tasks from 8:00 a.m. to 10:00 a.m. and 11:00 a.m. to 12:00 a.m. are summed to show 3 hours.

Figure 19:
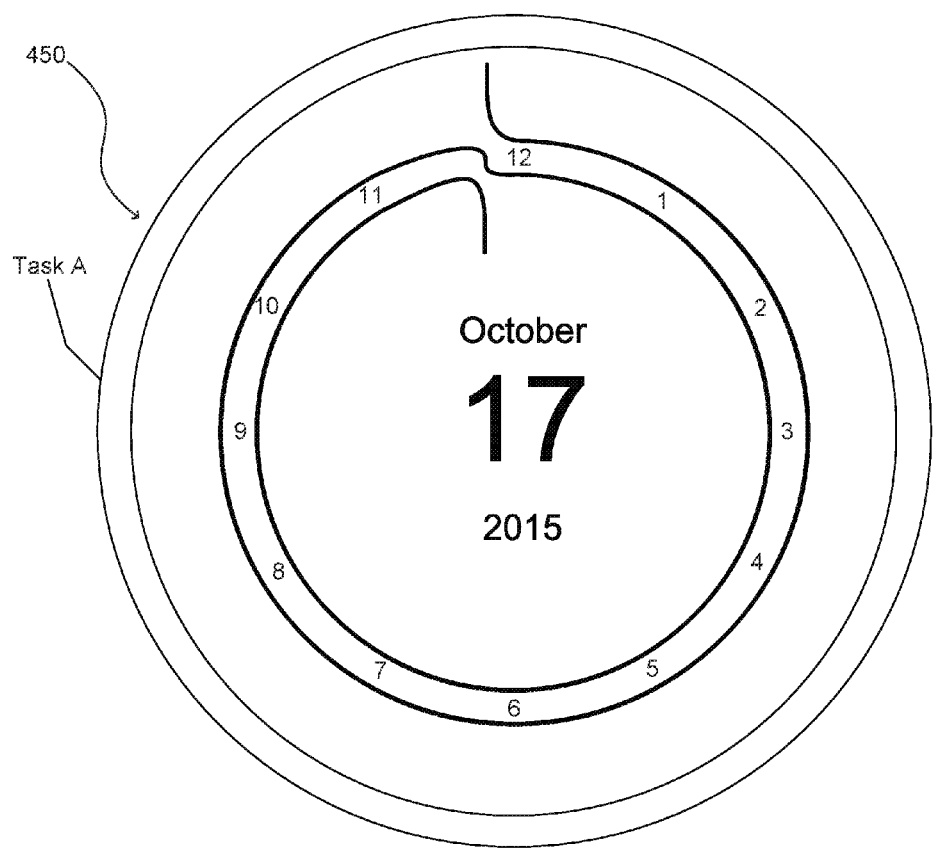
FIG. 19 shows an example of an all-day task represented by a circular arciform encompassing a region.

FIG. 19 displays an embodiment of FIG. 2 where a thirteenth arciform 450, representing an all-day task, encompasses an entire region. This deviation in display functionality is justified since all-day tasks are more conceptual than literal. For example, Task A represented by thirteenth arciform 450 is an Out of Office event displayed as a complete circle in the a.m. events region. The Out of Office event is a conceptual event which, in one embodiment, applies only to the times corresponding to the user's work hours and not to the user's entire day.

Figure 20:
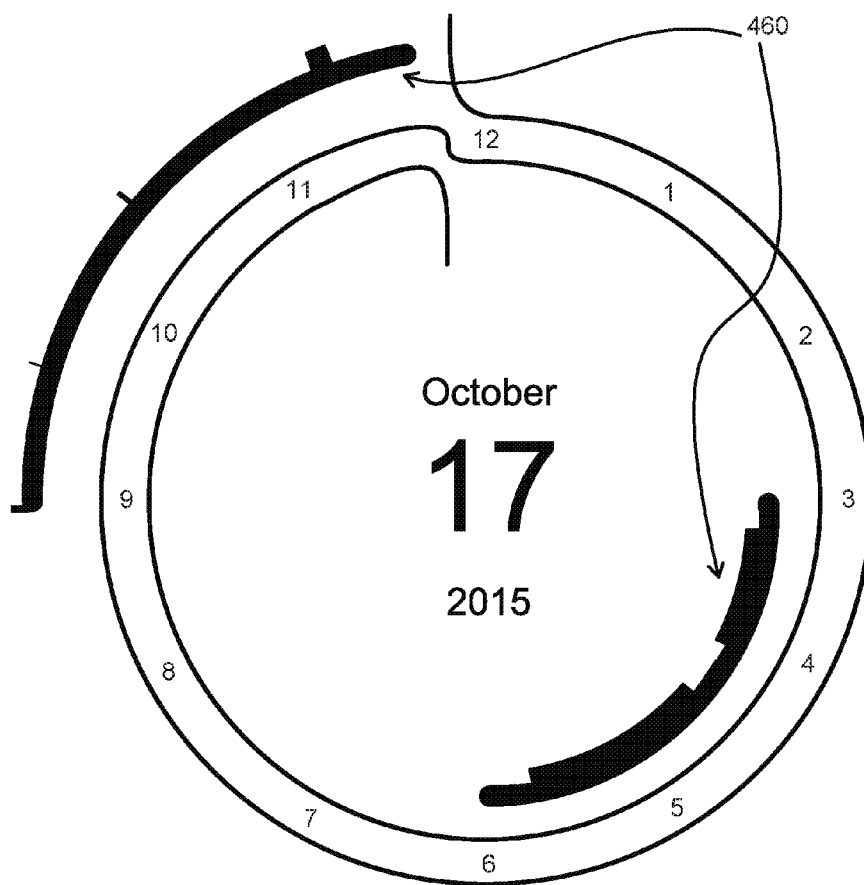
FIG. 20 shows an example of tasks with concurrent subtasks.

FIG. 20 displays an embodiment of FIG. 2 where fourteenth arciforms 460 represent tasks with subtasks. The subtasks are indicated by a non-uniform area of the arciform, i.e., by different sizes, colors, textures, or patterns. For example, fourteenth arciforms 460 have subtasks which are represented by areas of the arciform with wider widths. In another example, subtasks are represented by areas of uniform width and with different colors, textures, or patterns representing different subtasks with transparent sections where no subtasks exist. Some example uses of subtasks are items such as pit stops during a race or breaks during a meeting. For a task represented by an arciform, therefore, FIG. 20 shows a display of the arciform extending in accordance with its overall task duration, and shows portions, each pertaining to a given subtask duration and having a respective appearance visually discriminating the respective subtask duration from the overall task duration.

Figure 32:
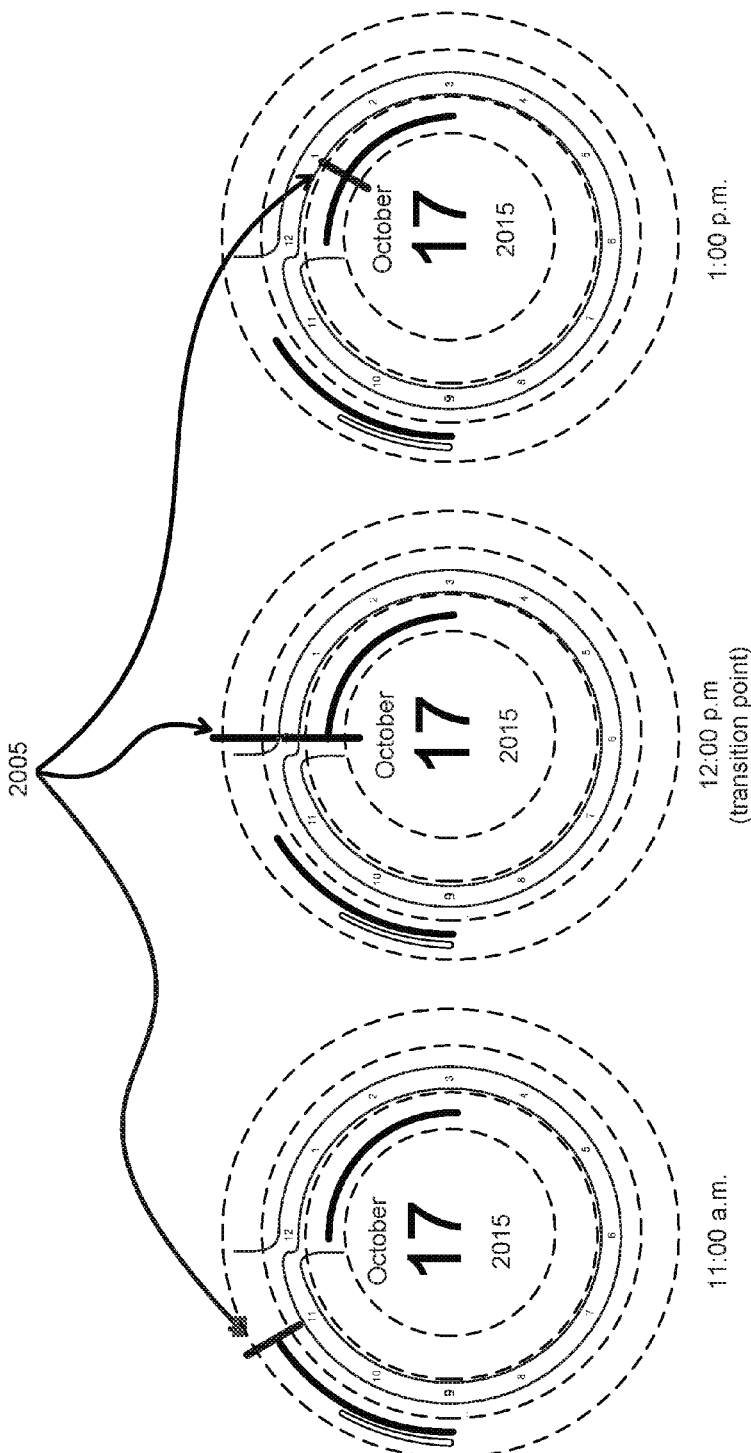
FIG. 32 is a schematic diagram showing an example of implementing FIG. 2 with a time indicator.

FIG. 32 displays an embodiment of FIG. 2 where a time indicator 2005 represents the current time on the clockface. The time indicator is drawn at the time similar to the hour hand on a traditional clockface, however, the indicator is shown explicitly over the 12-hour region corresponding to a.m. or p.m. of the time. For example, the time indicator at 11:00 a.m. is shown as a line spanning perpendicularly over the a.m. region. At 12:00 p.m. the time indicator is shown as a line spanning the a.m. region and the p.m. region of the same day to indicate a transition of time from one region to the other. At 1:00 p.m. the time indicator is shown as a line spanning the p.m. region.

Figure 33:
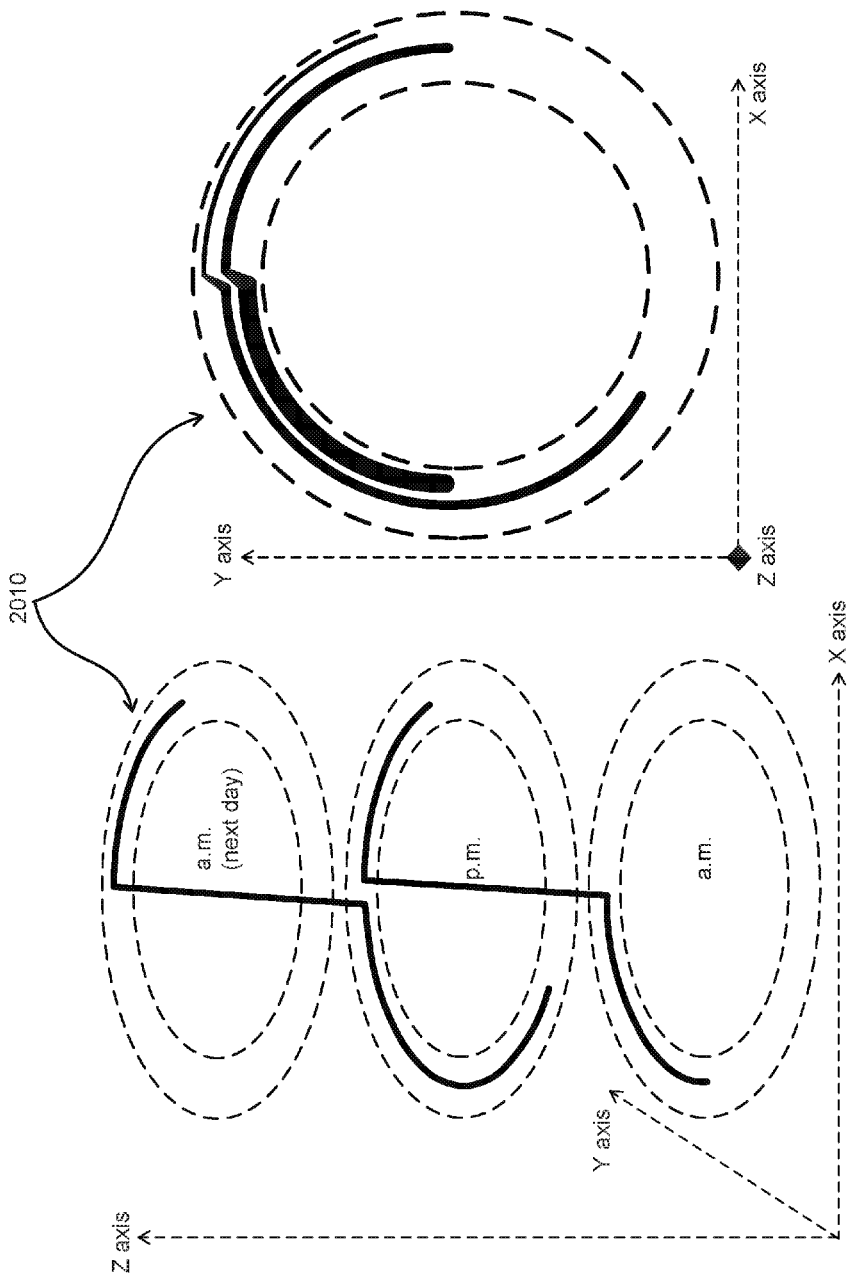
FIG. 33 is a schematic diagram showing an example of implementing FIG. 2 where regions are displayed in a three-dimensional plane.

FIG. 33 displays an embodiment of FIG. 2 where regions 2010 are displayed in a three-dimensional view. In an example implementation the regions overlap each other when viewed from the z-axis (right-hand side of FIG. 33). The z-axis refers to a direction or a dimension normal to a plane made by the x and y directions. Although the concentric regions appear nested when in the x- and the y-dimensions when viewed from the z-axis, they do not appear nested when viewed from other points of view. For example, in the left-hand side of FIG. 33, the concentric regions do not appear nested in the z-dimension, but in the right-hand side of FIG. 33, the regions appear in separate planes. In other words, one of the regions is in one plane and a different one of the regions is in a different plane. For three-dimensional displays, the concentric regions are nested with respect to each other in fewer than three dimensions. In other words, the regions share a common center along the z axis.

In another example implementation, regions do not have to overlap, or be the same size, but must be concentric in at least one axis. When viewed from a three-dimensional capable device, regions farthest away appear smaller (that is, the user interface displays the regions with different respective sizes). The size, color, pattern, or texture of arciforms vary from region to region to allow for the viewer to easily distinguish arciforms of different regions. In an example implementation in FIG. 33, at 9:00 a.m. activities closest in time, such as the a.m. region of the current day is displayed as a thick arciform. Activities of the next region, the p.m. region are displayed by an arciform of medium thickness. Activities of the following region, a.m. of the next day, is shown by a thin arciform. In another example implementation, additional regions are displayed showing multiple days. In yet another example implementation, the region closest to the viewer changes based on the time, where past regions seemingly disappear out of view and future regions appear into view.

Figure 34:
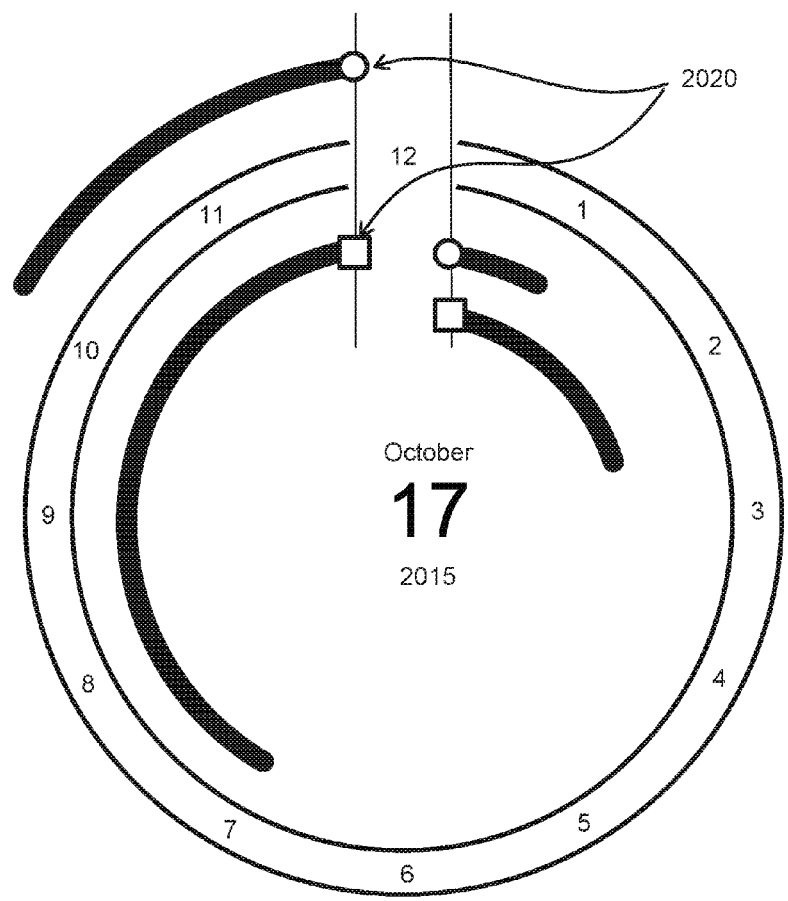
FIG. 34 is a schematic diagram showing an example of implementing FIG. 2 where arciforms indicate transition points though having disjointed, non-contiguous lines.
Figure 36:
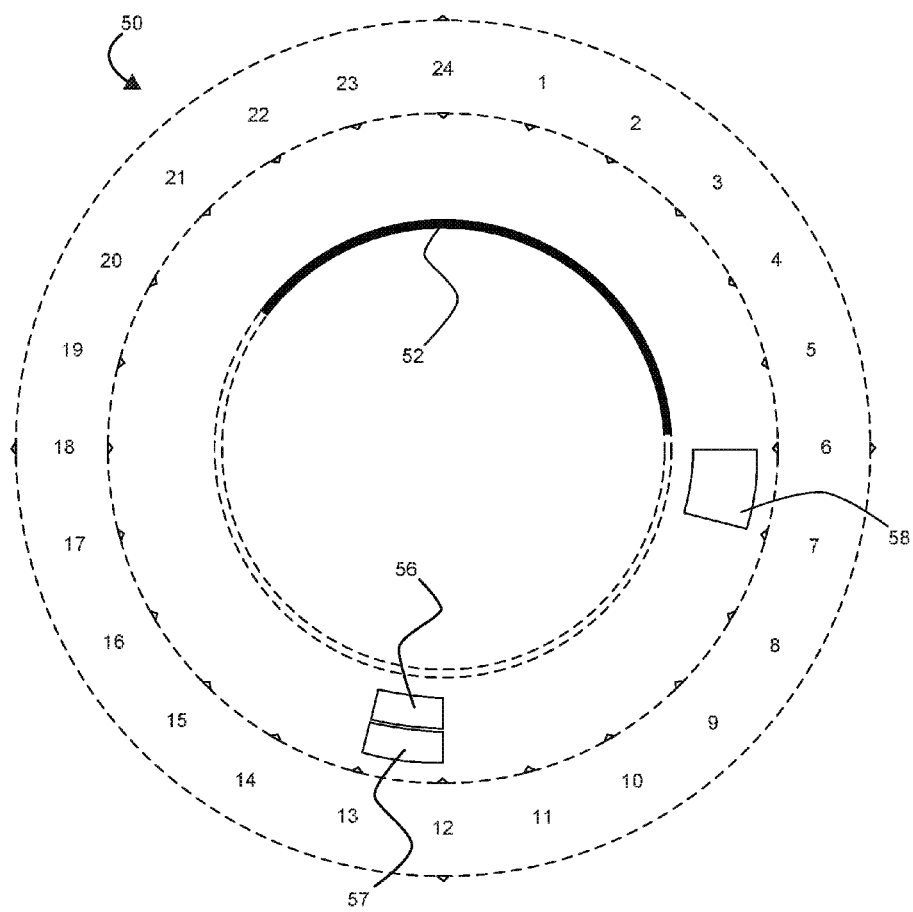
FIG. 36 depicts a known approach to indicating the time of duration of planned events using arciforms.

FIG. 34 displays an embodiment of FIG. 2 where arciforms indicate transition points while maintaining non-contiguous, disjointed lines (2020). In other words, the integral boundary-crossing transition indicators in FIG. 34 are spaced pairs of matching elements (in this example, hollow geometric shapes) that link an initial portion of an arciform with the final portion of the arciform. The matching elements are spaced pairs in that space separates the pair of elements. For the event that begins at 10 a.m. and ends at 1 p.m., the integral boundary-crossing transition indicator is a spaced pair of hollow circles. For the event that begins at 7 p.m. and ends at 2:30 a.m. the next day, the integral boundary-crossing transition indicator is a spaced pair of hollow squares. In other example implementations, transition indicators are provided through a spaced pair of matching elements such as pairs of symbols, pairs of colors, pairs of textures, pairs of patterns, pairs of gradients, or the like.

Example Application Programming Interface (API)

A partial API suitable for implementing the above-identified embodiments is now described. This API is provided for instruction and as an example, and not by way of limitation. It is to be understood that the example API represents an algorithm for implementing the subject matter of the invention. The example API is implemented, in one example, in software. In other examples, the API is implemented in hardware. In still other examples, the API is implemented partly in hardware and partly in software.
Interfaces

TABLE ONE

| Interface | Permissions | Instances | Comments |
|---|---|---|---|
| Aggregation Database | Read/Write | 1 | The main API database which stores Events, Event details, and related Social media posts, per user aggregated from the Calendar and Social Media Databases |
| Social Media Databases | Read (Required)/ Write (Optional) | 1 . . . n | Databases from sites such as Facebook, Twitter, Instagram, etc. |
| Calendar Databases | Read (Required)/ Write (Optional) | 1 . . . n | Databases from calendars such as Google Calendar, iCalendar, Outlook |
| User Database | Read/Write | 1 | API database stores all users of the API and their authentication info, and their authentication for external sites such as the Social Media and Calendar Databases if synced |
| Display | Write | 1 . . . n | The display for the system the API is being called from |
| Keyboard | Read | 0-1 | The Keyboard for the system the API is being called from |
| Pointer | Read | 0-1 | The Pointer for the system the API is being called from. A Pointer is required if touch input not available |
| Touch input | Read | 0-1 | The Touch input mechanism for the system the API is being called from |
| Data Processor | Read/Write | 1 | The Data Processor for the system the API is being called from including distributed and multi-core processing systems |
| Geolocation service | Read | 0-1 | The geolocation service such as GPS for the system the API is being called from |
| Map service | Read | 1 | A map service such as Google Maps, Apple Maps, NavQuest |
| Locations database | Read | 1 . . . n | Locations of interest read from Google Maps, Apple Maps, NavQuest |
| Camera | Read | 0-1 | The Camera for the system the API is being called from |
| Gyroscope | Read | 0-1 | The Gyroscope for the system the API is being called from |
| Speaker/Vibrator | Read | 0-1 | The Speaker or Vibrator for the system the API is being called from |

API Functions
Authenticate User

Input Arguments (string username, string password)
Output (boolean authenticationCheck)
The API shall take through Keyboard or Touch input a user's username and password and authenticate it based on the User data in the User Database.

Aggregate Event Data

Input Arguments (void)
Output (void)
The API shall combine, for each user read from the User Database, any event and associated metadata read from each user's associated and authenticated Calendar Databases with related Event data and Social media
posts read from each user's associated and authenticated Social Media Databases and write the aggregated results in the Aggregation Database. (This function is run periodically on a timer)

Aggregate Calendar Data

Input Arguments (string [0 . . . 1] username)
Output (void)
The API shall read, for each user read from the User Database, all Calendar Databases for all events and associated metadata that the user has authenticated to, perform deconfliction on calendar events, and write the resolved list to the Aggregation Database. (This function is run initially during account set up and then periodically on a timer. If no username is entered for the argument, the function will aggregate calendar data for all users in the User Database)

Auto Create Event Suggestion

Input Arguments (void)
Output (void)
A background service on the aggregation server would analyze Social media trends based on location. For users near that location, the API shall make a suggestion by utilizing the Speaker/Vibrator and drawing an alert on the Display. (This function is run periodically on a timer)

Create Event

Input Arguments (string username, int startDateTime, boolean startEstimateFlag, int endDateTime, boolean endEstimateFlag, string eventName, string eventLocation, string eventDescriptor)
Output (void)
The API shall take user input through either a Pointer or Touch interface input on a particular point within the clock face. The hour corresponding to the point selected will be defaulted to the start time of the event. A detailed input box will be drawn on the Display. Through the Keyboard or Touch input, the API shall read user responses, to include estimated start and end preferences, the event end time, Event name, Event location, and other Event information. After the Event information is accepted by the user, the API shall update the Aggregation Database for the specific user. If any Social Media Databases are synced, the API shall write to those databases. The Create Event function will review the Aggregation Database for any overlapping events and determine the stackLevel for the event being created. [Continue with "Draw Event"]

Create Sub-Event

Input Arguments (string username, string eventName, int subEventStartTime, int subEventEndTime, string subEventName, string subEventLocation, string subEventDescriptor)
Output (void)
The API shall take user input through either a Pointer or Touch interface input on an existing event. A detailed input box will be drawn on the Display. Through the Keyboard or Touch input, the API shall read user responses, to include sub-event start and end times, Event name, Event location, and other Event information. After the Event information is accepted by the user, the API shall update the Aggregation Database for the specific user and specific event selected. If any Social Media Databases are synced, the API shall write to those databases. [Continue with "Draw Sub Event"]

Create Dynamic Event

Input Arguments (string username, int startDateTime, int endDateTime, int Duration, string eventName)
Output (void)
The API shall take user input through either a Pointer or Touch interface input on a particular point within the clock face. The hour corresponding to the point selected will be defaulted to the start time of a dynamic event. A detailed input box will be drawn on the Display asking for the user to start a dynamic event for a particular user. The input box will ask if the dynamic event has a fixed start time, fixed end time, or a fixed duration. If a previous dynamic event was created, the detailed input box will contain a list to select any previously created Dynamic Events. Once the dynamic event is started, an arciform will be created through the "Draw Event" function where the end time is continually updated until the Stop Dynamic Event function is called for that dynamic event. For Dynamic Events with a fixed end time or a fixed duration, the start time will be continually updated until the Start Dynamic Event function is called. The Create Dynamic Event function will review the Aggregation Database for any overlapping events and determine the stackLevel for the event being created. Upon creation of a dynamic event, the API shall update the Aggregation Database, continually in periodic intervals, for the specific dynamic event, where each update to the Aggregation Database contains a new estimated start time, end time, or both based on the type of event created. [Continue with "Draw Event"]

Stop Dynamic Event

Input Arguments (string username, int endDateTime, string eventName)
Output (void)
Through the Keyboard or Touch input, the API shall read user responses, to end a particular dynamic event end time, by its event name, username. After the end time and event name are accepted by the user, the API shall update the Aggregation Database for the specific user for the specific dynamic event just completed. If any Social Media Databases are synced, the API shall write to those databases. The Stop Dynamic Event will terminate all calls to the Draw Event loop for the specified dynamic event.

Start Dynamic Event

Input Arguments (string username, int startDateTime, string eventName)
Output (void)
Through the Keyboard or Touch input, the API shall read user responses, to start a particular dynamic event at the start time of the function call, by its event name, username. The API shall update the Aggregation Database for the specific user for the specific dynamic event just started. If any Social Media Databases are synced, the API shall write to those databases. The Start Dynamic Event will terminate all calls to the Draw Event loop for the specified dynamic event, and the event will be drawn as needed.

Create Multi-User Event

Input Arguments (string [1 . . . n] username, int startDateTime, boolean startEstimateFlag, int endDateTime, Boolean endEstimateFlag, string eventName, string eventLocation, string eventDescription)
Output (void)
The API shall "Poll Events" for any number of user's scheduled events for a specified date, aggregate events for each timeslot around the clock face and draw the results into one display where bar sizes vary based on user availability. The user would be able to select any region to display which users are busy or free in order to create an event. [Continue with "Create Event"]. All users will be notified of the suggested event.

Draw Event

Input Arguments (string username, int date, int arcStart, boolean arcStartEstimate, int arcEnd, boolean arcEndEstimate, int acceptanceType, int [ ] stackLevel, int diameterSize, int color, int texture)
Output (void)
The API shall draw the specific event passed in the arguments for a particular date on the Display with one contiguous line traversing from the point of the start time on the clock face, specified by arcStart, to the point of the end time on the clock face, specified by arcEnd for each event. Whether the endpoints of the line are a gradient fading to transparency depends upon the values of the boolean flags arcStartEstimate or arcEndEstimate. The acceptance variable will vary the width or texture of the line drawn based on the value in the acceptanceType variable and the value given in the diameterSize variable. The stackLevel variable will determine which regions the arciform is drawn, and which area of the region the arciform is drawn. The stackLevel array will be a length equivalent to the number of regions on the clockface. For a three region clockface, the stackLevel variable will be length three with the outermost region represented by the index_0, the middle region represented by the index_1 and the innermost region represented by the index_2. Each index will have a value from 0-4 where value = 0 is no arciform, value = 1 represents the area of the region clos-est -continued to the center of the clockface, value = 2 represents the area one above the previous area, value = 3 represents the outermost area of the region, or the furthest away from the center of the clockface, and value = 4 represents arciforms covering the whole region. The diameterSize will have a value equivalent to SMALL or LARGE depending on the number of dates to be shown. The color and texture variables are optionally passed. If the color and texture variables are empty, the default corresponding parameters will be used. If the color and texture variables are passed, the color and texture variables are set so as to color or texturize an arciform.

Draw ComplexEvent

Input Arguments (string username, int date, int [1 . . . n] arcStart, boolean arcStartEstimate, int [1 . . . n]arcEnd, boolean arcEndEstimate, int acceptanceType, int [ ] stackLevel, int diameterSize, int color, int texture)
Output (void)
The API shall draw the specific complex event passed in the arguments for a particular date on the Display with one contiguous line traversing from the point of the start time on the clock face, specified by the first indexed value of arcStart, to the point of the end time on the clock face, specified by the first indexed value of arcEnd for each event. The API shall continue to draw sub-events specified in the subsequent indexes up to n of the arcStart and arcEnd arrays, where n is equivalent to the number of sub-events. Whether the endpoints of the line are a gradient fading to transparency depends upon the values of the boolean flags arcStartEstimate or arcEndEstimate. The acceptance variable will vary the width or texture of the line drawn based on the value in the acceptanceType variable and the value given in the diameterSize variable. The stackLevel variable will determine which regions the arciform is drawn, and which area of the region the arciform is drawn. The stackLevel, diameterSize, color and texture will function the same as in the DrawEvent function.

Draw all-Day Event

Input Arguments (string username, int date)
Output (void)
The API shall draw an all-day event for a particular date on the Display. For each area of the clockface with multiple events, the API shall stack the lines within the region until three stacked lines are displayed. If four or more events occur within a time period, a bar spanning the whole region will be drawn for that time period behind the existing stacked lines.

Draw Event Single Date

Input Arguments (string username, int date)
Output (void)
The API shall "Poll Events" and draw all events for a particular date on the Display. For each area of the clockface with multiple events, the API shall stack the lines within the region until three stacked lines are displayed. If four or more events occur within a time period, a bar spanning the whole region will be drawn for that time period behind the existing stacked lines. Based on the metadata from the Aggregation Database returned by the Poll Events function, events will be drawn with a line style based on full acceptance or tentative acceptance, by the acceptanceType variable passed to the DrawEvent function. The respective stack level for each event will be calculated and passed to the DrawEvent function as well. Additionally, the diameter size passed to the DrawEvent will be the value LARGE since only one date will be displayed. This will subsequently make any tentative events to be drawn as textured lines as opposed to solid accepted lines. [Continue with DrawEvent]

Draw Event Multiple Dates

Input Arguments (string username, int startDate, int endDate)
Output (void)
The API shall "Poll Events" and draw events to the display for each date displayed. The diameter size passed to the DrawEvent function will be the value SMALL since multiple dates will be displayed. This will make any tentative events to be drawn as narrower lines than accepted events. [Continue with "Draw Event"]

Draw Displayed Event Details

Input Arguments (string username, string [1 . . . n] eventName)
Output (void)
The API shall "Poll Events" and draw all event details for a particular user for a particular timeframe on the Display in one contiguous list.

Draw all Event Details

Input Arguments (string username, int startDate)
Output (void)
The API shall "Poll Events" and draw all event details a user has permission to see on the Display in one contiguous list starting with the most current event and ending with the last displayable event. This function will automatically be called once the list is scrolled to load up subsequent events.

Draw Map Location

Input Arguments (int coordinates, int date, int [1 . . . n] metadataFilter)
Output (void)
The API shall "Poll Events", and draw, on the map displayed, on to the associated locations in the Location Database, events for each Location specified, for any date specified.
The metadataFilter variable is optional but will be used to search through the eventName, eventLocation, eventDescription [Continue with Draw Event]

Draw all Local Locations

Input Arguments (int date, int [1 . . . n] metadataFilter)
Output (void)
The API shall "Poll Device Location" or utilize a default location. The API will draw on the Display the area surrounding the location, read from the Map database.
The metadataFilter variable is optional but will be used to search through the eventName, eventLocation, eventDescription [Continue with "Draw Map Location" for each location on the display]

Describe Event Indicator

Input Arguments (string username, string eventName)
Output (void)
The API shall take user input through either a Pointer or Touch interface input on a particular event within the clock face and draw on the Display the associated event details and metadata.

Draw Events on Camera Feed

Input Arguments (int coordinates, int orientationX, int orientationY, int orientationZ, int date, int [1 . . . n] metadataFilter)
Output (void)
The API shall "Poll Device Location", read the camera for objects, read the gyroscope for orientation, read the locations from the Locations Database, "Poll Events" on each visible location.

-continued

The metadataFilter variable is optional but will be used to search through the eventName, eventLocation, eventDescription
[Continue with Draw Event]

Poll Device Location

Input Arguments (void)
Output (int coordinates)
The API shall query the geolocation service for the location of the authenticated user's system.

Poll Events

Input Arguments (string [1 . . . n] username, int date, string coordinates)
Output (string [1 . . . n] eventName)
The API shall query the Aggregation Database for all Events for a particular date. (Optional filters: Users for user specific event, Location for Location specific events)

Poll Device Orientation

Input Arguments (void)
Output (int orientationX, int orientationY, int orientationZ)
The API shall query the device's Gyroscope for the orientation of the device's camera.

Examples of API Use

This description teaches how the example API, described above, is used according to an example to create various ones of the drawing figures. These disclosed descriptions are examples and not meant to limit any particular function. The descriptions themselves are examples and are not intended to cover all necessary functionality for every possible situation.

For all examples, the username of the user operating the device will be User1.

Example One

This example is one way the example API is used to generate the displays similar to those depicted in FIGS. 3-5.

| Event | Acceptance |
|---|---|
| Event1 - 9 a.m. to 10 a.m. | Tentative |
| Event2 - 9 a.m. to 11 a.m. | Accepted |
| Event3 - 12 p.m. to 3 p.m. | Accepted |

Call "DrawEventSingleDate" for the date 10172015 which will call "Draw Event" for each of the three events listed above. Note: For smaller displays Draw Event renders how the events are displayed as shown by arrow 109 in FIG. 5. The API will set a static threshold for what is determined as a small display resolution.
Function Calls:
DrawEventSingleDate("User1", 10172015) \\The following DrawEvent functions will be called from the DrawEventSingleDate function.
DrawEvent ("User1", 10172015, 0900, FALSE, 1000, FALSE, TENTATIVE, [2,0,0], LARGE,,)
Note the stackLevel array being passed is [2,0,0] meaning that the line will be drawn in the second position of the outermost region.
DrawEvent ("User1", 10172015, 0900, FALSE, 1100, FALSE, ACCEPTED, [1,0,0], LARGE,,)
Note the stackLevel array being passed is [1,0,0] meaning that the line will be drawn in the first position of the outermost region.
DrawEvent ("User1", 10172015, 1200, FALSE, 1500, FALSE, ACCEPTED, [0,1,0], LARGE,,)
Note the stackLevel array being passed is [0,1,0] meaning that the line will be drawn in the first position of the second region.

Example Two

This example is one way in which the example API is used to generate the display of FIG. 6.

| Event | Acceptance |
|---|---|
| Event1 - 10 a.m. to 2:30 p.m. | Accepted |
| Event2 - 7 p.m. to 1:30 a.m. | Accepted |

Call "DrawEventSingleDate" for the date 10172015 which will call "Draw Event" for each of the two events listed above. Note: The transition points from a.m. to p.m. and p.m. to a.m. as noted by 110-T and the continuous line from 7:00 p.m. of one day to 1:30 a.m. the next day as shown by 111-T.
Function Calls:
DrawEventSingleDate("User1", 10172015) \\The following DrawEvent functions will be called from the DrawEventSingleDate function.
DrawEvent("User1", 10172015, 1000, FALSE, 1300, FALSE, ACCEPTED, [1,3,0], LARGE,,) \\ Event1
Note the stackLevel array being passed is [1,3,0] meaning that the line will be drawn in position 1 of the outermost region as dictated by the value 1 in the first index, the transition point at position 3 as determined by the second index, along with the line continuing in the second region position 3 as dictated by the value 3 in the same index.
DrawEvent("User1", 10172015, 0900, FALSE, 1100, FALSE, ACCEPTED, [0,1,3], LARGE,,) \\ Event2
Note the stackLevel array being passed is [0,1,3] meaning that the line will be drawn in position 1 of the second region as dictated by the value 1 in the second index, the transition point at position 3 as determined by the third index, along with the line continuing in the third region position 3 as dictated by the value 3 in the same index.

Example Three

This example is one way the example API is used to generate the displays similar to those depicted in FIG. 9.

| Event | Acceptance |
|---|---|
| Event1 - 9 a.m. to 10 a.m. | Tentative |
| Event2 - 9 a.m. to 11 a.m. | Accepted |
| Event3 - 9 a.m. to 11 a.m. | Accepted |
| Event4 - 10 a.m. to 11 a.m. | Accepted |
| Event5 - 10 a.m. to 10:30 a.m. | Accepted |

| Event | Acceptance |
|---|---|
| Event6 - 10 a.m. to 11 a.m. | Tentative |
| Event7 - 3 p.m. to 6 p.m. | Accepted |

Call "DrawEventSingleDate" for the date 10172015 which will call "Draw Event" for each of the seven events listed above. Note: Overlap of Events 2-6 as shown by 113.

Call "Draw Displayed Event Details" for each of the seven events listed above.— As shown by 114.

Function Calls:
DrawEventSingleDate("User1", 10172015) \\The following DrawEvent functions will be called from the DrawEventSingleDate function.
    DrawEvent("User1", 10172015, 0900, FALSE, 1000, FALSE, TENTATIVE, [3,0,0], LARGE,,) \\ Event1
    DrawEvent("User1", 10172015, 0900, FALSE, 1100, FALSE, ACCEPTED, [2,0,0], LARGE,,) \\ Event2
    DrawEvent("User1", 10172015, 0900, FALSE, 1100, FALSE, ACCEPTED, [1,0,0], LARGE,,) \\ Event3
    DrawEvent("User1", 10172015, 1000, FALSE, 1100, FALSE, ACCEPTED, [3,0,0], LARGE,,) \\ Event4
    DrawEvent("User1", 10172015, 1000, FALSE, 1100, FALSE, ACCEPTED, [4,0,0], LARGE,,) \\ Event5 and
    Note, since Event5 and Event6 exist in a region already populated by three stacked arciforms, they will be represented by an encompassing object 113 covering the whole region. Only one function call must be made for Event5 and Event6 since Event6 overlaps the entire Event5 area. Additionally, the acceptance type variable is ignored for the arciform that covers the whole region as the Event5 and Event6 are already abstracted.
    DrawEvent("User1", 10172015, 1000, FALSE, 1100, FALSE, ACCEPTED, [3,0,0], LARGE) \\ Event7
DrawDisplayedEventDetails("User1", "Event1")
DrawDisplayedEventDetails ("User1", "Event2")
DrawDisplayedEventDetails ("User1", "Event3")
DrawDisplayedEventDetails ("User1", "Event4")
DrawDisplayedEventDetails ("User1", "Event5")
DrawDisplayedEventDetails ("User1", "Event6")
DrawDisplayedEventDetails ("User1", "Event7")
    Note, that despite Event5 and Event6 being abstracted, the EventDetails function will be called for all events that are explicitly displayed or abstracted.

Example Four

This example is one way the example API is used to generate a display similar to that depicted in FIG. 10.

| Event | Location | Event Descriptor | Acceptance |
|---|---|---|---|
| Event1 - 3 p.m. to ~5:30 p.m. | National History Museum | New National History Exhibit | Accepted |

Call "Create Event" for Event1 with the end time for the event of 5:30 p.m. to be an approximation.

Call "DrawEventSingleDate" for the date 10172015 which will call "Draw Event" for Event1.

Note: Event1 will show a gradient trailing off at 5:30 p.m. as shown by 115.

Function Calls:
CreateEvent("User1", 201510171500, FALSE, 201510171730, TRUE, "Event1", "National History Museum", "New National History Exhibit")
    Note: The startDateTime and endDateTime are in the YYYYMMDDHHMM time format
    Note: The flag TRUE is set for the arcEndEstimate variable
DrawEventSingleDate("User1", 10172015) \\The following DrawEvent functions will be called from the DrawEventSingleDate function.
    DrawEvent ("User1", 10172015, 1300, FALSE, 1530, TRUE, ACCEPTED, [0,1,0], LARGE,,) \\ Event1

Example Five

This example is one way the example API is used to generate a display similar to that depicted in FIG. 11.

Call "Create Event" when the user selects 10:00 a.m. on the clock face.

Function Call:
CreateEvent ("User1", 201510171000, FALSE, null, null, null, null, null)
    Note: The startDateTime is in the YYYYMMDDHHMNI time format.
    Note: Since many null arguments are sent on the function call, additional dialog boxes will be generated to populate the additional arguments (endDateTime, endEstimateFlag, eventName, eventLocation, eventDescriptor).

Example Six

This example is one way the example API is used to generate a display similar to that depicted in FIG. 12.

| Event | User | Acceptance |
|---|---|---|
| Event-1 - 9 a.m. to 11 a.m. | Abby | Accepted |
| Event-2 - 9 a.m. to 11 a.m. | Bob | Accepted |
| Event-3 - 9 a.m. to 11 a.m. | Charlie | Accepted |
| Event-4 - 10 a.m. to 11 a.m. | David | Accepted |
| Event-5 - 10 a.m. to 11 a.m. | Emily | Accepted |
| Event-6 - 10 a.m. to 11 a.m. | Frank | Accepted |
| Event-7 - 12 a.m. to 4 p.m. | Bob | Accepted |
| Event-8 - 2 p.m. to 4 p.m. | David | Accepted |
| Event-9 - ~6 p.m. to 8:30 p.m. | Abby | Accepted |
| Event-10 - 7 p.m. to 8:30 p.m. | Emily | Tentative |
| Event-11 - 7 p.m. to 8:30 p.m. | Charlie | Accepted |
| Event-12 - 7 p.m. to 8:30 p.m. | David | Accepted |
| Event-13 - 7 p.m. to 8:30 p.m. | Frank | Accepted |

Call "Poll Events" for each user and event listed above. Call "Create Multi-User Event." Note the bar shown by 201 encompasses the full region since all users are busy at that time. If an area from 2:00 p.m. to 4 p.m. is selected a box as described by 203 will be displayed showing which users are free and which are not.

Function Calls:
PollEvents(["Abby"; "Bob"; "Charlie"; "David"; "Emily"; "Frank"], 20151017, null)
Create Multi-User Event(["Abby"; "Bob"; "Charlie"; "David"; "Emily"; "Frank"], 201510171400, FALSE, 201510171600, FALSE, "Event-14", null, null)

Example Seven

This example is one way the example API is used to generate a display similar to that depicted in FIG. 13.

Call "Aggregate Calendar" data for a particular user. Call "Draw Event Multiple Dates" to draw events for every date for August 2016 as shown by 301.

Function Calls:

AggregateCalendarData ("User1")

DrawEventMultipleDates("User1", 20160801, 20160831)

Note DrawEventMultipleDates will call DrawEvent for each event between the start and end dates with the diameterSize value being passed as SMALL since the full clock will not be displayed.

Example Eight

This example is one way the example API is used to generate a display similar to that depicted in FIG. 14.

| Event | User | Additional Social Media Details |
|---|---|---|
| Restaurant Hours - 9 a.m. to 10 p.m. | RestaurantXX | #Restaurant |
| Live Music - 3 p.m. to 6 p.m. | RestaurantXX | #LDE |
| Happy Hour - 5 p.m. to 7 p.m. | RestaurantXX | #HappyHour |

Call "Aggregate Event Data." Call "Draw All Local Locations." Once the area shown by 302 is selected, call "Draw All Event Details." Note the list shown by 303.

Function Calls:

AggregateEventData( )

DrawAllLocalLocations(20151017, null)

DrawAllEventDetails("RestaurantXX", 20151017)

Example Nine

This example is one way the example API is used to generate a display similar to that depicted in FIG. 15.

| Event | User | Additional Social Media Details |
|---|---|---|
| Restaurant Hours - 9 a.m. to 10 p.m. | RestaurantXX | #Restaurant |
| Live Music - 3 p.m. to 6 p.m. | RestaurantXX | #LDE |
| Happy Hour - 5 p.m. to 7 p.m. | RestaurantXX | #HappyHour |

Call "Aggregate Event Data." Call "Poll Device Location." Call "Poll Device Orientation." Call "Draw Events on Camera Feed." Once the area shown by 304 is selected, call "Draw All Event Details." Note the list shown by 305.

Function Calls:

AggregateEventData ( )

DrawEventsonCameraFeed(PollDeviceLocation( ) PollDeviceOrientation( ) 20151017, null)

Example Functions

This section uses pseudocode to teach how certain of the function calls, mentioned above, are implemented according to an example algorithm. These disclosed algorithms are examples and not meant to limit any particular function. The functions themselves are examples and are not intended to cover all necessary functionality for every possible situation.

DrawEventSingleDate Function

```
public static void DrawEventSingleDate(string
username, int date)
{
  string [ ] totalEvents=PollEvents(username, date,
  NULL); \* since PollEvents returns all events for
  a particular user for a particular date, all of
  the user's events will be stored in the temp
  variable totalEvents*\
  EventList eventDistribution = new EventList( ); \*
  EventList is a class which contains arrays for
  the variables for displayableArcs, arcStart,
  arcStartEstimate, arcEnd, arcEndEstimate,
  acceptanceType stackLevel, color, and texture.
  The EventList class also contains the
  SortEventDistributionFunction.*\
  eventDistribution.SortEventDistribution(totalEvents[ ]);
  \*For each event in the totalEvents array,
  SortEventDistribution will take the start and end
  times for those events and related flags, and
  determine the number of overlapping events, at
  which time the overlap begins and which time the
  overlap ends. SortEventDistribution will
  determine the number of events which are
  displayable and which will be abstracted, and
  store the number of displayable arciforms in the
  displayableArcs variable. SortEventDistribution
  will then take all of the event start times and
  event end times, convert them to degrees, and
  store them in arcStart and arcEnd respectively.
  The acceptanceType value will also be stored
  based on the acceptanceType of the corresponding
  event. The SortEventDistribution function will
  assign stackLevel values for each displayable
  arciform, where the stackLevel values are
  determined based on the number of overlapping
  arciforms in a region. Events that are not
  displayable as an arciform are any events that
  reside in an area of a region with more than
  three overlapping events. For these non-
  displayable areas, SortEventDistribution will
  combine the events into an arciform that covers
  the whole region. The color variable will
  colorize the arciform if displayed. The texture
  variable will texturize the arciform if
  displayed.*\
  for(int i=0; i<eventDistribution.displayableArcs;
  i++){
    DrawEvent(username, date,
    eventDistribution.arcStart[i],
    eventDistribution.arcStartEstimate[i],
    eventDistribution.arcEnd[i],
    eventDistribution.arcEndEstimate[i],
    eventDistribution.acceptanceType[i],
    eventDistribution.stackLevel[i], LARGE,
    eventDistribution.color[i],
    eventDistribution.texture[i]); \*Since a
    single date is being displayed, the
    diameterSize value passed is LARGE since the
    clockface displayed will be the majority of
    the display. *\
  }
}
```

DrawEvent Function

```
public static void DrawEvent(string username, int
date, int arcStart, boolean arcStartEstimate, int
arcEnd, boolean arcEndEstimate, int acceptanceType,
int [ ] stackLevel, int diameterSize, int color, int
texture)
{
  Boolean arcStartGradient=FALSE; \\ declaring a
  default arcStartGradient flag for the event
  Boolean arcEndGradient=FALSE; \\ declaring a
  default arcEndGradient flag for the event
```

```
int radius = 0; \\ declaring a default radius to
draw arciforms
int [ ] [ ] transitionPointDegrees =
DetermineTransitionPoints(arcStart, arcEnd,
stackLevel); \* the DetermineTransitionPoints
function is a transition point determination
function that will evaluate the arcStart, arcEnd,
and stackLevel to determine the number of
transition points there are in the line segment.
Based on the stackLevel,
DetermineTransitionPoints will evaluate which
degrees each transition point begins and ends to
facilitate a continuous line from arciform to
arciform while not overlapping any arciforms
displayed in adjoining regions. The two-
dimensional transitionPointDegrees variable will
store for each transition point specified by the
first dimension, the start and end points (in
degrees) in the second dimension. *\
int [ ] [ ] splitLineSegments = SplitLine (arcStart,
arcEnd, transitionPointDegrees);
\*SplitLineSegment will take the arcStart,
arcEnd, and transitionPointDegrees to evaluate at
which points the line shall split to be able to
draw arciforms while removing the areas reserved
for the transition points. The two-dimensional
splitLineSegments variable will store for each
line segment specified in the first dimension,
the start and end points (in degrees) in the
second dimension. The SplitLine function will
ensure that each line segment ends at the same
degree as the immediately following transition
point, or begins at the same degree as the
immediately preceding transition point.*\
int numLineSegments = CountLineSegments
(splitLineSegments); \* CountLineSegments adds up
the total number of line segments and returns the
value to be stored in numLineSegments *\
int numRegionsCovered =
CountTransitionPoints(transitionPointDegrees); \*
CountTransitionPoints adds up the number of
transition points to determine the number of
regions the line representing the event will
traverse and return that value to be stored in
numRegionsCovered.*\
for (int i=0, i<numLineSegments, i++){
  if (arcStartEstimate and i=0) {
  \* if the arcStartEstimate flag is set to
  TRUE and this is the first iteration of the
  loop, then the arciform that will be drawn
  is the starting arciform, which must have
  the arciform start gradient.*\
  arcStartGradient=true;
  }
if (arcEndEstimate and ((i+1)=numLineSegments){
*\ if the arcEndEstimate flag is set to TRUE and
this is the last iteration of the loop, then the
arciform that will be drawn is the ending
arciform, which must have the arciform end
gradient.*\
  arcEndGradient=true;
}
radius = DetermineRadius(stackLevel[i], i,
diameterSize); \\ determines the radius in pixel
length based on the stackLevel, the region to be
drawn and the diameter size of the clockface
DrawArc (splitLineSegments[i][0],
splitLineSegments[i][1], arcStartGradient,
arcEndGradient, acceptanceType, radius, color,
texture); \* This function will draw an arciform
on the display from the degree specified in
splitLineSegments[i][0] (the arcStart) and
splitLineSegments[i][1] (the arcEnd) at a
specified radius as a line type specified by the
acceptanceType variable with the color and
texture specified by the respective variables. *\
if (i < numRegionsCovered−1) then {
\* if the number of transition points drawn is
less than the number of regions. If this is the
first iteration, the i variable will be 0.*\
  int destinationRadius =
  DetermineRadius(stackLevel[i+1], i+1,
  diameterSize); \\ determines the destination
  radius in pixel length for a transition line
  based on the stackLevel of the line at the
  subsequent region.
  DrawTransitionPointLine (transitionPointDegrees[i][ ],
  acceptanceType, radius,
  destinationRadius, color, texture); \* The
  DrawTransitionPointLine function will draw
  the transition point based on the transition
  start and end degrees specified in the
  transitionPointDegrees variable betweeen the
  radii specified by radius and
  destinationRadius as a line type specified
  by the acceptanceType variable with the
  color and texture specified by the
  respective variables. *\
  }
arcStartGradient=FALSE; \\ resets the variable
for the next loop
arcEndGradient=FALSE; \\ resets the variable for
the next loop
}
}
```

With the foregoing example API in mind, and the examples of how to use the API, and examples of some of the API functions, reference is now made to FIGS. 21 to 31 in which examples of the DrawEvent, DrawEventSingleDate, and SortEventDistribution functions (see FIG. 1) are provided.

Figure 21:
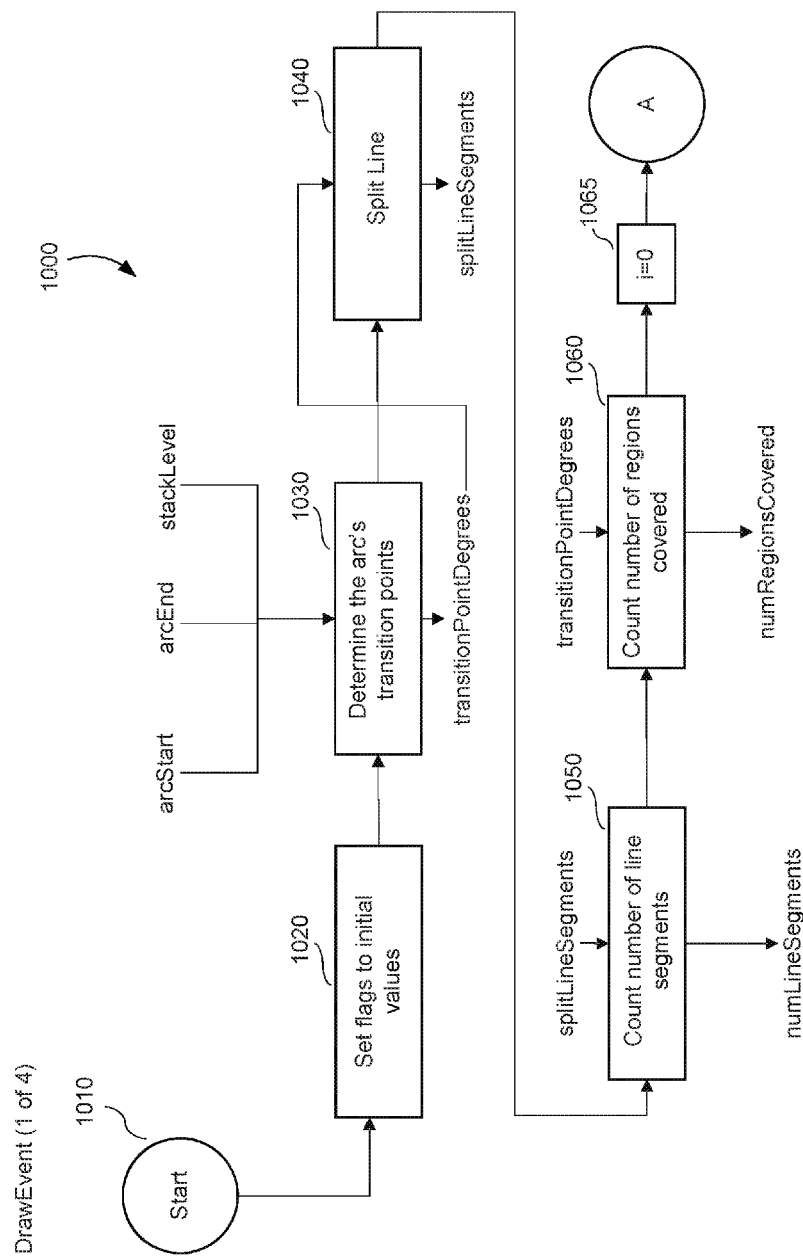
FIG. 21 depicts a first part of an example algorithm for implementing the DrawEvent function.

An example of an algorithm for implementing the DrawEvent functionality mentioned in the already-described example API is shown generally at 1000 in FIG. 21. The description of DrawEvent 1000 includes the example algorithm depicted in not just FIG. 21, but also FIGS. 22-24.

It is understood that the DrawEvent 1000 algorithm depicted in FIGS. 21-24 is given as but a single, high-level, structural example of a concrete implementation of this function. This example is not intended to be a limiting example, nor is it intended to imply that the implementation is limited to any particular computer language or programming paradigm. The underlying code written in an actual reduction to practice of this function is in any suitable computer language, is implemented in any suitable operating system or in any suitable hardware, and ultimately is executed in any suitable binary or other form. The same is true for the other API example implementations in FIGS. 25-31.

Processing for the example implementation of DrawEvent 1000 begins at step 1010 and proceeds to step 1020. In step 1020, flags are set to initial values. The arcStartGradient and arcEndGradient variables will be set to FALSE, and the radius variable will be set to zero. The arcStartGradient flag will be used to determine whether an arciform needs to have a start gradient applied. The arcEndGradient flag will be used to determine whether an arciform needs to have an end gradient applied. The radius variable will be used to determine how far from the center of a circular analog clockface an arciform or line needs to be drawn. Next, processing continues to step 1030.

In step 1030, these inputs are provided: arcStart, arcEnd, and stackLevel. Here, arcStart refers to an indication of the starting point of the event being displayed among a circular analog clockface, and, in various example implementations, is represented as an angular measure, a number of radians, degrees, or any quantity suitable to indicate the starting point of an event among a circular analog clockface. Similarly, arcEnd refers to the end point of the event being displayed among a circular analog clockface. The variable stackLevel refers to the area within each region that the event will be displayed in based on the number of overlapping events that exist within the duration of the event at each region. This variable is further discussed, below, with respect to the SortEventDistribution function of the example API, in connection with FIGS. 27-31.

In step 1030, processing includes, in this example, using arcStart, arcEnd, and stackLevel to determine one or more transition points for the arciform, also referred to previously in the discussion of meridiem-crossing indicators, date-crossing indicators, and, more generally, integral boundary-crossing transition indicators. Events with start and end times which cross the meridiem (i.e., the a.m./p.m. boundary at noon) or which have a date crossing (i.e., the today/following-day boundary at midnight) are events whose corresponding arciforms traverse multiple regions. An event that traverses two regions will have one transition point for a sub-arc of the event to transition from the higher region (see, e.g., fourth arciform initial portion 110-1 and fifth arciform initial portion 111-1 in FIG. 6 or FIG. 7) to a sub-arc of the lower region (see, e.g., fourth arciform final portion 110-2 and fifth arciform 111-2). Step 1030 stores, as an angular measure, a number of radians, degrees, or any quantity suitable to indicate a point of a circular analog clockface, the starting and ending point for each transition point that exists within the duration of the event.

In one example, only one transition point is determined, as is the case for the fourth arciform 110 and the fifth arciform 111. When only one transition point is determined, the processing is faster because less processing is required to determine one transition point instead of more than one. In another example, two transition points are determined (see, e.g., sixth arciform 112 in FIG. 8). When two transition points are determined, the processing takes longer than with one transition point, but provides this advantage: two transition points allow for the display of events which traverse over three regions, such as an event that starts prior to noon and extends past midnight of a particular day (i.e., using an arciform such as sixth arciform 112 that has multiple respective integral boundary-crossing transition indicators). Examples of such events include concerts or weddings. In another example, multiple events, overlapping in duration, transition between the same regions. To display both events' transition points, the angular measure, a number of radians, degrees, or any quantity suitable to indicate points of a circular analog clockface, will be different for the start and end point for the transition points of each overlapping event. For example, in FIG. 7 the fourth arciform radial axis 110-A is different from the fifth arciform radial axis 111-A. In another example, in FIG. 8, the sixth arciform 112 has two transition points which are displayed at different respective radial axes to avoid visual overlap.

In step 1030, depending on the number of transition points being implemented, processing results in the generation of one or more pairs of values for the two-dimensional array transitionPointDegrees. The array transitionPointDegrees, in one example implementation, is a single pair of values in the case in which only one transition point is determined, or, in another example, is implemented as an array of values in accordance with the number of determined transition points. The first dimension of transitionPointDegrees will be an instance of a specific transition point. The second dimension will be the start and stop positions for the transition point's line, as an angular measure, a number of radians, degrees, or any quantity suitable to indicate a point around a circular analog clockface.

In step 1030, the determination of transition points using arcStart, arcEnd, and stackLevel is performed, in one example, according to this mathematical approach. A calculation is performed to geometrically capture the area to explicitly and obviously display the continuation of an event through the transition from a.m. to p.m. or p.m. to a.m. Alternatively, the determination of transition points is also performed by considering events which overlap in duration to modify the area for display of the transition point so the continual line for the event is displayed in total and not visually superseded or hidden by another event.

Processing continues from step 1030 to step 1040. In step 1040, the transitionPointDegrees value or values are used to split a line which represents the event being displayed. Though each event will be displayed as one continuous line in finality, in one example implementation the event's line is programmatically split to take advantage of established native or more efficient draw functions. The processing in step 1040 results in a determination of splitLineSegments, which represents the line segments for an event within each region traversed, as an angular measure, a number of radians, degrees, or any quantity suitable to indicate a point among a circular analog clockface, not including the areas already covered by any transition points.

In step 1040, the splitting of the line, representing an event, is performed, in one example, by determining the start point for the line and the end point on the line. For each region that the line extends into, the line will be split to segments which are marked by the beginning point of the arciform within a region to the end point of the arciform within that region up to the point of the adjacent transition point. Alternatively, if a particular event has no transition point, the line will not be split and the splitLineSegments variable will simply contain the same values as the start and end points for the entire duration of the original event. The output of step 1040 will result in a two-dimensional array where the first dimension denotes a particular line segment and the second dimension denotes the start and end points for that line segment as an angular measure, a number of radians, degrees, or any quantity suitable to indicate a point among a circular analog clockface.

Processing continues from step 1040 to step 1050. Step 1050 will take the splitLineSegments variable as an input and count the number of total line segments contained within the two-dimensional array, by counting only the number of segments denoted by the first dimension. The output of step 1050 will be a number, stored in the variable numLineSegments, equivalent to the number of line segments in splitLineSegments.

Processing continues from step 1050 to step 1060. Step 1060 will take the transitionPointDegrees variable as an input and count the number of total transition points contained within the two-dimensional array, by counting only the number of transition points denoted by the first dimension. The output of step 1060 will be a number, stored in the variable numRegionsCovered, equivalent to the one more than the number of transition points in transitionPointDegrees.

In one example, there are no transition points determined. When no transition points are determined, only one region is covered by the line depicting a region. In another example, one transition point is determined. When one transition point is determined then the line for the whole duration of the event covers two regions.

Processing continues from step 1060 to step 1065. Step 1065 sets a counter, i to zero. This variable represents a counter used to access a particular instance. It is used in this example algorithm to access particular line segments or transition points. The variable will be utilized in FIGS. 21-24 to take actions, access specific line segments, access any transition points, and any specific line segment or transition point specific data. The uses for the variable i are further discussed, below.

In FIG. 21, processing after step 1065 is shown as continuing to connector symbol A. Connector symbol A does not represent a termination in processing but is used to direct the reader's attention to another figure in which connector symbol A also appears. In this instance, reference is made to FIG. 22, in which connector symbol A is present. The use of connector symbols such as connector symbol A, in the drawing figures, is a visual cue used to show how processing continues if a given drawing sheet is too small to contain all the symbols that represent actual processing steps. In FIGS. 21-31, several connector symbols are used in the same way.

Figure 22:
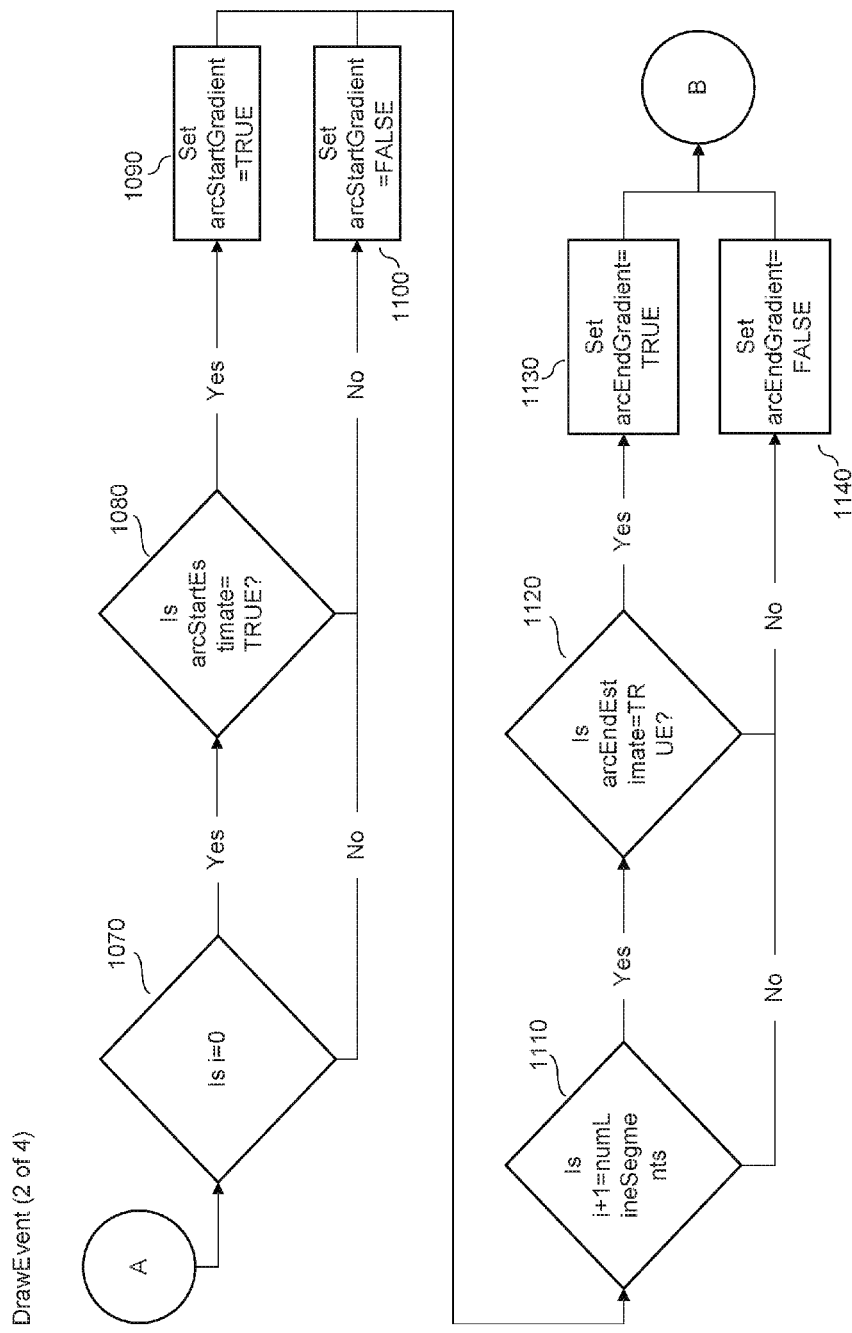
FIG. 22 depicts a second part of an example algorithm for implementing the DrawEvent function.
Figure 23:
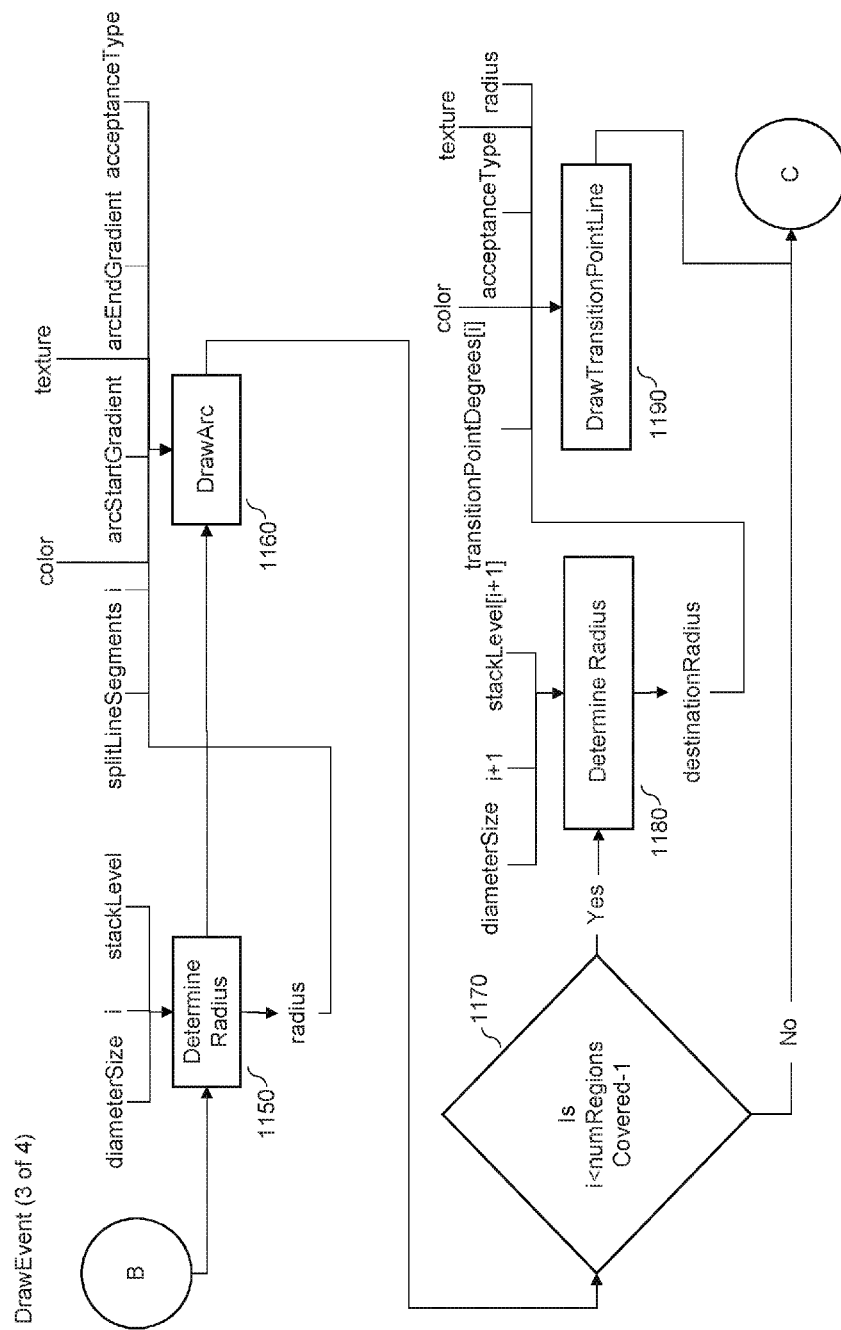
FIG. 23 depicts a third part of an example algorithm for implementing the DrawEvent function.
Figure 24:
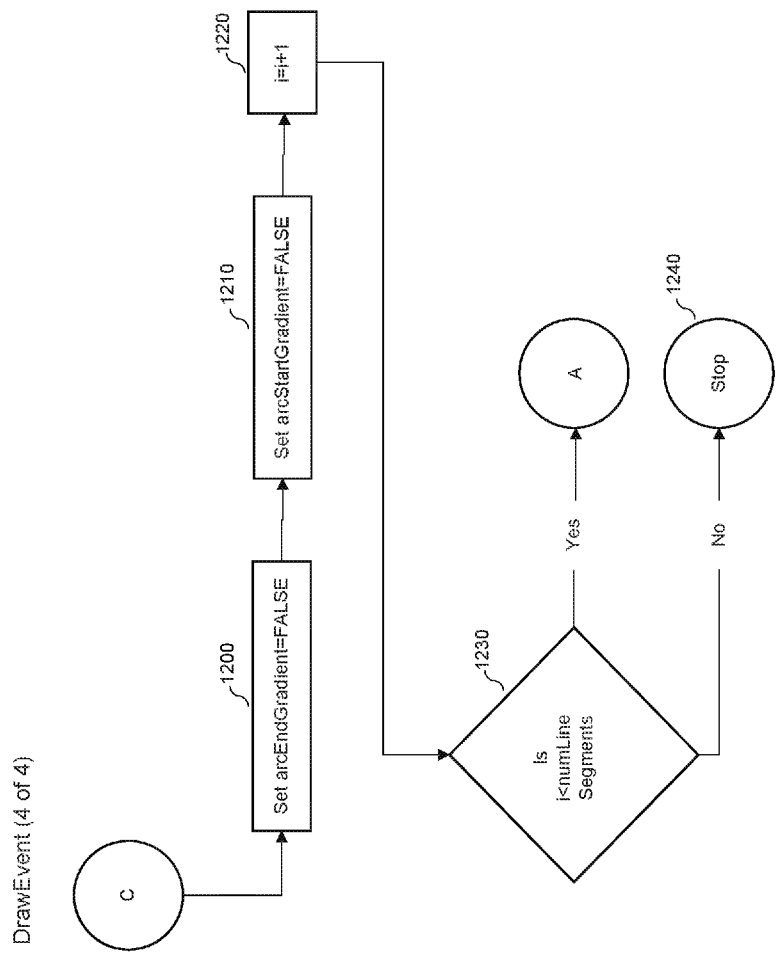
FIG. 24 depicts a fourth part of an example algorithm for implementing the DrawEvent function.
Figure 25:
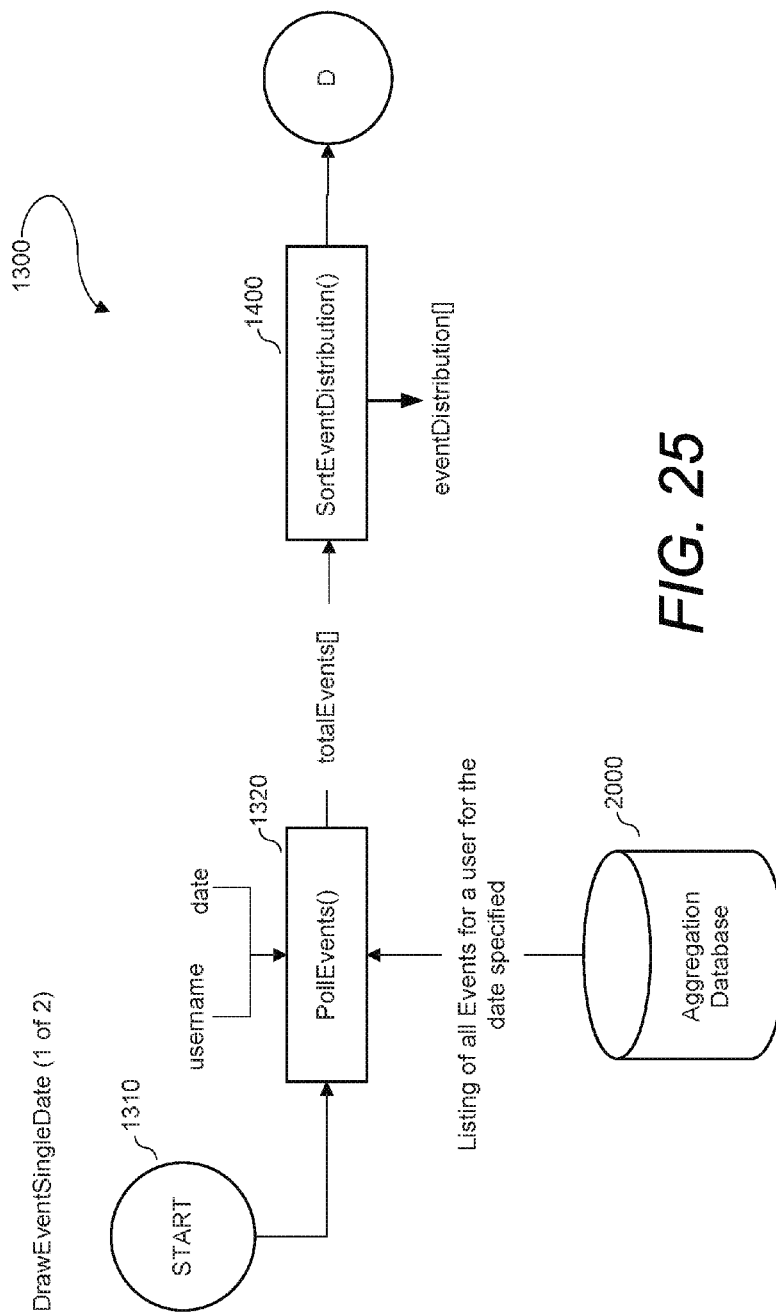
FIG. 25 depicts a first part of an example algorithm for implementing the DrawEventSingleDate function.
Figure 26:
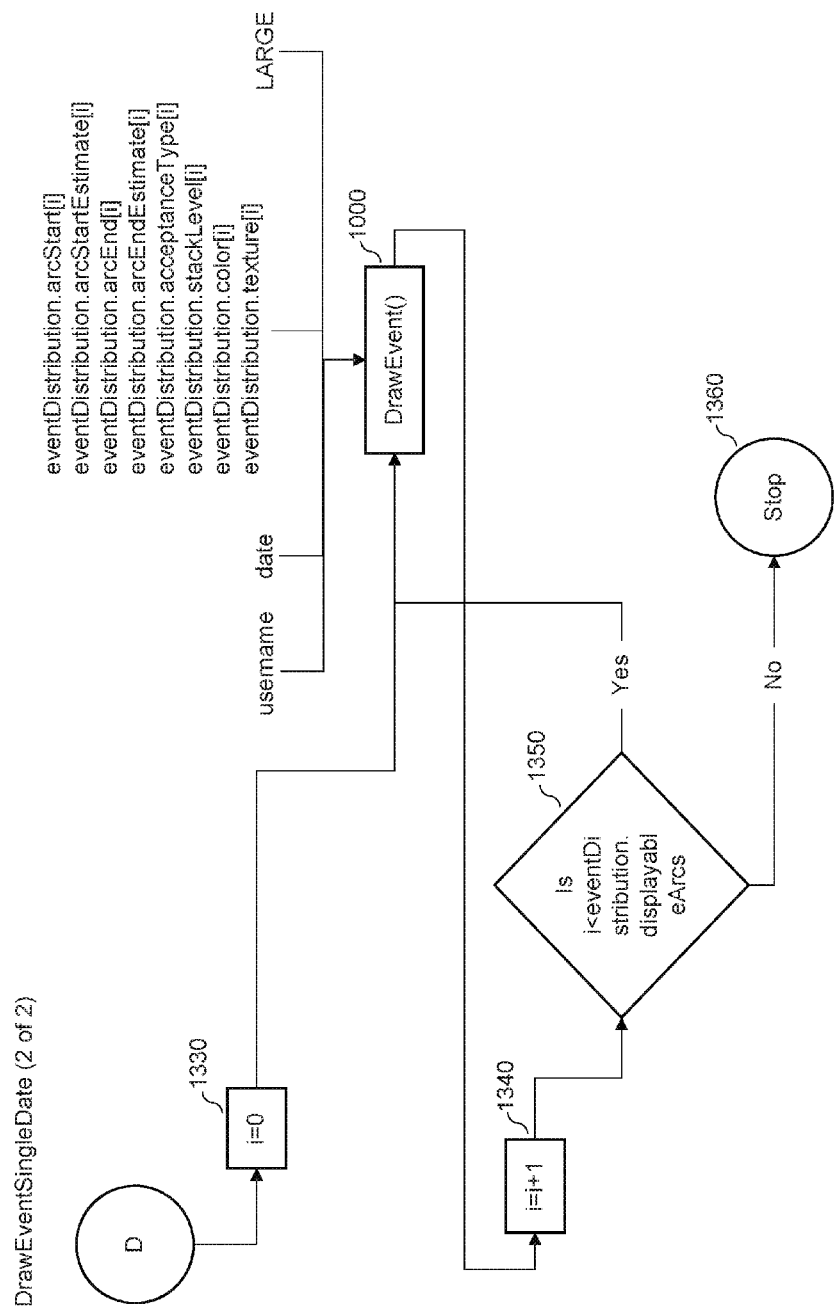
FIG. 26 depicts a second part of an example algorithm for implementing the DrawEventSingleDate function.

Therefore, processing after step 1065 of FIG. 21 continues to step 1070 in FIG. 22 (via connector symbol A). In step 1070, a determination is made on whether i=0. In step 1070, when i=0, it is an indication that the first instance of the loop is occurring. When the first instance is occurring, the first instances of values within arrays such as stackLevel, splitLineSegments, or transitionPointDegrees, are accessed. When i=0, therefore, processing continues to step 1080. Otherwise, since i≠0, it means actions related to the first instance of the loop have been taken and therefore processing continues to step 1100, described further below.

In step 1080, a determination is made whether the variable arcStartEstimate is equal to TRUE. The arcStartEstimate variable is sent during the original DrawEvent function call where the arcStartEstimate flag depicts whether or not an event contains an estimated start time. When the arcStartEstimate flag is equal to TRUE, therefore, processing continues to step 1090. Otherwise, processing continues to step 1100.

In step 1090, the flag arcStartGradient is set to TRUE. The variable arcStartGradient denotes whether the current instance must have a gradient within the arciform's starting point. Processing continues to step 1110.

In step 1100, the flag arcStartGradient is set to FALSE. Determinations have been made that either the first instance of the loop is not occurring, as depicted by i≠0, or the flag arcStartEstimate not being TRUE. Processing continues to step 1110.

In step 1110, a determination is made whether the variable i plus one is equivalent to the number of line segments denoted by numLineSegments. Since i is initially set to 0, and the numLineSegment variable contains the true number of total line segments, +1 must be added in the logical statement to make a proper determination of the true line segment being drawn. When i plus 1 is equivalent to numLineSegments then the last instance of the loop is occurring, therefore, processing continues to step 1120. Otherwise since the i plus 1 is not equivalent to numLineSegments, the last line segment is not being drawn and therefore processing continues to step 1140.

In step 1120, a determination is made whether the variable arcEndEstimate is equal to TRUE. The arcEndEstimate variable is sent during the original DrawEvent function call where the arcEndEstimate flag depicts whether or not an event contains an estimated start time. When the arcEndEstimate flag is equal to TRUE, therefore, processing continues to step 1130. Otherwise, processing continues to step 1140.

In step 1130, the flag arcEndGradient is set to TRUE. The variable arcEndGradient denotes whether the current instance must have a gradient within the arciform's end point. Processing continues to step 1150 in FIG. 23 (via connector symbol B).

In step 1140, the flag arcEndGradient is set to FALSE. Determinations have been made that either the last instance of the loop is not occurring, as depicted by i+1≠the number of line segments, or the flag arcEndEstimate not being TRUE indicating that the end point is an exact time. Processing continues to step 1150 in FIG. 23 (via connector symbol B).

In step 1150, the function to determine the radius of an arciform being drawn is performed. This same function will also be used in step 1180. The function to determine the radius uses diameterSize, i, and stackLevel as inputs, in one example, according to this mathematical approach. A calculation is performed to geometrically determine the area to explicitly and obviously display the arciform within a particular region of the clockface on the display.

Step 1150 takes the variables diameterSize, i, and stackLevel. The diameterSize variable denotes the size of the clockface being drawn on. The variable i denotes which instance of line segments are being used for the calculation. The stackLevel variable refers to the area within each region that the event will be displayed in based on the number of overlapping events that exist within the duration of the event at each region.

The output of step 1150 will be the variable radius which represents, as a linear measurement, in pixels, inches, steps, or any other any quantity suitable to indicate a radius within a circular analog clockface. The output of step 1150, of radius will be passed as an input to step 1160. Processing continues to step 1160.

In step 1160, the function DrawArc is called to draw an arciform to the display. In one example, the DrawArc function will take radius, splitLineSegments, i, arcStartGradient, arcEndGradient, acceptanceType, color and texture as inputs. Using those inputs, the DrawArc function will draw a specific line segment at a specified area of the display as defined by the radius from the center of the analog clockface, with additional display characteristics defined by the arcStartGradient and arcEndGradient flags and the acceptanceType variable.

Step 1160 will only draw the arciform for the line segment corresponding to the index specified by the variable i. In one example where the arcStartGradient flag equals TRUE, the arciform drawn will have a display indicating an estimated start time. In another example where the arcEndGradient flag equals TRUE, the arciform drawn will have a display indicating an estimated end time. In this example estimated arciforms are drawn with a gradient, but this is not intended to be a limiting example of how estimated start and stop times are displayed. In another example, the acceptanceType variable takes on values representing either acceptance or tentative acceptance. A tentative value for acceptanceType in one example produces a line of a specific texture that is hollow. An accepted value for acceptanceType produces a line that is solid. The same display conditions for acceptanceType will hold true for step 1190. Processing continues to step 1170.

In step 1170, a determination is made whether a transition point must be drawn in the current region through evaluating whether the variable i is one less than the numRegionsCovered. When the condition is true, a transition point must be drawn, and processing continues to step 1180. When the condition is false, all arciforms have been drawn, no transition points are left to be drawn, and processing continues to step 1200 in FIG. 24 (via connector symbol C).

In step 1180, the DetermineRadius function is called again with the same diameterSize value, and variable inputs of index and stackLevel equivalent to the values for the next arciform. These values are used for the DetermineRadius to mathematically calculate a radius value for the next line segment that will be called. The new radius value output will be stored in the destinationRadius variable. Processing continues to step 1190.

In step 1190, the transition point line will be drawn by calling the function DrawTransitionPointLine. Step 1190 will take the variables radius, destinationRadius, and transitionPointDegrees as input. The radius and destinationRadius variables were defined in steps 1150 and 1180, respectively. Passing both the radius and destinationRadius variables ensures that the transition point line is drawn from one specific radius used for a line segment to another specific radius for the next line segment to ensure a continuous line between the split line segments. Passing the acceptanceType variable will ensure that the transition line is drawn to appear with the same distinction as the adjoining line segments. The transitionPointDegrees variable, which was originally set in step 1030, will be passed specifically for the transition point at the index specified by the loop variable i with the start transition point degree value to the end transition point degree value to ensure one contiguous line adjoining line segments. The transitionPointDegrees variable is passed in this manner to so that only the specific instance of the transition point is drawn. In an instance where there is one transition point, when the i=0, the first and only transition point will be drawn. In another instance where there are two transition points, and the variable i=1, the second transition point out of the two transition points will be drawn. Processing continues to step 1200 in FIG. 24 (via connector symbol C).

In step 1200, the arcEndGradient flag is reset. Resetting the arcEndGradient to false will ensure that subsequent line segments drawn are not drawn with an erroneous estimate gradient. Processing continues to step 1210.

In step 1210, the arcStartGradient flag is reset. Resetting the arcStartGradient to false will ensure that subsequent line segments drawn are not drawn with an erroneous estimate gradient. Processing continues to step 1220.

In step 1220, the loop variable i is incremented by +1. Incrementing the loop variable i ensures that the next instances of line segments and transition points are drawn. Processing continues to step 1230.

In step 1230, a determination is made whether the loop variable i is less than the total number of line segments represented by the variable numLineSegments as defined in step 1050. This determination is made to evaluate if there are additional line segments to draw. If i is less than numLineSegments, additional line segments must be drawn, therefore, processing continues to step 1070 (via connector symbol A). Where i=numLineSegments all line segments and transition points have been drawn and processing for the DrawEvent is concluded at step 1240.

An example of an algorithm for implementing the DrawEventSingleDate functionality mentioned in the already-described example API will now be given. The DrawEventSingleDate functionality is shown generally at 1300 in FIG. 25. The description of DrawEventSingleDate 1300 includes the example algorithm depicted in not just FIG. 25, but also FIG. 26.

Processing for the example implementation of DrawEventSingleDate 1300 begins at step 1310 and proceeds to step 1320. In step 1320, the PollEvents function is called with the username and date as inputs. The PollEvents function will use the username and date to query the Aggregation Database specified by reference numeral 2000 described further below. Querying ref 2000 with the username and date variables will grab a listing of all events for the username and date specified and output the results in the totalEvents variable. The totalEvents variable is an array that stores events with their start time, start estimate flag, end time, end estimate flag, and acceptance type specified by the user. Next, processing continues to step 1330.

Reference numeral 2000 refers to the Aggregation Database. The Aggregation Database is a database that stores information obtained from various external databases that contain calendar event information for a particular user. The Aggregation Database is continually updated and contains all event information for each user to include event metadata. Event metadata includes event start and stop times, start time and stop time estimate flags, user specified acceptance level, color, and texture.

After step 1320, the SortEventDistribution 1400 function is called. Step 1420 takes totalEvents variable, the output from step 1320, as an input. The SortEventDistribution 1400 function takes the total events for a particular day determines the number of events which are displayable, and which will be abstracted, and store the number of displayable arciforms in the eventDistribution output variable. The SortEventDistribution 1400 is depicted in FIGS. 27-31 and is discussed in additional detail below. Processing continues to step 1330 (via connector symbol D).

In step 1330 (FIG. 26), the index variable i is set to zero. The variable i will be used to call specific variable indexes for DrawEvent 1000, step 1340, and step 1350. Processing continues to the DrawEvent 1000 function specified previously.

Figure 27:
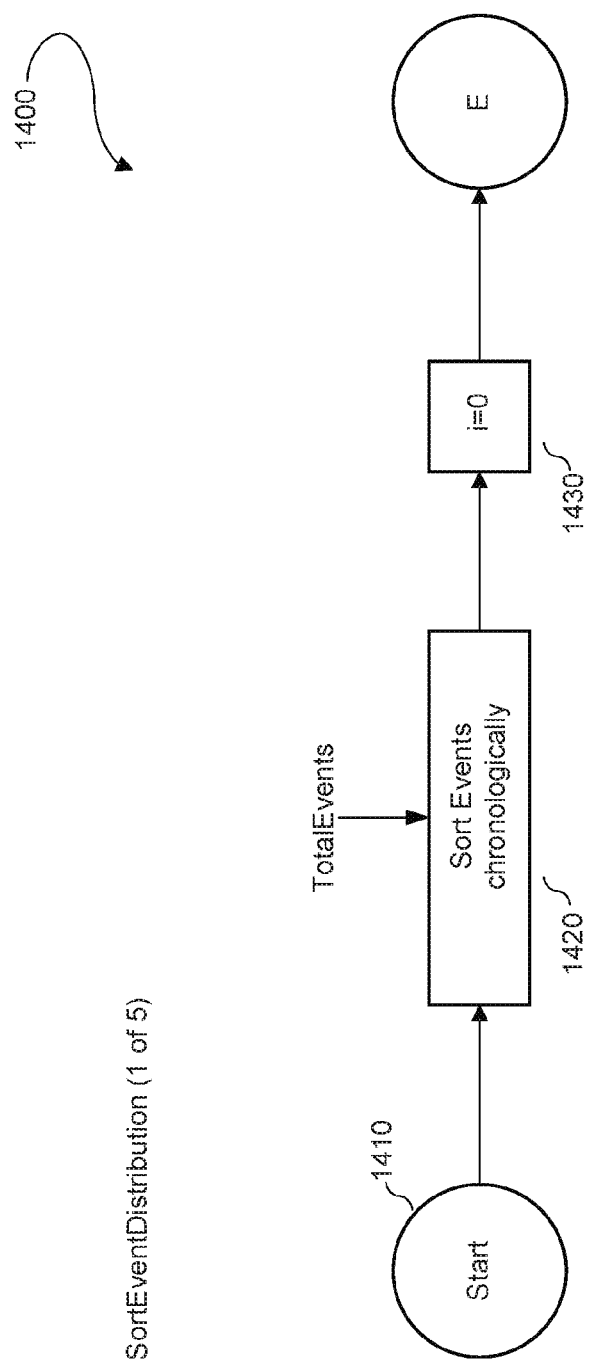
FIG. 27 depicts a first part of an example algorithm for implementing the SortEventDistribution function.
Figure 28:
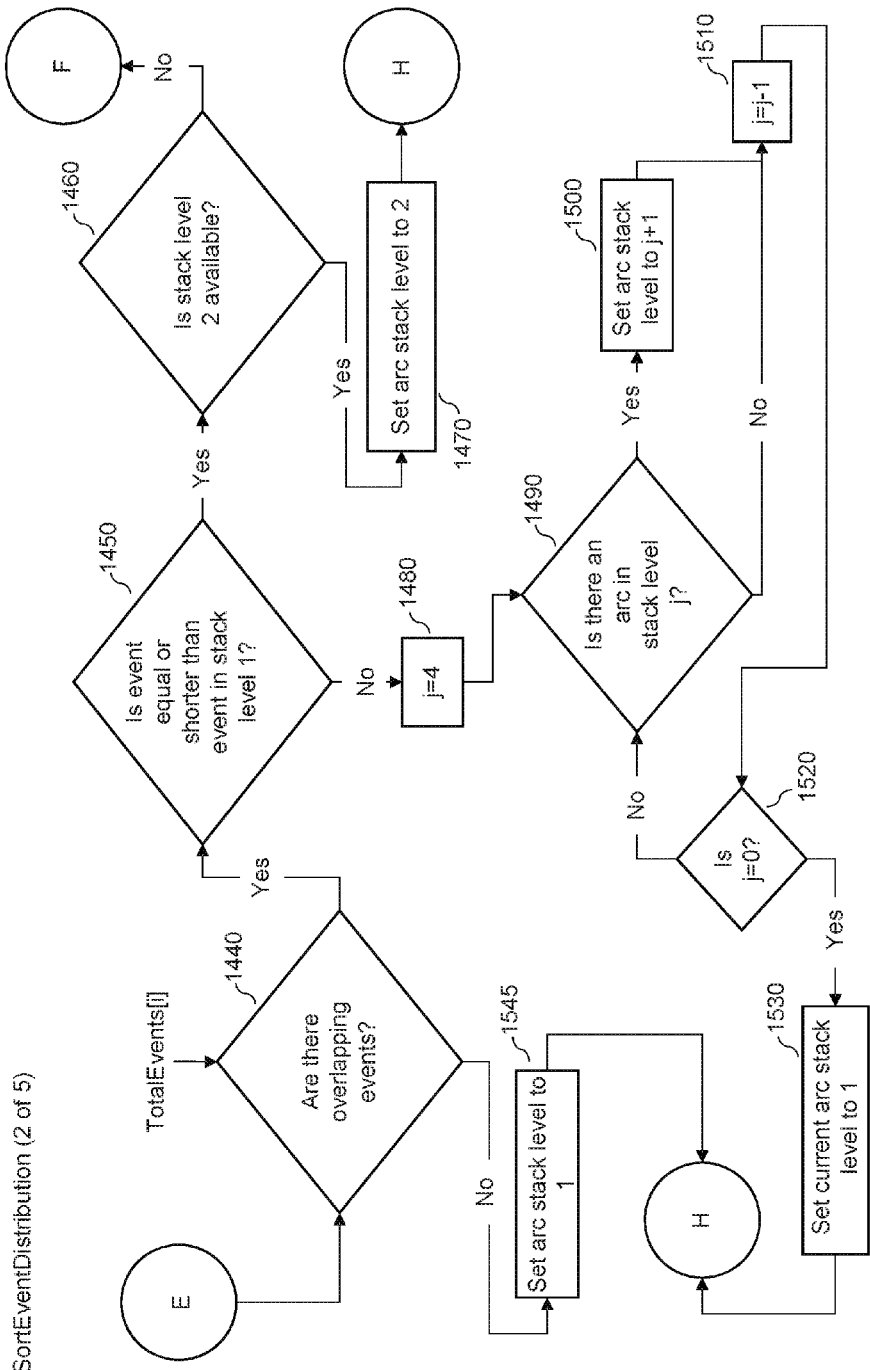
FIG. 28 depicts a second part of an example algorithm for implementing the SortEventDistribution function.
Figure 29:
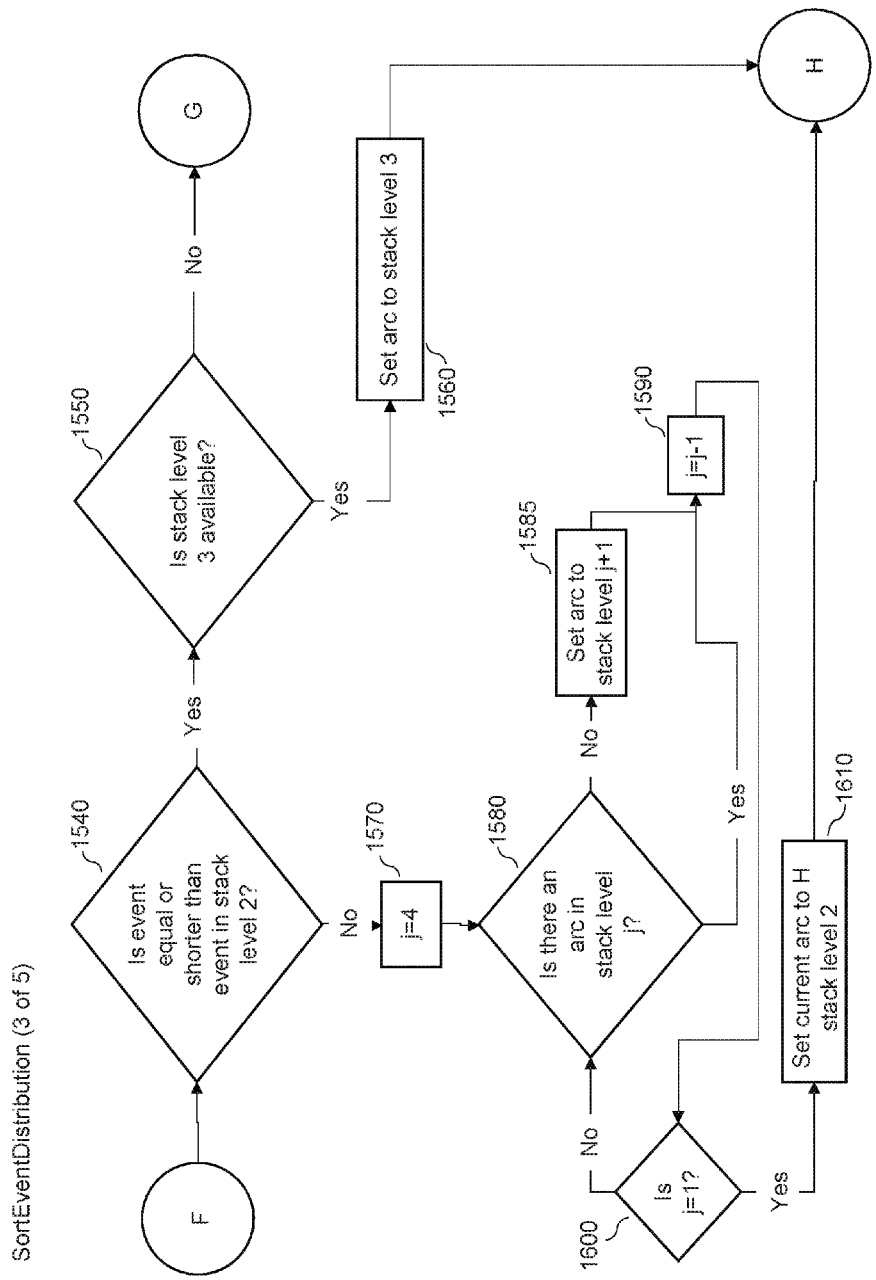
FIG. 29 depicts a third part of an example algorithm for implementing the SortEventDistribution function.
Figure 30:
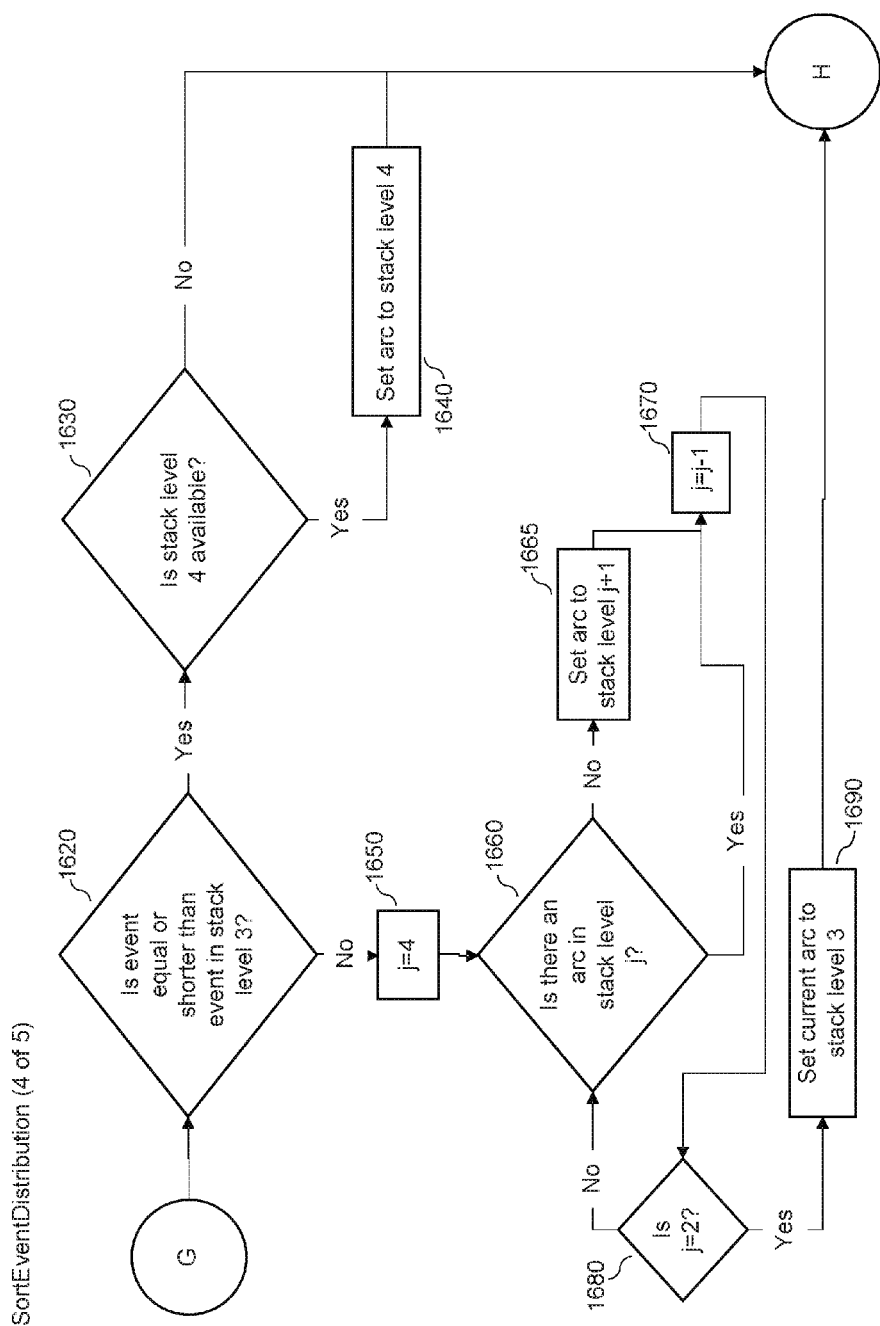
FIG. 30 depicts a fourth part of an example algorithm for implementing the SortEventDistribution function.
Figure 31:
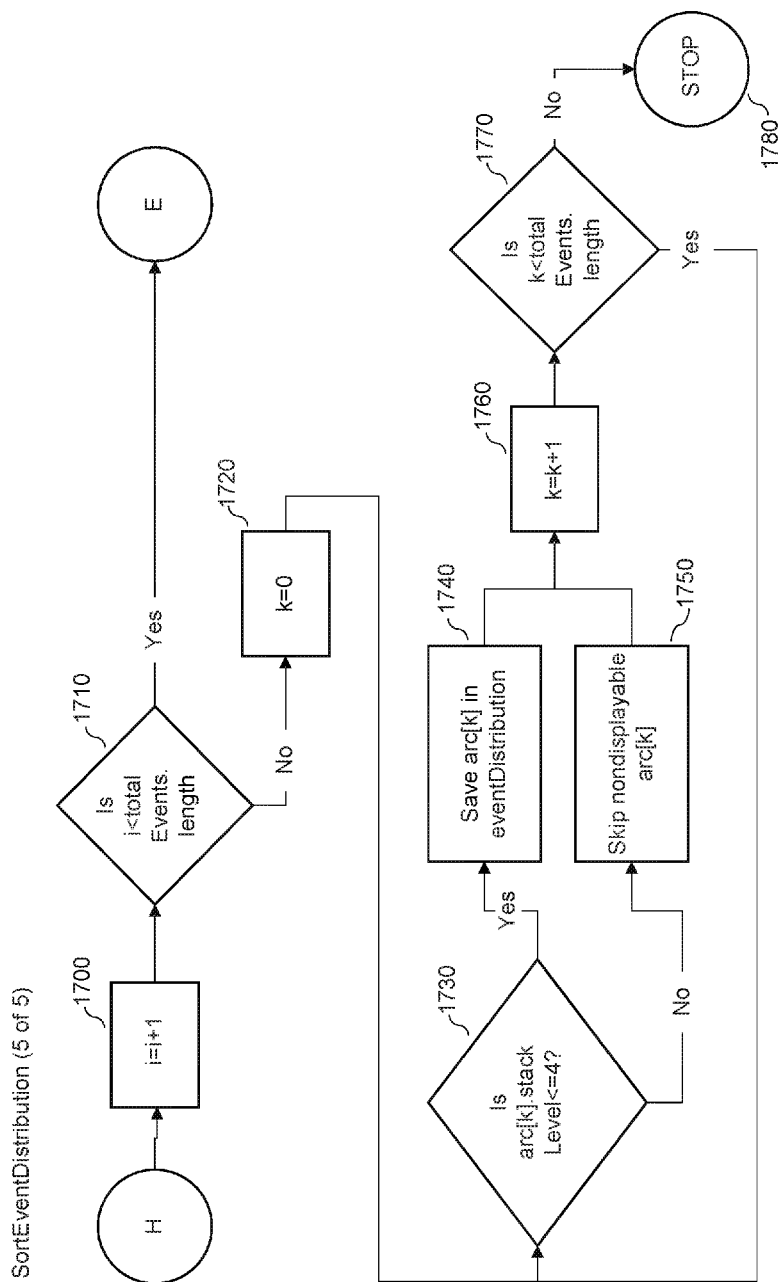
FIG. 31 depicts a fifth part of an example algorithm for implementing the SortEventDistribution function.

The DrawEvent 1000 step, takes the inputs of username, date, displaySize, and the eventDistribution array determined in the call to SortEventDistribution 1400 in FIG. 27. In one example, the DrawEvent 1000 step takes the input displaySize as LARGE if analog clockface is a larger orientation. In another example the DrawEvent 1000 step takes the input displaySize as SMALL if the analog clockface is a smaller orientation or transparent in the case of an overlay. Processing continues to step 1340.

In step 1340, the index i is incremented. The incrementing of the index i allows for the access of subsequent events, if any, that are in the eventDistribution variable. Processing continues to step 1350.

In step 1350 a determination is made whether the variable i is less than the number of displayable arciforms in eventDistribution. This determination is made to see if there are any more displayable arciforms left to draw. If the determination is true, then processing continues to step 1010 of DrawEvent 1000 to draw the next displayable arciform. If the determination is false, then processing for the DrawEventSingleDate 1300 is concluded at step 1360.

An example of an algorithm for implementing the SortEventDistribution functionality mentioned in the already-described example API will now be given. The SortEventDistribution functionality is shown generally at 1400 in FIG. 27. The description of SortEventDistribution 1400 includes the example algorithm depicted in not just FIG. 27, but also FIGS. 28-31.

The SortEventDistribution 1400 function takes the total events sent as an input. SortEventDistribution 1400 determines the number of displayable arciforms. The determination of displayable arciforms is based on the number of overlapping arciforms at a certain point. Additional overlapping events are hidden or abstracted from display. The method to display and hide arciforms is discussed further below.

Referring to FIG. 27, processing for the example implementation of SortEventDistribution 1400 begins at reference numeral 1410 and proceeds to step 1420. In step 1420, the events within the totalEvents variable are sorted chronologically. In one example events are stored by start time chronologically and duration of event subsequently. Processing continues to step 1430.

In step 1430, the index variable i is set to zero. The variable i will be used to call specific events from the variable TotalEvent for step 1440. Processing continues to step 1440 (via connector symbol E).

In step 1440 (FIG. 28), a determination is made whether there are any overlapping events in the sorted list in the TotalEvent variable and existing events identified as displayable. In one instance where there are overlapping events, processing continues to step 1450. If there are no overlapping events, then processing continues to step 1445.

In step 1445, the event's stackLevel attribute is set to a value of one. Since it is the only one event within its durations, the arciform will be set to stack level one. In one example, the stack level one is the level of a region closest to the center of a circle. In another example, the stack level one is the level of a region farthest from the center of a circle. Processing continues to step 1700 (via connector symbol H).

In step 1450, a determination is made whether the event being evaluated is equal to or shorter than the event already stored in in stack level one, since there are overlapping events as determined in step 1440. In one instance where the event is shorter or equal to the event already assigned to stack level one, the currently evaluated event cannot use stack level one, therefore processing continues to step 1460. In another instance where the currently evaluated event is larger than the event already assigned to stack level one, the event must replace the event already assigned to stack level one, and existing events must be incremented by one, therefore, processing continues to step 1480.

In step 1460, a determination is made whether the stack level two is available for the currently evaluated event to be assigned to. In one instance where stack level two is available, processing continues to step 1470. In another instance where stack level two is not available, processing continues to step 1540 (via connector symbol F).

In step 1470, the event's stackLevel attribute is set to two. Since there were no other events already in stack level two, as determined by step 1460, processing continues to step 1700 (via connector symbol H).

In step 1480, the loop variable j is set. In one example of the SortEventDistribution 1400 function where there are a maximum of three displayable stacks within a region, the loop variable j is set to four. In another example of the API, there are more displayable stacks (such as five), so the loop variable j would need to be set to one greater than the number of stacks (i.e., set to six). In this example, there are three displayable stack levels followed by a fourth regional stack for any times where there are more than three events. The value of variable j is used in the same way in steps 1570 and 1650. Step 1730 also uses the same value of four to determine which arciforms are displayable. Processing continues to step 1490.

In step 1490, a determination is made whether there is an arciform in stack level j. In one instance where there is an event in stack level j, then it must be moved to the next stack level to make room for the event being currently evaluated, therefore, processing continues to step 1500. In another instance where there is no arciform in stack level j, no arciform needs to be moved, therefore processing continues to step 1510.

In step 1500, the arciform that already exists in stack level j as determined in step 1490, is moved to level j+1. Moving the arciform up will allow for placing lower level arciforms, therefore, processing continues to step 1510.

In step 1510, the loop variable j is decremented. Decrementing the loop variable j will allow for lower level arciforms to be moved, therefore, processing continues to step 1520.

In step 1520, a determination is made whether the loop variable equals zero. In one instance where a determination is made that the j=0, then all existing arciforms have been moved, therefore, processing continues to step 1530. In another instance where a determination is made that j≠0, there are more arciforms to move, therefore processing continues to step 1490.

In step 1530, the event being currently evaluated is set to stack level one. All existing arciforms have already been incremented in steps 1490 to 1520. Processing continues to step 1700 (via connector symbol H).

In step 1540 (FIG. 29), a determination is made whether the event being evaluated is equal to or shorter than the event already stored in in stack level two, since there are overlapping events as determined in step 1460. In one instance where the event is shorter or equal to the event already assigned to stack level two, the currently evaluated event cannot use stack level two, therefore processing continues to step 1550. In another instance where the currently evaluated event is larger than the event already assigned to stack level two, the event must replace the event already assigned to stack level two, and existing events must be incremented by one, therefore, processing continues to step 1570.

In step 1550, a determination is made whether the stack level three is available for the currently evaluated event to be assigned to. In one instance where stack level three is available, processing continues to step 1560. In another instance where stack level three is not available, processing continues to step 1540 (via connector symbol G).

In step 1560, the event's stackLevel attribute is set to three. Since there were no other events already in stack level three, as determined by step 1550, processing continues to step 1700 (via connector symbol H).

In step 1570, the loop variable j is set to four. Processing continues to step 1490.

In step 1580, a determination is made whether there is an arciform in stack level j. In one instance where there is an event in stack level j, then it must be moved to the next stack level to make room for the event being currently evaluated, therefore, processing continues to step 1585. In another instance where there is no arciform in stack level j, no arciform needs to be moved, therefore processing continues to step 1590.

In step 1585, the arciform that already exists in stack level j as determined in step 1580, is moved to level j+1. Moving the arciform up will allow for placing lower level arciforms, therefore, processing continues to step 1590.

In step 1590, the loop variable j is decremented. Decrementing the loop variable j will allow for lower level arciforms to be moved, therefore, processing continues to step 1600.

In step 1600, a determination is made whether the loop variable j=1. In one instance where a determination is made that j=1, then all existing arciforms down to stack level two have been moved, therefore, processing continues to step 1530. In another instance where a determination is made that j≠1, there are more arciforms above stack level one to move, therefore processing continues to step 1610.

In step 1610, the event being currently evaluated is set to stack level two. All existing arciforms have already been incremented in steps 1580 to 1600. Processing continues to step 1700 (via connector symbol H).

In step 1620 (FIG. 30), a determination is made whether the event being evaluated is equal to or shorter than the event already stored in in stack level three, since there are overlapping events as determined in step 1550. In one instance where the event is shorter or equal to the event already assigned to stack level three, the currently evaluated event cannot use stack level three, therefore processing continues to step 1630. In another instance where the currently evaluated event is larger than the event already assigned to stack level three, the event must replace the event already assigned to stack level three, and existing events must be incremented by 1, therefore, processing continues to step 1650.

In step 1630, a determination is made whether the stack level four is available for the currently evaluated event to be assigned to. In one instance where stack level four is available, processing continues to step 1640. In another instance where stack level four is not available, processing continues to step 1700 (via connector symbol H).

In step 1640, the event's stackLevel attribute is set to four. Since there were no other events already in stack level four, as determined by step 1630, processing continues to step 1700 (via connector symbol H).

In step 1650, the loop variable j is set to four. Processing continues to step 1660.

In step 1660, a determination is made whether there is an arciform in stack level j. In one instance where there is an event in stack level j, then it must be moved to the next stack level to make room for the event being currently evaluated, therefore, processing continues to step 1665. In another instance where there is no arciform in stack level j, no arciform needs to be moved, therefore processing continues to step 1670.

In step 1665, the arciform that already exists in stack level j as determined in step 1660, is moved to level j+1. Moving the arciform up will allow for placing lower level arciforms, therefore, processing continues to step 1670.

In step 1670, the loop variable j is decremented. Decrementing the loop variable j will allow for lower level arciforms to be moved, therefore, processing continues to step 1680.

In step 1680, a determination is made whether the loop variable j=2. In one instance where a determination is made that j=2, then all existing arciforms have been moved down to stack level three, therefore, processing continues to step 1690. In another instance where a determination is made that j≠2, there are more arciforms to move, therefore processing continues to step 1660.

In step 1690, the event being currently evaluated is set to stack level three. All existing arciforms have already been incremented in steps 1660 to 1680. Processing continues to step 1700 (via connector symbol H).

In step 1700 (FIG. 31), loop variable i is incremented. Incrementing loop variable i allows for the evaluation of subsequent events in the totalEvents variable. Processing continues to step 1710.

In step 1710, a determination is made whether the loop variable i is less than the number of total events. In one instance this determination is made by the formula i<totalEvents.length. This determination is made to gauge if additional events need to be evaluated. If the determination in step 1710 is true, then processing continues to step 1440 (via connector symbol E). If the determination in step 1710 is false then processing continues to step 1720.

In step 1720, the loop variable k is set to zero. The loop variable k is used to evaluate all arciforms that are assigned a stack level in steps 1730-1770. Processing continues to step 1730.

In step 1730, a determination is made whether the arciform in index k has a stackLevel less than or equal to a threshold. In this example, the threshold is k≤4. In one example, only three arciforms are displayed along with a fourth full region arciform for subsequent events. Since in this example only a subset of arciforms is displayable, only the lowest stack level arciforms are stored. The number of draw calls to the display are thereby reduced by abstracting the event display when the number of arciforms to display exceed a threshold. Therefore, processing efficiencies are realized by the reduction in the number of draw calls. If the determination of step 1730 is true, then processing continues to step 1740. If the determination of step 1730 is not true then processing continues to step 1750.

In step 1740, the arciform in index k is saved. The arciform in index k is saved to the eventDistribution variable since the determination in step 1730 is that the arciform is displayable. When the arciform in index k is saved, the save function will convert the start and end times to an angular measure, a number of radians, degrees, or any quantity suitable to indicate the starting point of an event among a circular analog clockface. Processing continues to step 1760.

In step 1750, the arciform in index k is skipped. The arciform in index k is skipped as non-displayable to realize the processing gains realized by abstraction that were previously discussed. Processing continues to step 1760.

In step 1760, the loop variable k is incremented. The loop variable k is incremented to allow for evaluating subsequent arciforms. Processing continues to step 1770.

In step 1770, a determination is made whether k is less than the total number of events. The determination is made by the formula k<totalEvents.length. If the determination is true, then more events' arciforms need to be evaluated, therefore, processing continues to step 1730. If the determination is false, then all events' arciforms have been evaluated, and processing for the SortEventDistribution 1400 function concludes in step 1780.

The multiple concrete implementations are provided so the reader already familiar with this technology is taught how to obtain the benefits of increased clarity, reduced consumption of processor cycles and memory, and ease of rapid interpretation. Not all implementations within the scope and spirit of the claims must achieve the foregoing technical advantages. It is certainly possible to implement the examples shown above in an inefficient manner, however, and so although it is desirable and intended that processor cycles and memory be conserved in an ETMD, such conservation is not at all essential to any implementation.

Other API features and other functions will occur to those familiar with this technology, and such variations are to be expected in the light of the complete and detailed examples provided above. Such variations, however, should not be considered outside the scope and spirit of the claims below.

The software may, without loss of function, be practically embodied in software modules, in logic, in application-specific integrated circuits, or the like, without departing from the scope and spirit of the claims below.

The invention claimed is:

1. A time measuring device, comprising:
a computer system with a processing system having a hardware processor configured to perform a predefined set of basic operations in response to receiving a corresponding basic instruction selected from a predefined native instruction set of codes, and with a memory accessible to the processing system;
a user interface controller that is controllable by the processing system;
a display controllable by the user interface controller to show a user interface; and
logic, comprising a set of machine codes stored in the memory and selected from the predefined native instruction set of codes of the hardware processor, adapted to control the user interface controller to cause the display to show the user interface to have:
a first clockface showing a time interval duration of at least a first event; and
an augmented reality background appearing behind the first clockface.

2. The time measuring device as in claim 1, further comprising:
a camera adapted to provide a camera feed; and
the augmented reality background being based on the camera feed.

3. The time measuring device as in claim 2, wherein the first event pertains to a user.

4. The time measuring device as in claim 3, wherein the user interface further includes second through n-th clockfaces pertaining to different days.

5. The time measuring device as in claim 1, further comprising:
the logic being further adapted to cause the first clockface to have an ante meridiem events region and a post meridiem events region;
the first clockface indicating the time interval duration of the first event using a first arciform comprising:
in the ante meridiem events region, a first start point connected to an initial arc;
in the post meridiem events region, a final arc connected to a first end point; and
a transition indicator linking the initial arc with the final arc.

6. The time measuring device as in claim 1, wherein:
the augmented reality background is a view of a first location; and
the first event pertains to the first location.

7. The time measuring device as in claim 6, further comprising:
the memory having event information about the first event, including:
a respective start time indicator of the first event,
a respective duration indicator of the first event, and
a respective location of the first event; and
the logic causing the first clockface to be shown based on the respective start time indicator and the respective duration indicator of the first event when the first location corresponds to the respective location of the first event.

8. The time measuring device as in claim 6, further comprising:
a geolocation service interface accessible to the processing system;
the logic including a first module adapted to query the geolocation service interface to obtain device location information; and
the augmented reality background being based on the device location information.

9. The time measuring device as in claim 8, further comprising:
a gyroscope interface accessible to the processing system;
the logic including a second module adapted to obtain an orientation via the gyroscope interface; and
the augmented reality background being further based on the orientation.

10. The time measuring device as in claim 9, further comprising:
a camera interface accessible to the processing system;
the logic including a third module adapted to obtain the view, of the first location, via the camera interface, to create the first clockface based on the first event, and to show the first clockface over the view; and
the logic calling the third module, to show the first clockface over the view, when the orientation is toward the first location.

11. A method, comprising:
providing logic accessible to a processing system of a computer system, the processing system having a hardware processor, the computer system having a user interface controller under control of the processing system; and
operating the logic, under control of the processing system, and the user interface controller to implement a user interface, including:
a first clockface showing a time interval duration of at least a first event; and
an augmented reality background appearing behind the first clockface.

12. The method as in claim 11, further comprising basing the augmented reality background on a camera feed.

13. The method as in claim 12, wherein the first event pertains to a user.

14. The method as in claim 13, wherein the user interface further includes second through n-th clockfaces pertaining to different days.

15. The method as in claim 11, wherein the first clockface further comprises:
an ante meridiem events region and a post meridiem events region;
the first clockface indicating the time interval duration of the first event using a first arciform, comprising:
in the ante meridiem events region, a first start point connected to an initial arc;
in the post meridiem events region, a final arc connected to a first end point; and
a transition indicator linking the initial arc with the final arc.

16. The method as in claim 11, wherein:
the augmented reality background is a view of a first location; and
the first event pertains to the first location.

17. The method as in claim 16, further comprising:
obtaining event information about the first event, including:
   a respective start time indicator of the first event,
   a respective duration indicator of the first event, and
   a respective location of the first event; and
showing the first clockface, based on the respective start time indicator and the respective duration indicator of the first event when the first location corresponds to the respective location of the first event.

18. The method as in claim 16, further comprising:
querying a geolocation service interface to obtain device location information; and
basing the augmented reality background on the device location information.

19. The method as in claim 18, further comprising:
obtaining a device orientation via a gyroscope interface; and
basing the augmented reality background on the device orientation.

20. The method as in claim 19, further comprising:
obtaining the view, of the first location, via a camera interface;
basing the first clockface on the first event; and
showing the first clockface over the view when the device orientation is toward the first location.

* * * * *